US009748987B2

(12) United States Patent
Kpodzo et al.

(10) Patent No.: US 9,748,987 B2
(45) Date of Patent: *Aug. 29, 2017

(54) INTERFERENCE CANCELLATION SYSTEM FOR CANCELLING INTERFERENCE IN THE OPTICAL DOMAIN

(71) Applicant: L-3 Communications Corporation, New York, NY (US)

(72) Inventors: Elias Bonaventure Kpodzo, Franklin Park, NJ (US); Robert Holland, Moorestown, NJ (US); Yanhua Deng, Gainesville, FL (US); Paul Prucnal, Princeton, NJ (US); Andrew McCandless, Baton Rouge, LA (US); Paul Dourbal, Princeton Junction, NJ (US)

(73) Assignee: L3 TECHNOLOGIES, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/217,553

(22) Filed: Jul. 22, 2016

(65) Prior Publication Data
US 2017/0026126 A1      Jan. 26, 2017

Related U.S. Application Data

(63) Continuation of application No. 13/899,368, filed on May 21, 2013, now Pat. No. 9,444,502.
(Continued)

(51) Int. Cl.
H04B 1/10        (2006.01)
H04B 10/00      (2013.01)
(Continued)

(52) U.S. Cl.
CPC ............. *H04B 1/1027* (2013.01); *H04B 1/10* (2013.01); *H04B 1/109* (2013.01); *H04B 10/00* (2013.01);
(Continued)

(58) Field of Classification Search
CPC .... H04B 1/10; H04B 1/109; H04B 2210/006; H04K 3/20; H04K 3/228
See application file for complete search history.

(56) References Cited

U.S. PATENT DOCUMENTS 5,247,309 A      9/1993  Reich
6,141,393 A     10/2000  Thomas et al.
(Continued)

FOREIGN PATENT DOCUMENTS

CN       101404509 A       4/2009

OTHER PUBLICATIONS

"RFI/EMI Current Probes and Injection Probes", Solar Electronics Company, pp. 33-36.
(Continued)

*Primary Examiner* — Devan Sandiford
(74) *Attorney, Agent, or Firm* — Condo Roccia Koptiw LLP

(57) ABSTRACT

Systems and methods for cancelling interference from a received signal in order to properly detect a signal of interest are disclosed. A combined signal of interest plus interference signal may be received. A copy or sample of the interference signal may be determined. The interference signal and the combined signal of interest plus interference signal may be converted to the optical domain. The interference signal may be optically phase shifted by −180 degrees, which may result in an optically inverted interference signal. The optically inverted interference signal may be variably optically attenuated and/or variably optically time delayed, for
(Continued)

example based on a detected output power of an optical subsystem of the interference cancellation system. As a result, interference cancellation of the interference signal from the combined signal of interest plus interference signal may be achieved, resulting in 50 dB or more of cancellation of the interference signal.

18 Claims, 21 Drawing Sheets

Related U.S. Application Data

(60) Provisional application No. 61/649,715, filed on May 21, 2012, provisional application No. 61/649,856, filed on May 21, 2012, provisional application No. 61/649,843, filed on May 21, 2012.

(51) Int. Cl.
| | | |
|---|---|---|
| *H04K 3/00* | (2006.01) | |
| *H04B 17/318* | (2015.01) | |
| *H04B 17/336* | (2015.01) | |
| *H04L 12/26* | (2006.01) | |
| *H04B 10/079* | (2013.01) | |
| *H04B 10/2507* | (2013.01) | |
| *H04B 10/2575* | (2013.01) | |

(52) U.S. Cl.
CPC ... *H04B 10/07955* (2013.01); *H04B 10/2507* (2013.01); *H04B 10/2575* (2013.01); *H04B 17/318* (2015.01); *H04B 17/336* (2015.01); *H04K 3/20* (2013.01); *H04K 3/228* (2013.01); *H04L 43/16* (2013.01); *H04B 2210/006* (2013.01)

(56) References Cited

U.S. PATENT DOCUMENTS

| | | |
|---|---|---|
| 6,525,682 B2 | 2/2003 | Yap et al. |
| 6,614,806 B1 | 9/2003 | Nanni |
| 7,035,550 B2 | 4/2006 | Prucnal et al. |
| 7,068,894 B2 | 6/2006 | Prucnal et al. |
| 7,856,184 B2 | 12/2010 | Li |
| 8,081,946 B2 | 12/2011 | Fudge |
| 8,103,175 B1 | 1/2012 | Kowalczyk et al. |
| 8,682,170 B2 | 3/2014 | Prucnal |
| 9,185,674 B2 | 11/2015 | Sauer |
| 9,344,125 B2 | 5/2016 | Kpodzo et al. |
| 9,444,502 B2 | 9/2016 | Kpodzo et al. |
| 2001/0020908 A1 | 9/2001 | Prucnal |
| 2002/0012495 A1 | 1/2002 | Sasai et al. |
| 2003/0121056 A1 | 6/2003 | Sorenson et al. |
| 2004/0037524 A1 | 2/2004 | Shahar et al. |
| 2004/0037525 A1 | 2/2004 | Shahar et al. |
| 2004/0085612 A1 | 5/2004 | Livingston et al. |
| 2004/0146237 A1 | 7/2004 | Taylor et al. |
| 2004/0208626 A1 | 10/2004 | Nishimura et al. |
| 2004/0208636 A1 | 10/2004 | Reynolds et al. |
| 2004/0213508 A1 | 10/2004 | Shahar et al. |
| 2005/0033966 A1 | 2/2005 | Johnson, Jr. |
| 2005/0105847 A1 | 5/2005 | Prucnal et al. |
| 2006/0161055 A1 | 7/2006 | Pewzner et al. |
| 2007/0237270 A1 | 10/2007 | Mezer et al. |
| 2008/0003368 A1 | 1/2008 | December et al. |
| 2008/0212968 A1 | 9/2008 | Lindop et al. |
| 2009/0263137 A1 | 10/2009 | Hossein-Zadeh et al. |
| 2010/0098411 A1 | 4/2010 | Nakashima et al. |
| 2011/0129026 A1 | 6/2011 | Um et al. |
| 2011/0170879 A1 | 7/2011 | Lin et al. |
| 2011/0287720 A1 | 11/2011 | Cox et al. |
| 2012/0052892 A1 | 3/2012 | Braithwaite |
| 2012/0201173 A1 | 8/2012 | Jain et al. |
| 2012/0251031 A1 | 10/2012 | Suarez et al. |
| 2012/0294608 A1 | 11/2012 | Prucnal |
| 2013/0308940 A1 | 11/2013 | Kpodzo et al. |
| 2014/0218240 A1 | 8/2014 | Kpodzo et al. |
| 2014/0282783 A1 | 9/2014 | Totten et al. |

OTHER PUBLICATIONS

Akajoki, et al., "Model Optical Transmitters with a Circuit Simulator", Microwaves & RF, vol. 44, Apr. 15, 2005, 92 pages.

Biedka et al., "Smart Antenna for Handsets", Bradley Department of Electrical and Computer Engineering, Virginia Polytechnic Institute and State University, Blacksburg, VA 24061-0111, Aug. 2, 2000, 5 pages.

Brahimi et al., "CAD of Microwave Optical Systems for Time & Frequency Applications", LAAS-CNRS, The European Forum for Time and Frequency 08, Version 1, Toulouse, France, Apr. 29, 2008, 5 pages.

Choi et al., "Achieving Single Channel, Full Duplex Wireless Communication", In Proceedings of the Sixteenth Annual International Conference on Mobile Computing and Networking, MobiCom'10, ACM, Sep. 20-24, 2010, pp. 1-12.

Choi et al., "The Effects of Co-Channel Interference on Spatial Diversity Techniques", IEEE Wireless Communications and Networking Conference, Mar. 11-15, 2007, pp. 1938-1943.

Donlan, "Ultra-Wideband Narrowband Interference Cancellation and Channel Modeling for Communications", Thesis, Electrical and Computer Engineering, Jan. 31, 2005, 119 pages.

Gheorma et al., "RF Photonic Techniques for Same Frequency Simultaneous Duplex Antenna Operation", Photonics Technology Letters, vol. 19, No. 13, Jul. 1, 2007, pp. 1014-1016.

Gollakota et al., "ZigZag Decoding: Combating Hidden Terminals in Wireless Networks", In Proceedings of the ACM SIGCOMM 2008 Conference on Data Communication, Aug. 17-22, 2008, pp. 159-170.

Halperin et al., "Taking the Sting out of Carrier Sense: Interference Cancellation for Wireless LANs", In Proceedings of the 14th ACM international conference on Mobile computing and networking, Sep. 8-12, 2008, 12 pages.

Intersil, "Active Isolation Enhancer and Interference Canceller", Qhx220 narrowband noise canceller, Oct. 20, 2009, pp. 1-19.

Jain et al., "Practical, Real-time, Full-Duplex Wireless", In Proceedings of the 17th Annual International Conference on Mobile Computing and Networking, Mobicom, Sep. 19-23, 2011, 12 Pages.

Johnson et al., "Interferometric Modulators for an Adaptive Nulling System", SPIE Analog Photonics, vol. 1790, Feb. 26, 1993, pp. 50-54.

Kay, Steven M., "Fundamentals of Statistical Signal Processing: Estimation Theory", Upper Saddle River NJ: Prentice Hall, vol. 1, 1993, 589 pages.

Kim et al., "Adaptive Feedback Interference Cancellation System (AF-ICS)", Microwave Symposium Digest, IEEE MTT-S International, vol. 1, Jun. 8-13, 2003, pp. 627-630.

Naglich et al., "Tunable, Substrate Integrated, High Q Filter Cascade for High Isolation", Microwave Symposium Digest (MTT), 2010 IEEE MTT-S International, May 23-28, 2010, pp. 1468-1471.

Nightingale et al., "An Eight Channel Interference Cancellation System", Microwave Symposium Digest, IEEE MTT-S International, Jun. 11-16, 2006, pp. 914-917.

Raghavan, et al., "Analysis and Design of an Interference Canceller for Collocated Radios", IEEE Transactions on Microwave Theory and Techniques, vol. 53, No. 11, Nov. 2005, pp. 3498-3508.

Reines et al., "Compact Low-Loss Tunable X -Band Bandstop Filter with Miniature RF-MEMS Switches", IEEE Trans. Microwave Theory and Techniques, vol. 58, No. 7, Jul. 2010, pp. 1887-1895.

Sonnenschein et al., "A Design for an Electro-Optic Implementation of a Wideband Nulling System", IEEE, MIT Lincoln Lab., Tech. Rep. 887, vol. 2, Sep. 30-Oct. 3, 1990, pp. 742-748.

Stutzman et al., "Recent Results From Smart Antenna Experiments-Base Station and Handheld Terminals", IEEE, Radio and Wireless Conference, RAWCON 2000, Sep. 10-13, 2000, pp. 139-142.

(56) References Cited

OTHER PUBLICATIONS

Suarez et al., "Incoherent Method of Optical Interference Cancellation for Radio Frequency Communications", IEEE Journal of Quantum Electronics, vol. 45, No. 4, Apr. 2009, pp. 402-408.

Suarez et al., "Methods of Feedback Control for Adaptive Counter-Phase Optical Interference Cancellation", IEEE Transactions on Instrumentation and Measurement, vol. 60, No. 2, Feb. 2011, pp. 598-607.

Suarez et al., "System Level Performance and Characterization of Counter-Phase Optical Interference Cancellation", IEEE, Journal of Lightwave Technology, vol. 28, No. 12, Jun. 15, 2010, pp. 1821-1831.

Suarez, John, "Electro-Optic Counter-Phase Modulation for Broadband Radio-Frequency Interference Cancellation", Dissertation Presented to the Faculty of Princeton University, Apr. 2012, 224 pages.

Ward et al., "Design and Fabrication of a Multichannel Adaptive Optical Processor (MADOP)", In-House Report, RL-TR-92-333, Dec. 1992, 59 pages.

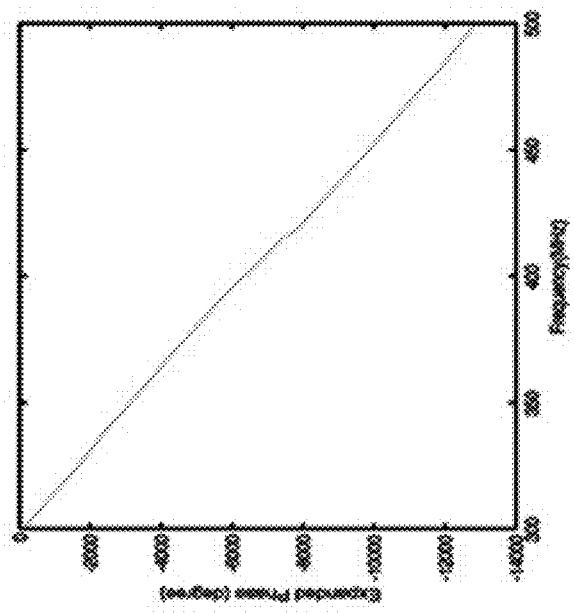
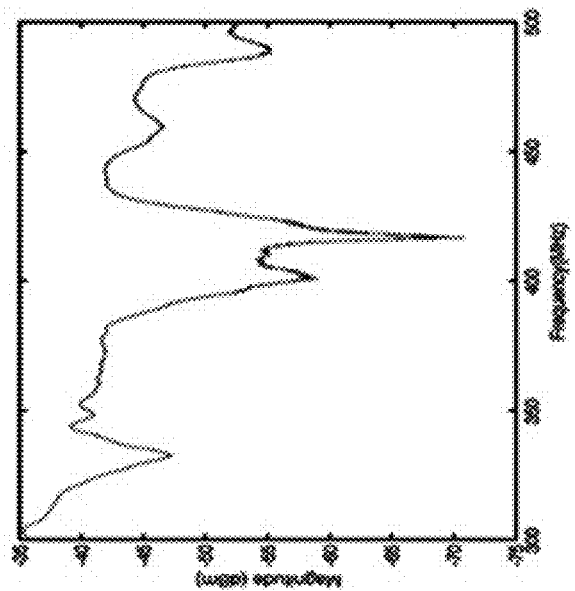
FIG. 15B
FIG. 15A

INTERFERENCE CANCELLATION SYSTEM FOR CANCELLING INTERFERENCE IN THE OPTICAL DOMAIN

CROSS-REFERENCE TO RELATED APPLICATIONS

This application is a continuation of U.S. patent application Ser. No. 13/899,368, filed May 21, 2013, which claims the benefit of U.S. Provisional Patent Application No. 61/649,715, filed May 21, 2012; U.S. Provisional Patent Application No. 61/649,843, filed May 21, 2012; and U.S. Provisional Patent Application No. 61/649,856, filed May 21, 2012; the contents of which are hereby incorporated by reference in their entirety.

This application may include subject matter that is related to subject matter included in U.S. patent application Ser. No. 13/899,505, filed May 21, 2013 and U.S. patent application Ser. No. 13/899,529, filed May 21, 2013.

BACKGROUND

Electromagnetic interference, which may also be referred to as radio frequency (RF) interference, may be a disturbance that affects electrical circuits and/or antennas due to electromagnetic induction or electromagnetic radiation being present when attempting to transmit and/or receive a signal of interest. For example, an interfering radio signal may be present when attempting to receive a radio signal of interest. The interference caused by the interfering signal may prevent, obstruct, or otherwise degrade the ability of a receiver from successfully receiving and interpreting the signal of interest. The interfering signal may be natural (e.g., RF radiation from the sun or other natural source, background noise, etc.) or artificial (e.g., a transmitting radio, an electrical circuit that includes rapidly changing electrical currents, etc.).

Electromagnetic interference may be intentional or unintentional. For example, jamming devices may be designed to emit narrowband and/or broadband interfering signals in order to disrupt the radio communications of a target. Unintentional interference may be due to spurious/out-of-band emissions of radios operating in frequency bands at or near the frequency utilized for transmitting/receiving a signal of interest.

SUMMARY

Interference cancellation systems (ICSs) and methods for cancelling interference in order to determine a signal of interest (SOI) are disclosed. For example, an ICS may include a radio frequency (RF) subsystem. The RF subsystem may be configured to receive a first signal corresponding to an interferer signal and a second signal corresponding a combination of the interferer signal and a SOI. The ICS may include an optical subsystem. The optical subsystem may be configured to receive the first signal and the second signal from the RF subsystem. The optical subsystem may be configured to variably attenuate and variably time delay one or more of the first signal and the second signal based on one or more control signals received from a digital subsystem. The optical subsystem may be configured to combine the first signal and the second signal into a combined signal after variably attenuating and variably time delaying one or more of the first signal and the second signal. The ICS may include the digital subsystem. The digital subsystem may be configured to generate the control signals based on a power level associated with the combined signal output from the optical subsystem. The digital subsystem may be configured to send the control signals to the optical subsystem.

The RF subsystem may include an RF correlator. The RF correlator may be configured to receive the combined signal and provide an indication of the power level associated with the combined signal to the digital subsystem. The RF subsystem may include an RF frequency detector. The RF frequency detector may be configured to receive a signal transmitted by a radio transceiver and send an indication of frequency associated with the signal transmitted by the radio transceiver to the digital subsystem. The RF correlator and the RF frequency detector may share one or more synthesizers that are configured to tune the RF correlator to the frequency associated with the signal transmitted by the radio transceiver.

The RF subsystem may include a transmit power level detector. The transmit power level detector may be configured to receive a signal transmitted by a radio transceiver and provide an indication of a power level associated with the signal transmitted by the radio transceiver to the digital subsystem. The digital subsystem may be configured to determine to route the signal transmitted by the radio transceiver to an antenna based on the power level associated with the signal transmitted by the radio transceiver being above a predetermined threshold. The digital subsystem may be configured to determine to route a signal received via the antenna to optical subsystem based on the power level associated with the signal transmitted by the radio transceiver being below the predetermined threshold.

The optical subsystem may include a plurality of optical processing lines and each of the optical processing lines may be configured to attempt to cancel a different multipath signal associated with a transmitted version of the interferer signal. The optical subsystem may be configured to convert one or more of the first signal or the second signal from an RF signal to an optical signal using a direct modulation technique. The digital subsystem may be configured to generate the control signals in order to attempt to minimize the power level associated with the combined signal output from the optical subsystem. For example, the digital subsystem may be configured to generate the control signals in order to attempt to minimize the power level associated with the combined signal output from the optical subsystem using a two variable minimization method. The two variables that may be varied in order to minimize the power level associated with the combined signal output from the optical subsystem may include an attenuation level applied by the optical subsystem and a time delay applied by the optical subsystem. The RF subsystem may include one or more equalizers configured to compensate for non-linear channel effects associated with a channel traversed by a transmitted version of the interferer signal.

The optical subsystem may be configured to apply a time delay to the second signal using a plurality of fiber optic delay lines included between paired wavelength division multiplexing (WDM) units. The optical subsystem may include a plurality of tunable continuous wave (CW) lasers. The plurality of tunable CW lasers may be configured to control which of the plurality of fiber optic delay lines are utilized at a given instance in time. For example, a first tunable CW laser of the plurality of tunable CW lasers may be configured to be active at a given instance. A second tunable CW laser of the plurality of tunable CW lasers may be configured to tune to a frequency associated with a non-active fiber optic delay line while the first tunable CW laser is active.

Methods for attempting to cancel an interference signal from a combined interference and signal of interest (SOI) signal are disclosed. For example a first radio frequency (RF) signal corresponding to the interference signal and a second RF signal corresponding to the combined interference and SOI signal may be received. The first RF signal may be converted to a first optical signal, and the second RF signal may be converted to a second optical signal. A 180 degree phase shift may be applied to one of the first optical signal or the second optical signal before, during, or after optical conversion. The first optical signal (and/or the second optical signal) may be optically attenuated and optically time delayed. The attenuated and time delay first optical signal may be combined with the second optical signal to create a combined optical signal. The combined optical signal may be converted to a combined RF signal. The combined RF signal may be sent to a radio transceiver. Optically attenuating and optically time delaying the first optical signal may be performed in order to minimize a power level associated with the combined RF signal.

An RF time delay may be applied to the first RF signal prior to converting the first RF signal to the first optical signal. The RF time delay may be at least an order of magnitude larger than an optical time delay that is applied to the first optical signal. One or more initial optical attenuation values or optical delay values to be applied to the first optical signal may be determined based on determining that a power difference between a signal associated with the interference signal and a signal associated with the combined interference and SOI signal. When an interferer is transmitting the interferer signal and when the radio transceiver is transmitting a transmission signal may be determined. Interference cancellation may be performed when the interferer is transmitting and the radio transmitter is not transmitting. It may be determined to refrain from performing interference cancellation when the interferer is not transmitting or when the radio transceiver is not transmitting. Combining the attenuated and time delay first optical signal with the second optical signal to create a combined optical signal may results in at least 50 dB of cancellation of the interference signal from the combined interference and SOI signal.

BRIEF DESCRIPTION OF THE DRAWINGS

FIGS. 15A & 15B illustrate amplitude and phase vs. frequency responses of the over-the-air path experienced by the jammer signal.

DETAILED DESCRIPTION

Figure 1:
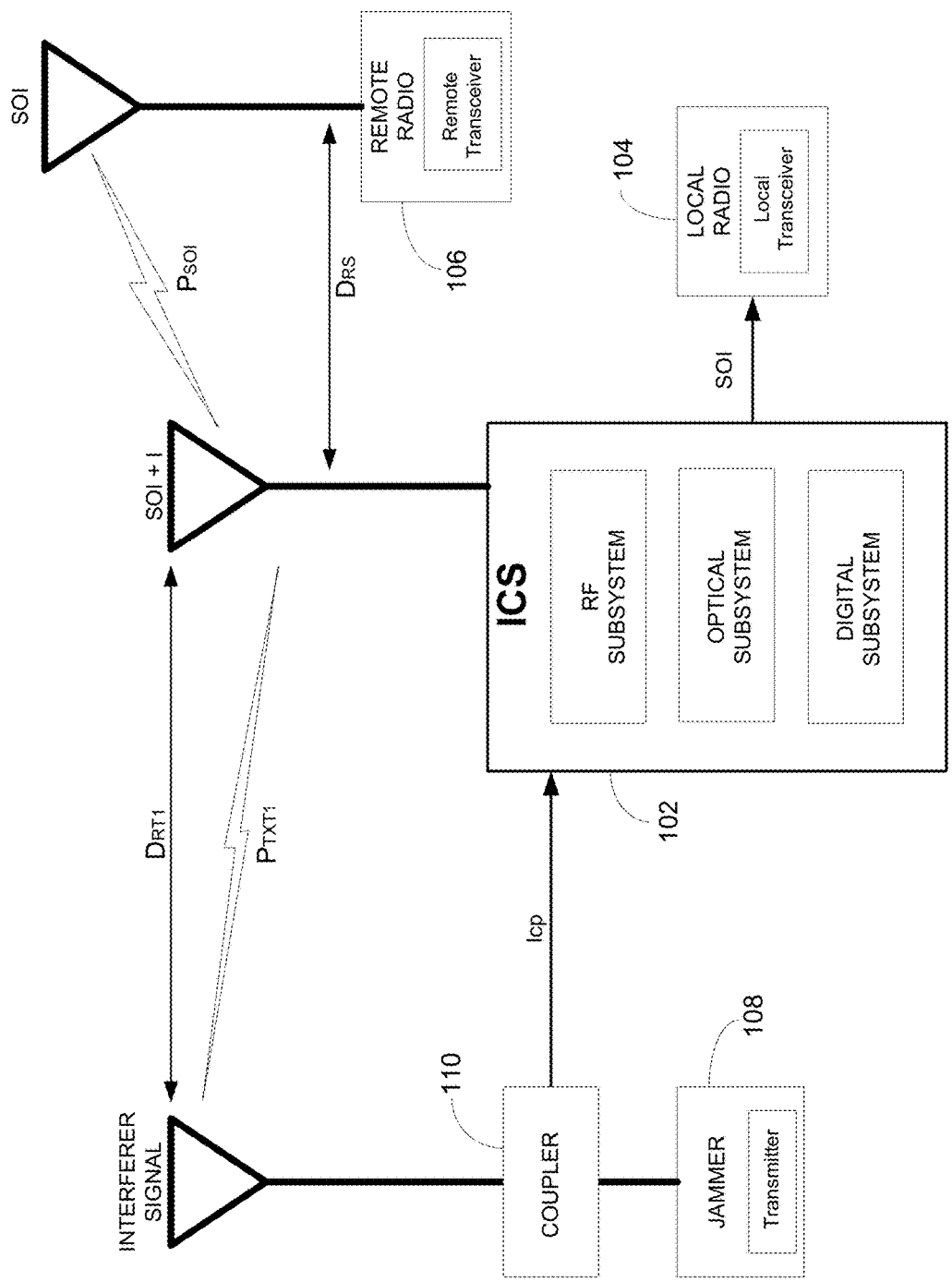
FIG. 1 is a system diagram of an example architecture in which an interference cancellation system may be implemented.

Disclosed herein are systems and methods for cancelling interference from a received signal in order to properly detect a signal of interest. The method may include receiving a combined signal of interest and interference signal. The method may further include receiving/determining a sample of the interference signal. The combined signal of interest and interference signal and/or the interference signal may be variably attenuated and/or variably delayed in the RF domain prior to being transformed to the optical domain, for example to increase the speed of an interference cancellation process prior to optical interference cancellation. The RF variable attenuation and/or variable delay may increase the maximum operational range(s) of delays and/or gain ratios between an interference signal received with the signal of interest and the interference signal received separately from the signal of interest. The interference signal may be converted to the optical domain and optically phase shifted by −180 degrees (e.g., 180 degrees), which may result in an optically inverted interference signal. The optically inverted interference signal may be variably optically attenuated and/or variably optically time delayed, for example based on a detected output power of the optical portion of the interference cancellation system.

The system may be configured to automatically detect the power level and/or frequency of an external radio transceiver. The system may be configured to cancel the interference near and/or equal to the determined frequency of operation for the radio transceiver. The system may be configured to determine initial parameter values for an optical weighting network (e.g., attenuators and/or time delays). The system may be configured to continuously update and/or adjust optical attenuation parameters and/or optical time delays, for example to maintain a desired level of interference cancellation. The power level of the signal output from optical portion of the system may be inversely related (e.g., proportional) to level of interference cancellation. For example, a lower power level output from the optical subsystem may correspond to a higher degree of interference cancellation.

The system may be configured to automatically determine when a jammer is transmitting. The system may be configured to automatically determine when the radio transceiver is transmitting. They system may be configured to automatically begin interference cancellation based on determining that the jammer is transmitting and that the radio transceiver is not transmitting.

RF jamming is a form of electronic warfare that may be used to disrupt enemy communication systems. For example, mines and other Improvised Explosive Devices (IEDs) are often designed such that they may be remotely detonated using many different types of conventional RF communication systems. Cell phones, Bluetooth devices, pagers, cordless phones, garage door openers, Wi-Fi devices, etc. are examples of consumer devices that can be repurposed as a remote detonation system for a mine and/or IED. Due to the large frequency range over which potential remote detonators may operate (e.g., typical garage door openers often operate in the 300 MHz to 390 MHz frequency range; cell phones may operate in the cellular, personal communications service (PCS), Global System for Mobile Communications (GSM), and/or other cellular frequency bands typically in the range of 700-2,700 MHz; WiFi and other unlicensed devices often operate in the industrial, scientific and medical (ISM) radio bands typically at frequencies of 900-6,000 MHz; etc.), it can be very difficult to selectively block communications from the remote device without interfering with other signals operating at these frequencies.

For example, in order to protect military vehicles from IEDS, the military vehicles may be equipped with a local jammer that is designed to interfere with the RF detonation system used by the enemy. The interference is designed to disrupt communications that may contain a detonation signal such that a receiver at the explosive is unable to successfully receive and decode the detonation signal. These jammers are typically very high power and often emit a broadband interference signal over a wide frequency range. However, these these high power, broadband jamming signals often created interference at frequencies used for friendly communications. Thus, while protecting military vehicles by blocking enemy signals, many jammers may saturate the electromagnetic spectrum and may interfere with friendly radios and sensor equipment. Such interference may compromise missions and may expose war fighters to intelligence-related dangers.

Disclosed herein are methods and systems that allow for the friendly communication equipment and jammers to operate simultaneously even when both a jammer and a friendly radio are operating at or near the same frequency. The disclosed methods and systems may be seamlessly integrated with existing field equipment (e.g., jammers/interferes and radio transceivers) to minimize development and recurring costs for communication system deployment in the field, in the air, on ships, submarines, and/or the like. For example, systems and methods for automatically detecting the frequency and/or power level (e.g., transmission state) of an external radio transceiver and/or external jammer are disclosed. Additionally, the systems and methods may be utilized in order to cancel interference caused by other radios operating at or near the frequency utilized to transmit/receive a signal of interest.

In an example, a hybrid RF/optical interference cancellation system (ICS) may be operably connected to current communication equipment and/or jammers that are already in service in order to substantially reduce jamming interference. The disclosed ICS methods and systems may be more effective at cancelling interference than receiver RF front end filters. In an example, the ICS may be used in conjunction with front-end RF filters in order to provide additional interference cancellation above that which is provided by the front-end RF filter alone. RF interference cancellation techniques may be coupled with optical interference cancellation techniques in order to increase the overall speed of the interference cancellation process. The ICS may be integrated with co-located radios and/or jammers without substantial modification to these systems or degradation of their system performance.

FIG. 1 illustrates an example system including an ICS. For example, ICS 102 may be configured to provide interference cancellation in multi-faceted environments, such as environments including one or more remote interferers (e.g., an interferer is not co-located and/or is not coupled to the ICS) and/or one or more unknown jammers/interferers. As illustrated in FIG. 1, Local Radio 104 may be attempting to communicate with Remote Radio 106. Each of the radios may include a transceiver configured to provide operable wireless communications between the radio systems. For example, Local Radio 104 may include a local transceiver that is configured to perform transmit and/or receive processing of radio signals transmitted from and/or received by Local Radio 104. The local transceiver may be coupled to one or more antennas in order to transmit and/or receive radio signals over the air. Similarly, Remote Radio 106 may also include a transceiver (e.g., remote transceiver) that is configured to perform transmit and/or receive processing of radio signals transmitted from and/or received by Remote Radio 106. The remote transceiver may be coupled to one or more antennas in order to transmit and/or receive radio signals over the air.

As an example, Remote Radio 106 may transmit a signal of interest (SOI) to Local Radio 104. For example, Remote Radio 106 may send a communication from an ally that is meant to be received by the user of Local Radio 104. The distance between the location of Remote Radio 106 and Local Radio 104 may be expressed as $D_{RS}$. The received signal power of the SOI may be expressed as $P_{SOI}$.

However, during the period wherein Remote Radio 106 is attempting to communicate with Local Radio 104, one or more interference signals may be emitted by various interference sources. The interference signals may be received at Local Radio 104 in addition to the SOI. For example, Jammer 108 may include a transmitter and one or more antennas that may be configured to transmit an Interferer Signal (I). The Interferer Signal (I) may include transmissions on one or more frequencies that may be the same or close to one or more frequencies that may be used to transmit the SOI, and hence may result in interference between the SOI and the I. The presence of the Interferer Signal may make it difficult for the local transceiver of Local Radio 104 to properly receive and process the SOI. The distance between the location of Jammer 108 and Local Radio 104 may be expressed as $D_{RT1}$. The received signal power of the Interferer Signal at Local Radio 104 may be expressed as $P_{TXT1}$.

In many practical scenarios, the Interferer Signal (I) may be a much higher power signal than the SOI in the vicinity of Local Radio 104. For example, Local Radio 104 may be co-located with Jammer 108 on a military vehicle. Remote Radio 106 may be several miles away from both Local Radio 104 and Jammer 108. Thus, for one or more example it may be assumed that $D_{SOI}$ is much larger (e.g., orders of magnitude larger) than $D_{RT1}$. Additionally, since Jammer 108 typically emits a very high power Interferer Signal that does not travel very far to reach Local Radio 104 (e.g., while Remote Radio 106 may emit a relatively lower power SOI that may travel orders of magnitude farther than the Interferer Signal (I) prior to reaching Local Radio 104), it may also be assumed that $P_{TXT1}$ is much larger (e.g., order of magnitude larger) than $P_{SOI}$. This may be the case when the Jammer is located in or around the vicinity of the ICS, while Remote Radio 2 may be several miles (or more) away from the ICS.

Thus, when both Remote Radio 106 and Jammer 108 are in simultaneous operation, the actual signal received at the one or more antennas associated with Local Radio 104 may be a combined SOI and Interferer Signal (e.g., SOI+I). It may be difficult for Local Radio 104 to determine the SOI from the SOI+I signal using conventional interference mitigation techniques, for example since the I signal may be much higher power than the SOI and may include one or more components in the same frequency range as the SOI.

Therefore, in an example, ICS 102 may be inserted between the one or more antennas associated with Local Radio 104 and the local transceiver of Local Radio 104. ICS 102 may be configured to attempt to cancel the Interferer Signal (I) from the combined SOI+I signal that is received at the one or more antennas associated with Local Radio 104. For example, ICS 102 may obtain a sample of the Interferer Signal (I), for example via Coupler 110 that is operably connected to Jammer 108. For example, in the case where both Hammer 108 and Local Radio 104 are co-located on a military vehicle. Coupler 110 may act to provide ICS 102 with a sample of the Interferer Signal (I) produced by Jammer 108 prior to the Interferer Signal (I) being sent over the air using one or more antennas associated with Jammer 108 (e.g., Coupler 110 may be inserted between the transmitter of Jammer 108 and the one or more antennas associated with Jammer 108). Coupler 110 may be configured to provide a physical cable connection such that ICS 102 may receive a copy of the RF signal being transmitted by Jammer 108. In another example, the Interferer Signal (I) may be communicated to the ICS via a wireless signal. The sample of the Interferer Signal (I) that is provided to the ICS may be expressed as $I_{cp}$.

In order to properly detect the SOI from the SOI+I signal, ICS 102 may be configured to use one or more of RF, optical, and/or digital signal processing (DSP) techniques to cancel the Interferer Signal (I) from the SOI+I signal. For example, the ICS may include an RF Subsystem, an Optical Subsystem, and/or a Digital Subsystem. The RF Subsystem, the Optical Subsystem, and/or the Digital Subsystem may be configured to remove or cancel most or all of the Interferer Signal (I) from the signal received over the one or more antennas associated with Local Radio 104. The techniques utilized by the RF Subsystem, the Optical Subsystem, and/or Digital Subsystem 380 are described in more detail below. Upon successfully cancelling the Interferer Signal (I), ICS 102 may send the SOI to the local transceiver of Radio 104 for further reception processing.

For example, ICS 102 may include one or more of optical components (e.g., an Optical Subsystem), radio frequency components (e.g., an RF Subsystem), and/or digital signal processing components (e.g., a Digital Control Subsystem) to perform interference cancellation. In an example, ICS 102 may convert RF and/or microwave input signals into optical signals. The ICS may use optical components to perform precise attenuation and time delay of the converted signal to achieve optimal cancellation depths across an instantaneous bandwidth of hundreds of MHz. For example, the system may operate to perform interference cancellation from high frequency (HF) bands (e.g., 3-30 MHz) to S bands (e.g., 2 to 4 GHz) and beyond.

The optical components of ICS 102 may be configured to perform precise inversion and recombination of two RF signals, which may be achieved with greater accuracy in the optical domain than in the RF domain. For the undesired interference signal to be perfectly or near-perfectly cancelled, the inversion process may result in an inverted interference signal that is nearly an exact replica of the original signal, except for the relative inversion. In the RF domain, it is difficult to achieve near-perfect replication of a signal over a wide range of frequencies. However, optical components may be configured to achieve near perfect replication and inversion during an inversion and recombination process.

Figure 2:
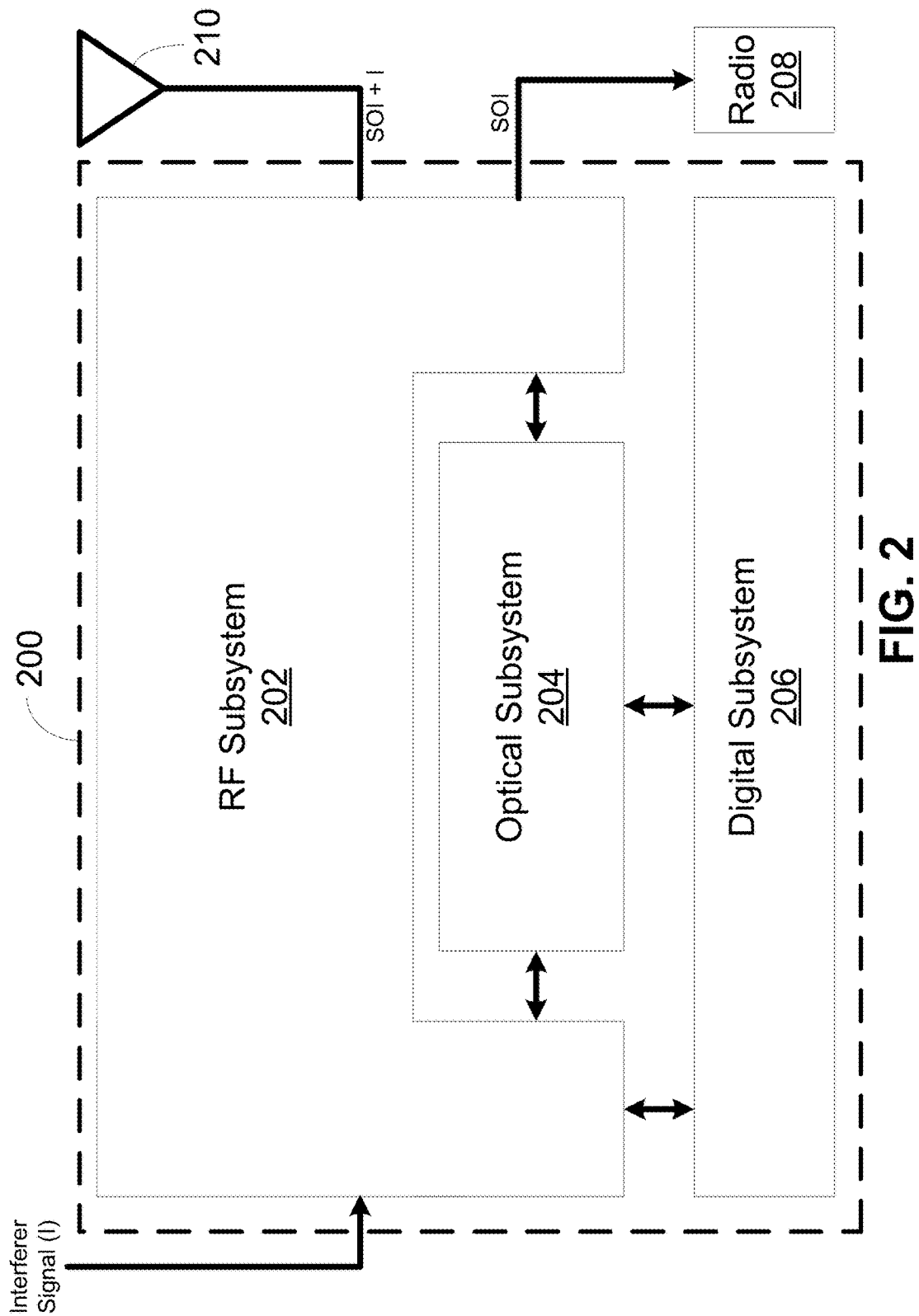
FIG. 2 is a system diagram of an example interference cancellation system.

FIG. 2 illustrates an example ICS 200. For example, ICS 200 may include one or more of RF Subsystem 202. Optical Subsystem 204, and/or Digital Subsystem 206. RF Subsystem 202 may be operably coupled to one or more antennas 210. One or more antennas 210 may be used by Radio 208 for transmitting and/or receiving signals from remote radios. For example, a signal of interest (SOI) plus the Interferer Signal (I) (e.g., SOI+I) may be received via one or more antennas 210 and provided to ICS 200 (e.g., RF Subsystem 202). RF Subsystem 202 may also receive a copy of the Interferer Signal (I) as an input in addition to the combined SOI+I signal received via the one or more antennas 210. For example, ICS 200 may be operably coupled to a jammer that produces the Interferer Signal (I), and the output of the jammer may be provided to ICS 200 via a physical connection (e.g., via a coupler of FIG. 1).

In an example, ICS 200 may receive the Interferer Signal via a second antenna and/or a plurality of second antennas (not shown in FIG. 2). One or more of RF subsystem 202 and/or Digital Subsystem 206 may be configured to determine an estimate of the Interferer Signal (I) based on a signal received via one or more one or more antennas 201 and/or the second antenna and/or the plurality of second antennas. The estimate off the interferer signal may then be utilized by the ICS. One or more of RF Subsystem 202, Optical Subsystem 204, and/or Digital Subsystem 206 may be configured to utilize knowledge of the Interferer Signal (I) to cancel Interferer Signal from the combined SOI+I signal received via the one or more antennas 210. The result of the cancellation may be the SOI. RF Subsystem 202 may send the SOI to Radio 208 that is operably coupled to the RF subsystem for further reception processing (e.g., demodulation, decoding, etc.).

As an example, many common types of jammers are configured to saturate receivers operating at or near 300 MHz. For example, such jammers may be designed to prevent communications that utilize frequencies in or around 300 MHz (e.g., garage door openers). Typical broadband, noise-like jammers in this range may output signals with power levels of approximately 100 W (50 dBm) over a 300 MHz to 400 MHz bandwidth. However, such a jammer may prevent communication over a large portion of the 225 MHz to 512 MHz UHF communications band as well as a major portion of the 292 MHz to 318 MHz UHF Satellite Communication (SATCOM) band, in addition to the desired 300

MHz cancellation. The +50 dBm 100 MHz broadband noise may be equivalent to a 15 dBm noise signal over a plurality of 25 kHz communications channels. Assuming 20 dB of antenna coupling loss between a jammer and ICS 200, the jamming signal (e.g., Interferer Signal (I)) reaching the radio transceiver antenna may be expected to be around −5 dBm over the 25 kHz channel. For example, 20 dB antenna coupling estimate for 300 MHz operation may be estimated using two quarter wave monopoles separated by three wavelengths over a perfect ground plane. This level of interference may be more than sufficient to jam communications in this band, assuming transceiver sensitivity between −110 dBm and −120 dBm for 10 dB signal-to-noise and distortion ratio (SINAD), depending on the operating mode and application.

Optical cancellation techniques may offer broadband interference cancellation with a significantly greater depth than conventional RF cancellation. Optical Subsystem 204 may be configured to perform interference cancellation using optical interference cancellation techniques. For example, for a 100 MHz broadband jamming signal, over 30 dB of interference cancellation may be obtained using optical techniques. Optical cancellation is typically more effective than RF cancellation alone, for example due to the higher bandwidth of operation and much lower amplitude and/or frequency dispersion in optical components as compared to RF components. An optical link between a received and sampled jammer output (e.g., the sampled jammer signal) and ICS 200 may reduce directly coupled jammer power, preventing the jammer signal from reaching the transceiver antenna input. Optical cancellation does not suffer from RF leakage into an RF interference cancellation system, which may create offsets that reduce effective jammer cancellation in the ICS.

By cancelling the majority of the interferer signal in the optical domain, ICS 200 may allow communication systems to perform simultaneous jamming and operative communication in the jammed frequency range. This optical cancellation technique may utilize active cancellation between jammers (e.g., counter-IED jammers) and radio systems to prevent self-interference. The ICS may also be applied to commercial systems suffering from saturated receivers. Optical interference cancellation may allow for processing an extremely wide range of frequencies with minimum distortion. The optical components may allow for multiple orders of magnitude in bandwidth, as well as lower amplitude and phase fluctuation.

For an active interference implementation, the interfering signal may be accurately estimated or sampled in real time. A copy of the clean transmit signal from any jammer or interferer may be obtained using direct coupling or magnetic coupling with an electromagnetic interference (EMI) probe and/or current probe. In the case of a remote jammer (e.g., the jammer is not directly or physically connected to the ICS), a copy of the jamming signal may be obtained by accurately estimating the jammer signal using a signal received via an antenna.

Figure 3A:
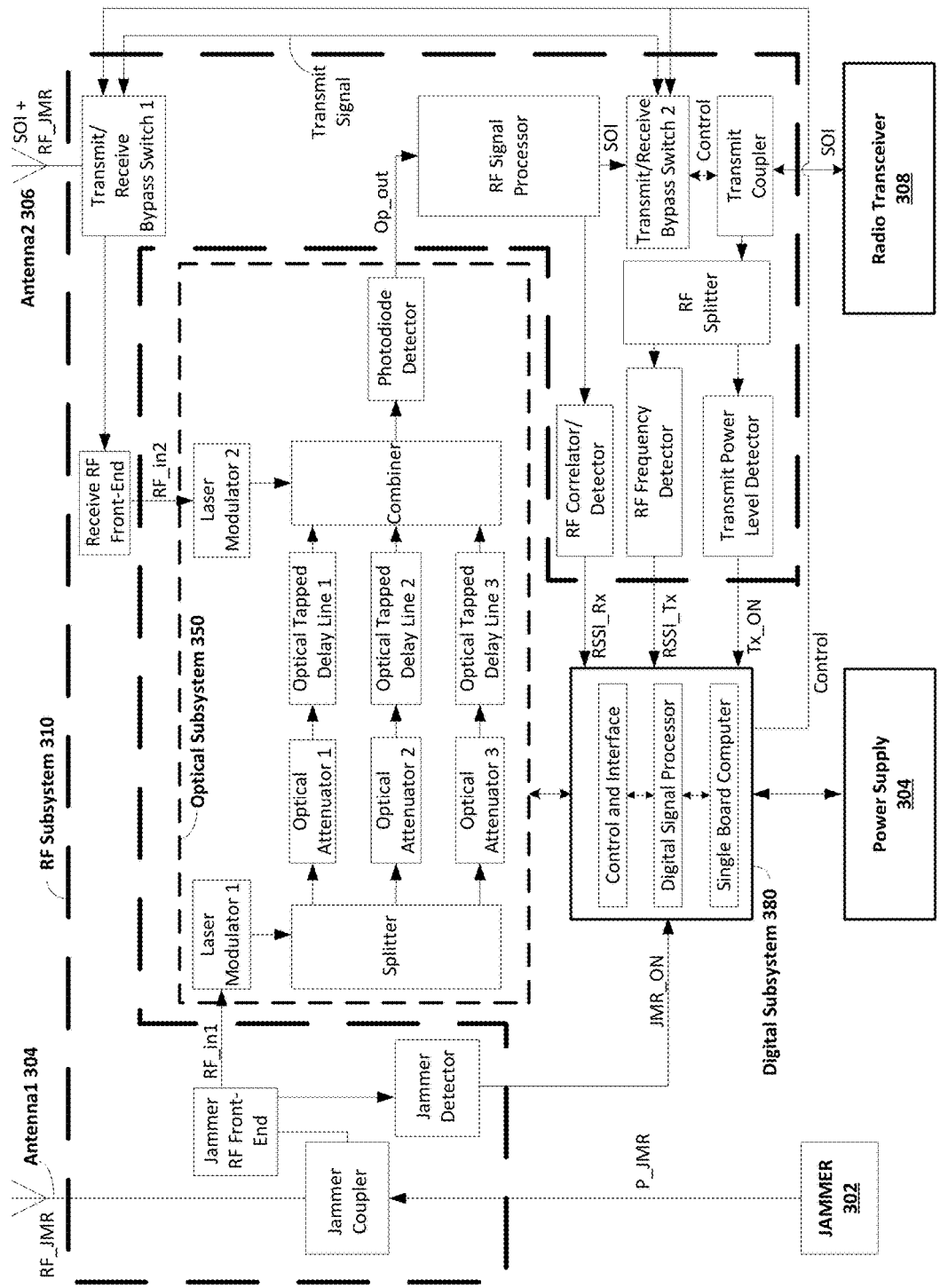
FIG. 3A illustrates an example system architecture for an ICS.

FIG. 3A illustrates an example system architecture for an ICS. For example, an ICS may include one or more of RF Subsystem 310, Optical Subsystem 350, and/or Digital Subsystem 380. Power Supply 304 may provide power to one or more of RF Subsystem 310, Optical Subsystem 350, and/or Digital Subsystem 380. As shown in FIG. 3A, Jammer 302 may be operably coupled to RF Subsystem 310. RF Subsystem 310 may include one or more RF processing components, and the components and functionality of RF Subsystem 310 are described in more detail with respect to FIG. 3C. Additionally, Jammer 302 may be operably coupled to one or more antennas (e.g., Antenna1 304). Jammer 302 may be coupled to the one or more antennas (e.g., Antenna1 304) via RF Subsystem 310. For example, a jammer coupler with RF Subsystem 310 may be used so that the ICS may be quickly inserted between an operational jammer and an antenna used to transmit the jammer signal. P_JMR may represent the jammer signal prior to being transmitted by the one or more antennas (e.g., Antenna1 304). RF_JMR may represent the RF jammer signal transmitted via the one or more antennas (e.g., Antenna1 304).

In the example shown in FIG. 3A, Jammer 302 may be physically connected to RF Subsystem 310 in order for RF Subsystem 310 to obtain a sample or copy of the jammer signal. A copy of the transmitted jammer signal (e.g., RF_JMR) may be used as an input to the interference cancellation system. For example, one or more components of RF Subsystem 310 (e.g., Jammer RF Front-End processing component(s), Jammer Detector components, etc.) may perform RF processing on the sample/copy of the jammer signal (e.g., RF_JMR) in order to filter the jammer signal and/or detect jammer operation prior to processing by Optical Subsystem 350. Such Jammer signal pre-processing will be described in more detail with respect to FIG. 3C.

When Jammer 302 is in use, jammer detection component(s) of RF Subsystem 310 may send an indication that Jammer 302 is in operation to Digital Subsystem 380 via the JMR_ON signal. The ICS may be configured to determine to begin interference cancellation based on the concurrent detection of Jammer 302 transmission and lack of transmission by Radio Transceiver 308. For example, Radio Transceiver 308 may be any radio system that may experience interference due to transmissions from Jammer 302. Radio Transceiver 308 may be configured to perform receive and/or transmit processing of RF signals transmitted via one or more antennas (e.g., Antenna2 306). To prevent interference from Jammer 302 from saturating Radio Transceiver 308 during periods where it is attempting to receive an SOI via Antenna2 306, an ICS may be inserted between Radio Transceiver 308 and Antenna2 306. The ICS may receive a signal comprised of the combination of the SOI and the Interferer Signal (I) (e.g., SOI+RF_JMR) via Anetnna2 306 and may remove a large majority of the Interferer Signal (I) (e.g., RF_JMR) such that the SOI may be passed to Radio Transceiver 308 for further processing.

After performing RF preprocessing on the sampled jammer signal (e.g., RF_JMR), RF Subsystem 310 may send a copy of the Jammer signal to Optical Subsystem 350 in order for Optical Subsystem 350 to perform cancellation of the jammer signal from the signal that is received via Antenna2 306. For example, RF_in1 may represent the copy of the jammer signal (e.g., RF_JMR) provided to Optical Subsystem 350. Operation of Optical Subsystem 350 will be described in more detail with respect to FIG. 3B.

In an example, Antenna2 306 may be configured to receive a signal of interest from a remote radio (e.g., SOI). While Jammer 302 is in operation, the jammer signal (e.g., RF_JMR) may interfere with SOI such that Antenna2 306 receives the signal SOI+RF_JMR. RF Subsystem 310 may perform RF preprocessing on the signal received via Antenna2 306 (e.g., SOI+RF_JMR) prior to sending the combined jammer and SOI signal to Optical System 350 for interference cancellation. For example, RF Subsystem 310 may be configured to perform some initial cancellation of the jammer signal (e.g., RF_JMR) from the combined jammer and SOI signal (e.g., SOI+RF_JMR) prior to sending the signal to Optical Subsystem 350. RF Subsystem 310 may also perform other signal processing and filtering on the combined jammer and SOI signal (e.g., SOI+RF_JMR) as is described with respect to FIG. 3C prior to sending the combined jammer and SOI signal (e.g., SOI+RF_JMR) to Optical Subsystem 350. The signal representing the combined jammer and SOI signal (e.g., SOI+RF_JMR) sent from RF Subsystem 310 to Optical Subsystem 350 may be represented as RF_in2.

Optical Subsystem 350 may receive a copy of the (e.g., pre-processed) jammer signal (e.g., RF_in1) and a copy of the (e.g., pre-processed) combined jammer and SOI signal (e.g., RF_in which may correspond to the combined jammer plus SOI signal—SOI+RF_JMR) from RF Subsystem 310. Optical Subsystem 350 may be configured to cancel most or all of the interferer signal (e.g., RF_in1) from the combined jammer and SOI signal (e.g., RF_in2). The optical interference cancellation process may be described in more detail with respect to FIG. 3B. Generally, each of the interferer signal (e.g., RF_in1) and the combined jammer and SOI signal (e.g., RF_in2) may be converted from the RF domain to the optical domain. One of the two signals (e.g., RF_in1 or RF_in2) may be inverted during the optical conversion process. One or more optical paths (e.g., an optical path may include one or more optical attenuators and one or more optical delay lines) may be used to attenuate and/or delay the optically converted jammer signal. Optical Subsystem 350 may be controlled by Digital Subsystem 380 to variably attenuate and/or delay the optical version of the jammer signal to achieve maximum cancellation. Digital Subsystem 380 may control the variable attenuation and or variable delays applied by Optical Subsystem 350 based on the output of Optical Subsystem 350 and processing performed by RF Subsystem 310.

The variably attenuated and variably delayed optical version of the jammer signal may then be combined with the optically converted combined jammer and SOI signal. One of the variably attenuated and variably delayed optical version of the jammer signal and the optically converted combined jammer and SOI signal may be inverted prior to being combined by Optical Subsystem 350. The resultant signal may be an optical version of the SOI (or nearly so), provided that correct attenuation and/or delays were applied to the optical jammer system. The optical version of the SOI may then be converted back to the RF domain and output by Optical Subsystem 350 for further processing by RF Subsystem 310. RF Subsystem 310 may perform further processing on the output of Optical Subsystem 350 in order to provide additional information that may be used by Digital Subsystem 380 for controlling Optical Subsystem 350. The RF version of the SOI signal may then be sent from RF Subsystem 310 to Radio Transceiver 308.

Figure 3B:
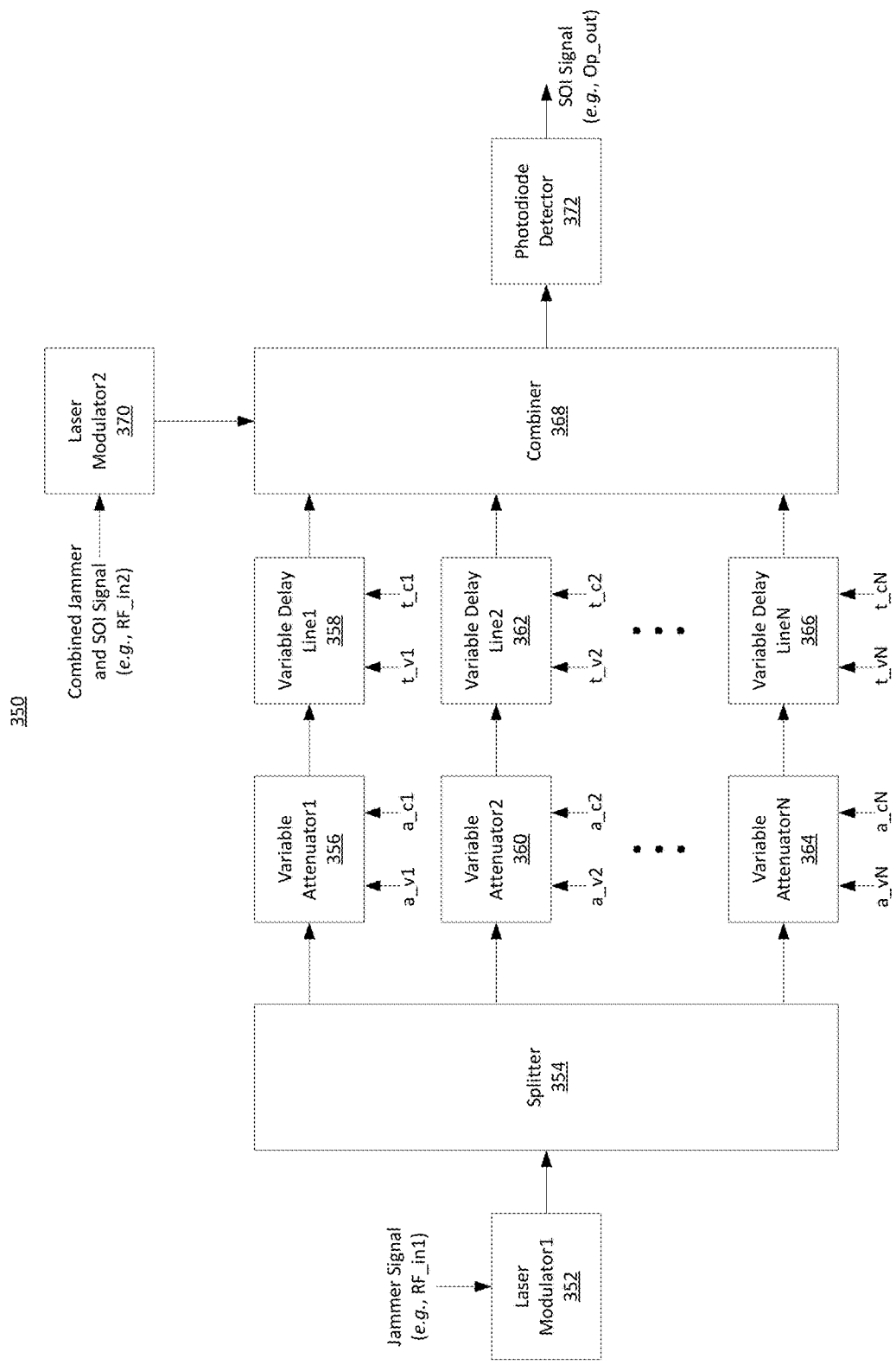
FIG. 3B illustrates an example architecture of an Optical Subsystem of an ICS.

FIG. 3B illustrates an example architecture of Optical Subsystem 350. The RF jammer signal (e.g., RF_in1) may be received from RF Subsystem 310 via Laser Modulator1 352. The terms laser modulator, optical modulator, and/or optical transmitter module may be used interchangeably herein. For example, Laser Modulator1 352 may be a laser modulator that performs a −180 degree optical phase shift on the jammer signal (e.g., RF_in1) during the RF-to-optical conversion process. The result of the −180 phase shift to the jammer signal during RF-to-optical conversion may be referred to herein as the optically inverted jammer signal. The RF-to-optical conversion may be realized using one or more laser modulators. In an example, the optical transmitters/laser modulators may utilize a counter phase Mach-Zehnder modulator (MZM) in order to convert the RF signal to optical signals. In another example, the optical transmitters/laser modulators may utilize direct modulation from RF to optical as described herein. Laser Modulator1 352 may provide RF amplitude and phase tracking, minimal DC offset, and/or reduced distortion at the Photodiode Detector output (e.g., output of Photodiode Detector 372). The phase shifter (e.g., −180 phase shift) may be implemented as part of Laser Modulator1 352 and/or may be a separate component.

The optically inverted jammer signal output from Laser Modulator1 352 may be sent to Splitter 354. For example, the optically inverted jammer signal may be split into a plurality of separate optical processing paths for further processing. Each optical processing path may be individually attenuated and/or individually delayed. For example, a first optical processing path from Splitter 354 may include Variable Attenuator1 356 and/or Variable Delay Line1 358. The variable attenuation and variable delay utilized by the optical processing paths of Optical Subsystem 350 are described in more detail below. Control signals that control the operation of the components of the first optical processing path (e.g., Variable Attenuator1 356 and/or Variable Delay Line1 358) may be provided by Digital Subsystem 380. For example, a_c1 may be a control signal from Digital Subsystem 380 that controls the amount by which Variable Attenuator1 356 attenuates the optically inverted jammer signal sent from Splitter 354 over the first optical processing path. Similarly, t_c1 may be a control signal from Digital Subsystem 380 that controls the amount by which Variable Delay Line1 358 delays the optically inverted jammer signal sent from Splitter 354 over the first optical processing path. The amount of attenuation and/or the amount of time delay may be controlled in order to achieve a desired or maximum amount of interference cancellation.

As may be appreciated, embodiments contemplate that the optically inverted jammer signal may be split by Splitter 354 into any number of separate optical processing paths for attenuation and delay based on the desired level of cancellation and operating environment. For example, each optical processing path (e.g., an optical attenuator and/or an associated optical delay line) may be used to cancel a different interference signal(s) and/or different components of an interfering signal. For example, a first optical processing path may be configured to cancel the direct line interferer signal. A second optical processing path may be configured to cancel a first multipath propagation of the interferer signal. An Nth (e.g., where N may be an integer) optical processing path may be configured to cancel an Nth multipath propagation of the interferer signal, etc. In an example, each optical processing path may be configured to cancel a different interferer. The optical attenuation weight and/or the optical delay line weight of each of the optical processing paths may be different depending on the type of cancellation desired.

Each optical processing path may be associated with different control signals from Digital Subsystem 380. For example, a second optical processing path may include Variable Attenuator2 360 and/or Variable Delay Line2 362. An Nth optical processing path may include Variable AttenuatorN 364 and/or Variable Delay LineN 366. Digital Subsystem 380 may control the operation of the components of each of the optical processing paths to achieve a desired level of interference cancellation. For example, Variable Attenuator1 356 may be controlled with signal a_c1, Variable Attenuator2 360 may be controlled with signal a_c2, and/or Variable AttenuatorN 364 may be controlled with signal a_cN. Similarly, Variable Delay Line1 358 may be controlled with signal t_c1, Variable Delay Line2 362 may be controlled with signal t_c2, and/or Variable Delay LineN 366 may be controlled with signal t_cN.

Power may be provided to the components of Optical Subsystem 350 by Power Supply 304. In an example, the power may be routed to the components of Optical Subsystem 350 from RF Subsystem 310 and/or from Digital Subsystem 380. In an example, there may be a direct connection from Power Supply 304 to Optical Subsystem 350. The power signal for Variable Attenuator1 356 may be signal a_v1, the power signal for Variable Attenuator2 360 may be signal a_v2, and the power signal for Variable AttenuatorN 364 may be signal a_vN. The power signal for Variable Delay Line1 358 may be signal t_v1, the power signal for Variable Delay Line2 362 may be signal t_v2, and the power signal for Variable Delay LineN 366 may be signal t_vN. Power Supply 304 may also supply power to one or more other components of Optical Subsystem 350, for example one or more of Laser Modulator1 352, Splitter 354, Combiner 368, Laser Modulator2 370, Photodiode Detector 372, and/or the like.

In an example, the optically inverted jammer signal may be processed by one or more optical processing paths prior to being combined with an optically converted version of the combined jammer and SOI signal. For example, the combined jammer+SOI signal RF_in2) may be converted from RF to the optical domain by Laser Modulator2 370. Laser Modulator1 352 and Laser Modulator2 370 may be two matched laser modulators such that coherent optical cancellation may be performed. For example, Laser Modulator1 352 may be configured to invert the jammer signal during the RF-to-optical conversion process such that the optically inverted jammer signal may be combined optically with the optically converted combined jammer and SOI signal to result in cancellation of the RF_JMR signal such that the SOI signal can be isolated. An optical signal that is optically phase shifted by −180 degrees that is combined with an unshifted version of the same optical signal may result in complete destructive interference/complete cancellation if the phase shift is ideal. Phase shifting in the optical domain may achieve near ideal results across a wide frequency range.

Thus, after the optically inverted jammer signal is processed by the variable attenuator(s) and/or variable delay line(s), for example to properly scale and time-align the optically inverted jammer signal with the optically converted combined jammer and SOI signal, the output of the optical processing lines may be combined with the optically converted combined jammer and SOI signal at Combiner 368. If values for variable attenuation and/or variable delays were properly selected, the combining of the optical signals should result in the cancellation of the jammer signal from the combined jammer and SOI signal. This optical version of the SOI signal may be sent to Photodiode Detector 372 for further processing and conversion back to the RF domain. The SOI signal (e.g., Op_out) may then be sent back to RF Subsystem 310 for further processing. For example, signal Op_out may be tested to determine whether a desired level of interference cancellation has been achieved. An RF Correlator/Detector 338 (e.g., FIG. 3C) may be used to determine the level of interference cancellation, for example by associating the relative power level of the Op_out signal with the level of interference cancellation. Digital Subsystem 380 may determine whether the signal output from the optical subsystem representing the SOI signal (e.g., Op_out) meets a threshold signal-to-noise (SNR) level. For example, if the Digital Subsystem determines that the SNR of the Op_out signal is 10 dB or greater, then it may be determined that the interference from the jammer has been sufficiently cancelled and the resultant SOI signal (e.g., Op_out) may be sent to the radio Transceiver 308 (e.g., FIG. 3A).

Figure 3C:
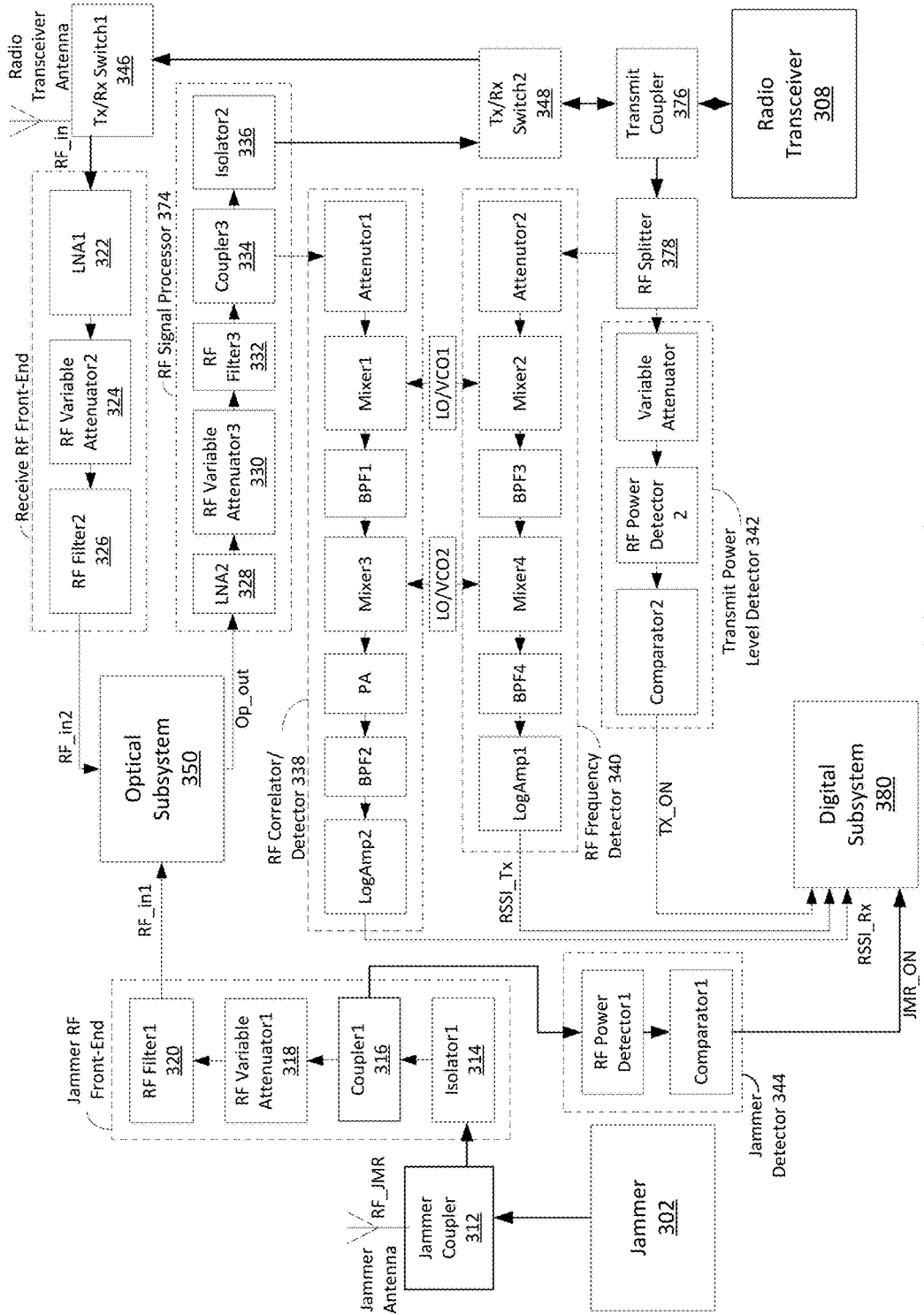
FIG. 3C illustrates an example architecture of an RF Subsystem of art ICS.

FIG. 3C is an example system diagram of RF processing components that may be included in RF Subsystem 310. For example, an interferer signal may be sent from Jammer 302 to Jammer Coupler 312. Jammer Coupler 312 may split the interferer signal from Jammer Coupler 312 such that the signal may be transmitted via the jammer antenna and a sample or copy of the signal may be used for interference cancellation by the ICS. Jammer Coupler 312 may provide an accurate sample of the jammer signal to the Jammer RF Front-End Processing components. Jammer Coupler 312 may be an RF coupler, for example with a coupling factor in the range of 20 to 50 dB depending on the jammer output power. In an example, a sample of the jammer signal may be obtained using a current probe that is operably coupled to the jammer antenna.

Jammer Coupler 312 may send a sample of the jammer signal to be transmitted over the jammer antennas to one or more jammer RF front-end processing components. Example RF front-end processing components may include one or more of variable attenuator(s), a low noise amplifier(s), RF bandpass filter(s), coupler(s), isolator(s) and/or tunable RF filter(s). The jammer RF front-end components may be configured to filter the jammer signal prior to processing by the Optical Subsystem. For example, Jammer RF Front End may be configured to prevent the generation of additional harmonics and/or intermods of the jammer signal within the ICS.

For example, as illustrated in FIG. 3C, a copy of the jammer signal may be received at Isolator1 314 of the jammer RF front-end. Isolator1 314 may be a passive device that may be used to prevent jammer and/or other RF signals from being affected by excessive signal reflection from the RF processing components and/or to control the direction of signal flow in the RF subsystem. Isolator1 314 may pass a copy of the jammer signal to Coupler1 316. Coupler1 316 may be configured to send a copy of the jammer signal to Jammer Detector 344. Jammer Detector 344 may be configured to detect when the jammer is in operation. For example, when the jammer is in use, Jammer Detector 344 may indicate to Digital Subsystem 380 that the jammer is on using signal JMR_ON. The ICS (e.g., Digital Subsystem 380) may be configured to determine to begin interference cancellation based on the concurrent detection of Jammer transmission (e.g., based on JMR_ON) and lack of transmission by Radio Transceiver 308.

Jammer Detector 344 may be configured to automatically detect when the Jammer begins transmission. For example, Jammer Detector 344 may include an RF Power Detector (e.g., RF Power Detector1) and/or a comparator (e.g., Comparator1). The comparator may be used to set the threshold power level used to determine whether Jammer 302 is currently transmitting/operating. The comparator may be an RF component that compares two voltages and/or two currents and outputs an indication of which of the two inputs are larger. For example, the comparator may set a power level threshold, above which it is assumed Jammer 302 is in operation, below which it is assumed that jammer 302 is not in operation. RF Power Detector1 of Jammer Detector 344 may be configured to detect the jammer signal and/or the power level of the jammer signal and send an indication of the power level to comparator1 of Jammer Detector 344. The comparator1 may be configured to compare the received power level to a power level threshold. For example, the power level threshold may be +24 dBm, although the power level may vary depending on the configuration and properties of Jammer 302. If the received power level exceeds the power level threshold, then Comparator1 of Jammer Detector 344 may send an indication that Jammer 302 is currently transmitting to Digital Subsystem 380, for example via the JMR_ON signal. If the received power level does not exceed the power level threshold, then Comparator1 of Jammer Detector 344 may send an indication that Jammer 302 is not currently transmitting (e.g., is turned off) to Digital Subsystem 380, for example via the JMR_ON signal.

One or more jammer RF front-end components may be configured to perform initial interference cancellation processing on the jammer signal prior to further interference cancellation processing in Optical Subsystem 350. For example, RF Variable Attenuator1 318 may be a variable RF attenuator that is controlled by Digital Subsystem 380. For example, control signal CTRL_AT1 may be used by Digital Subsystem 380 to control RF Variable Attenuator 318 (e.g., not shown in FIG. 3C). By varying the attenuation level of RF Variable Attenuator1 318 prior to sending the jammer signal to Optical Subsystem 350, Digital Subsystem 380 may selectively perform initial interference cancellation processing in the RF domain prior to further processing in the optical domain. Control of RF Variable Attenuator 318 by Digital Subsystem 380 (e.g., using CTRL_AT1) may be based on feedback received by Digital Subsystem 380 from one or more of RF Correlator/Detector 338, RF Frequency DetectorRSSI 340, and/or Transmit Power Level Detector 342. The variably attenuated RF jammer signal may then be sent to RF Filter1 320. RF Filter1 320 may include one or more of a fixed RF filter and/or a variable RF filter for processing the jammer signal. RF Filter1 320 may send the preprocessed jammer signal (e.g., RF_in1) to optical subsystem 350 for further interference cancellation processing.

Transmit/Receive Switch1 346 may be operably coupled to Antenna2 306 and may send SOI+RF_JMR to the Receive RF Front-End component of the RF Subsystem. The Receive RF Front-End components may include one or mom variable/tunable attenuator(s), low noise amplifier(s) (LNAs), fixed RF filer(s), and/or variable RF filter(s). For example, LNA1 322 may amplify the signal received via Antenna2 306 and send the amplified signal to RF Variable Attnuator2 342. RF Variable Attnuator2 342 may be a controllable/tunable attenuator that is controlled by Digital Subsystem 380, for example using control signal CTRL_AT2. Digital Subsystem 380 may be configured to vary the attenuation level of RF Variable Attenuator2 342 in order perform initial interference cancellation processing of the combined jammer and SOI signal. The variably attenuated jammer and SOI signal may then be send to RF Filter2 326. RF Filter2 326 may include a fixed RF bandpass filter and/or tunable RF filter to process and filter the combined jammer and SOI signal prior to processing in Optical Subsystem 350. The RF pre-processed combined jammer and SOI signal (e.g., RF_in2) may then be sent to Optical Subsystem 350 for further interference cancellation processing.

Optical Subsystem 350 may receive the RF pre-processed jammer signal (e.g., RF_in1) and the RF pre-processed combined jammer and SOI signal (e.g., RF_in2), may convert the signals from the RF domain to the optical domain, and may perform further interference processing (e.g., variable attenuation and/or inserting variable time delays) prior to combining the optically converted signals to achieve interference cancellation (See e.g., FIG. 3B). The resultant signal representing the SOI may be converted back to the RF domain and sent to RF Signal Processor 374 (e.g., signal Op_out). Op_out may represent any residual interference signal(s) present at the photodiode detector output (e.g., if the interferer signal was not completely cancelled) and the SOI, and Op_out may be sent to RF Signal Processor 374. The SOI and the residual jammer signal at the output of Optical Subsystem 350 (e.g., Op_out) may be processed and filtered by RF Signal Processor 374 prior to being sent to one or more of RF Correlator/Detector 338 (e.g., an RF Power Meter) and/or Transmit/Receive Switch2 348.

RF Signal Processor 374 may include one or more of fixed RF filter(s), low noise amplifier(s) (LNA(s)), fixed attenuator(s), variable attenuator(s), coupler(s), isolator(s), and/or other RF processing components, for example depending on the application of the ICS. RF Signal Processor 374 may be configured to process the output of Optical Subsystem 350 with minimal effect on the SOI. For example, when Optical Subsystem 350 acts to cancel the interferer signal to obtain a clean version of the SOI, Optical Subsystem may introduce noise and/or attenuate the signal of interest during the interference cancellation process. In order to provide additional gain to the SOI after cancellation, RF Signal Processor 374 may be applied to the output of Optical Subsystem 350. For example, RF Signal Processor 374 may utilize LNA2 328 to increase the power level of the SOI without further accentuating the noise that may have been introduced to the signal. In an example, RF Signal Processor 374 (e.g., and/or one or more of the receive RF front-end components or the jammer RF front-end components) may be configured to be linear devices in order to avoid introducing distortion to the signal of interest.

After processing by LNA2 328, the signal representing the SOI plus any residual interference may be sent to RF Variable Attenuator3 330. RF Variable Attenuator3 330 may be a variable attenuator controlled by Digital Subsystem 380, for example using control signal CTRL_AT3. Digital Subsystem 380 may variably attenuate the signal representing the SOI plus any residual interference using RF Variable Attenuator3 330, for example to determine when Radio Transceiver 308 is operating in transmit mode. The variably attenuated signal representing the SOI plus any residual interference may then be filtered by RF Filter3 334 to further remove one or more noise components that may have been introduce by optical Subsystem 350. The signal representing the SOI plus any residual interference may then be sent to Coupler3 334, which may send a copy of the signal to each of RF Correlator/Detector 338 and/or Isolator2 336. Isolator2 336 may isolate the RF signal (e.g., prevent reflection, etc.), and send a copy of the signal to Transmit/Receive Switch 348. Depending on the configuration and/or current mode of operation of the ICS, the signal (which may represent the SOI if most or all of the interferer signal was successfully cancelled) may be passed to Radio Transceiver 308 for further processing.

RF Signal Processor 374 may send the filtered SOI and residual interference signal to RF Correlator/Detector 338. RF Correlator/Detector 338 may send an RF correlator output signal (e.g., RSSI_Rx) to Digital Subsystem 380. The RF correlator output signal may be used by Digital Subsystem 380 to control the amplitude of one or more variable attenuators (e.g., RF variable attenuators and/or optical variable attenuators of Optical Subsystem 350) and/or time delay and/or phase of variable time delay units. The signal RSSI_Rx may be a received signal strength indication (RSSI) of any resultant interference signal as detected by the RF Correlator/Detector (e.g., plus the SOI). For example, the signal RSSI_Rx may be considered a measure of the cancellation depth of the ICS. For example, when RSSI_Rx is minimized, the cancellation depth of the ICS may be considered to be maximized (e.g., the cancellation of the jammer signal may be maximized). When RSSI_Rx is high or maximized, the cancellation depth of the ICS may be considered to be minimal (e.g., the jammer signal may be essentially uncancelled). Thus, the signal RSSI_Rx may be considered a measure of the dynamic range of the ICS.

In an example, RF Correlator/Detector 338 may include one or more mixers with integrated synthesizers, fixed RF attenuators, bandpass filters, and/or LogAmps. The output signal RSSI_Rx may be measured continually during cancellation to determine the residual content of the cancelled jammer signal. If the signal RSSI_Rx is minimized, Digital Subsystem 380 may determine that the cancellation of the jammer has been maximized. When a cancellation threshold for RSSI_Rx is detected by Digital Subsystem 380 (e.g., the power level of RSSI_Rx falls below a threshold), Digital Subsystem 380 may control Transmit/Receive Switch 2 to send the clean SOI signal to Radio Transceiver 308 for signal processing and reception.

Digital Subsystem 380 may be configured to implement a control loop that utilizes the output of RF Correlator/Detector 338 as feedback for determining appropriate value for the attenuator gains and/or time delays of Optical Subsystem 350 and/or for the attenuation gains of one or more RF variable attenuators. These parameters may be stepped and/or varied in order to minimize RF Correlator/Detector 338 output. Additionally, changes in RF Correlator/Detector 338 RSSI output levels detected in response to changes in attenuation and/or time delay may be used as feedback rather than or in addition to the overall magnitude of the RF Correlator/Detector 338 RSSI output. Since the SOI may be associated with power levels that are orders of magnitude smaller than that of the jammer signal (e.g., Jammer 302 may operate on the order of +50 dBm (e.g., −5 dBm per 25 kHz channel) while the SOI may be on the order of −60 dBm or lower. Since RF Correlator/Detector 338 output may be considered a measure of RF power at the frequency of the SOI, reductions in the power level of RF Correlator/Detector 338 output may be mainly due to the cancellation of the jammer signal from the combined jammer plus SOI signal. DC offsets, if present in the control loop, may have little to no effect on the cancellation efficiency (e.g., do not reduce the cancellation efficiency) because, the DC offset may be constantly added to RF Correlator/Detector 338 output value and hence may not affect the difference in power levels utilized by the control loop during ICS operation. These DC offsets may be due to electronic component DC offsets as well as background noise presence in the RF signal at the input of the power meter. The interference cancellation attenuation may be a function of the power meter dynamic range and/or SOI bandwidth.

Although the ICS interfaces with Radio Transceiver 308 that is used to transmit and/or receive SOIs, the transmit output power and transmit frequency of Radio Transceiver 308 may be unknown to the ICS. For example, the ICS may be configured to be attached to wide range of radio types (e.g., utilizing different frequencies and/or band widths), and thus the ICS may be configured to determine the frequency of operation for a given Radio Transceiver 308 and/or to determine when Radio Transceiver 308 is in transmitting mode. In an example, the components of RF Subsystem 310 may be configured to automatically detect the transmit output power and frequency of Radio Transceiver 308. For example, Transmit Power Level Detector 342 may be configured to measure the transmit power of Radio Transceiver 308.

One or more of Transmit/Receive Switch1 346 and/or Transmit/Receive Switch2 348 may be controlled by Digital Subsystem 380 based on whether Radio Transceiver 308 is in transmit mode or receive mode. For example, when Radio Transceiver 308 begins to transmit (e.g., as detected by Transmit Power Level Detector 342), the signal to be transmitted may be sent from Radio Transceiver 308 to Transmit Coupler 376. Transmit Coupler 376 may send the signal to be transmitted to Transmit/Receive Switch2 348. Since Radio Transceiver 308 is in transmit mode, Digital Subsystem 380 may control Transmit/Receive Switch2 348 to send the transmit signal to Transmit/Receive Switch1 346. Since Radio Transceiver 308 is in transmit mode, Digital Subsystem 380 may control Transmit/Receive Switch1 346 to send the transmit signal to Antenna2 306 for transmission.

When Digital Subsystem 380 determines Radio Transceiver 308 is in receive mode (e.g., based on signals received from Transmit Power Level Detector 342), Digital Subsystem 380 may control the transmit/receive switches (e.g., Transmit/Receive Switch1 346 and/or Transmit/Receive Switch2 348) based on whether Jammer 302 is currently in operation. For example, if Radio Transceiver 308 is in receive mode (e.g., determined based on Transmit Power Level Detector 342 output) and Jammer 302 is on (e.g., determined based on Jammer Detector 344 output), Digital Subsystem 380 may control Transmit/Receive Switch1 346 to send the signal received via Antenna2 306 to receive RF front-end components for interference cancelation processing and may control Transmit/Receive Switch2 348 to send the output of RF signal Processor 374 to Transmit Coupler 376 for processing by Radio Transceiver 308. If Radio Transceiver 308 is in receive mode (e.g., determined based on Transmit Power Level Detector 342 output) and Jammer 302 is off (e.g., determined based on Jammer Detector 344 output), Digital Subsystem 380 may control Transmit/Receive Switch1 346 to send the signal received via Antenna2 306 directly to Transmit/Receive Switch2 348. Digital Subsystem 348 may then control Transmit/Receive Switch2 348 to send the output of RF signal Processor 374 to Transmit Coupler 376 for processing by Radio Transceiver 308.

In order to determine whether Radio Transceiver is transmitting and/or the frequency of operation of Radio Transceiver 308, Transmit Coupler 376 may send a copy of the signals to be transmitted to RF Splitter 378. RF Splitter 378 may split the transmission signal and forward the signal to RF Frequency Detector 340 and Transmit Power Detector 342.

RF Frequency Detector 340 may be configured to measure the received RF signal and/or a RF signal to be transmitted in order to determine the frequency of the signal. RF Frequency Detector 340 may include one or more mixer(s) with integrated synthesizer(s), fixed RF attenuator(s), bandpass filter(s), and/or LogAmp(s). RF Frequency Detector 340 may be configured to automatically detect the frequency by fast tuning of the synthesizers for a known, fixed frequency, which may be referred to as an IF frequency (e.g., an example IF fixed frequency may be 70 MHz). When a maximum output power is measured at the output of the LogAmp by Digital Subsystem 380, input frequency to RF Frequency Detector 340 may be determined by Digital Subsystem 380 based on knowledge of the known, fixed IF frequency and the current tuning levels of the local oscillators (e.g., components of the synthesizers).

The RSSI_TX signal may be received by Digital Subsystem 380 from RF Frequency Detector 340, and Digital Subsystem 380 may determine the frequency of the input of RF Frequency Detector 340 based on RSSI_TX and the tuning levels of the synthesizers. Transmit Power Level Detector 342 may be configured to automatically determine the transmission power of a signal being transmitted via Antenna 2 306. Transmit Power level Detector 342 may include one or more variable attenuator(s), an RF power detector(s), and/or comparator(s). The signals TX_ON and RSSI_TX may be utilized by Digital Subsystem 380 to determine parameters associated with Radio Transceiver 308 (e.g., power level and/or frequency) used for transmitting via Antenna2 306. If the transmit and receive frequencies are the same for Radio Transceiver 308, the knowledge of the transmit frequency may be used to effectively cancel the jammer at that frequency.

Figure 3D:
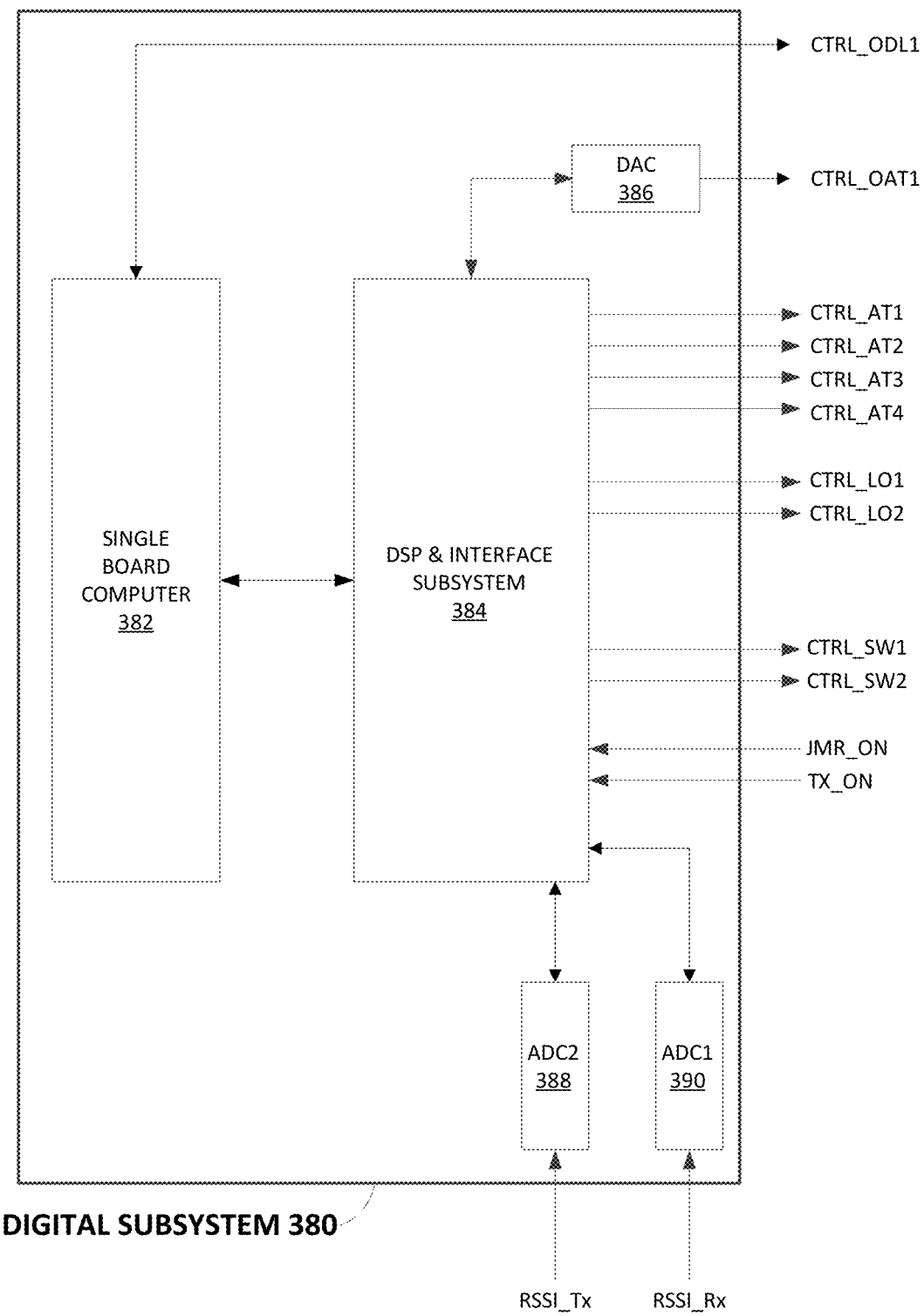
FIG. 3D illustrates an example architecture of a Digital Subsystem of an ICS.

FIG. 3D is a block diagram illustrating example components and example signals associated with Digital Subsystem 380. For example, Digital Subsystem 380 may include one or more field programmable gate array (FPGA)-Digital Signal Processing (DSP) circuits with a plurality of input and/or output (I/O) interfaces (e.g., DSP & Interface Subsystem 384). DSP & Interface Subsystem 384 may be an integrated circuit that may be configured to send and/or receive control signals in order to implement one or more of the methods and techniques described herein. For example, DSP & Interface Subsystem 384 may be configured to send and/or receive control signals to/from Optical Subsystem 350 and/or RF Subsystem 310. DSP & Interface Subsystem 384 may be implemented on a FPGA to implement control logic.

DSP & Interface Subsystem 384 may include Single Board Computer 382. Single Board Computer 382 may include a processor and/or memory. For example, Single Board Computer 382 may be configured to implement one or more of the methods and/or techniques described herein. For example, the memory of the Single Board Computer 382 may include processor readable instructions. The processor readable instructions may be executed by the processor in order to carry out one or more of the control methods described herein. For example, the control methods may include control of one or more RF components of the RF subsystem, control of one or more of the optical components of the optical subsystem, and/or control of components within Digital Subsystem 380 (e.g., DSP & Interface Subsystem 384). The memory of the Single Board Computer 382 may include any tangible and/or physical memory such as random access memory (RAM), read-only memory (ROM), volatile memory, and/or non-volatile memory. For example, the computer readable instructions may be loaded into RAM in the Single Board Computer and the instructions may be executed by the processor in order to perform one or more of the functions and/or methods described herein.

In an example, Digital Subsystem 380 may be configured to convert the signal RSSI_Rx from RF Subsystem 310 from the analog domain to digital domain, for example using an analog-to-digital converter (e.g., ADC1 390). Similarly, Digital Subsystem 380 may be configured to convert the signal RSSI_Tx from LogAmp2 442 of the RF Subsystem from the analog domain to digital domain, for example using an analog-to-digital converter (e.g., ADC2 388). In an example, the digital control signal for one or more of the optical attenuators included in Optical Subsystem 350 may be controlled by Digital Subsystem 380 using control signal CTRL_OAT1. Digital-to-analog converter (DAC) 386 may be utilized in order to control one or more optical attenuators of Optical Subsystem 350. The control signal CTRL_ODL1 may be generated by Single Board Computer 382 for the control of one or more optical delay lines of Optical Subsystem 350. As may be appreciated, although a single control signal for the attenuators of the optical weighting network of Optical Subsystem 350 is shown in FIG. 3D (e.g., CTRL_OAT1), more than one control signal may be used, for example to control the one or more optical attenuators. For example, CTRL_OAT1 may include the signals a_c1, a_c2, ... , a_cN etc. Similarly, although a single control signal for the delay lines of the optical weighting network of Optical Subsystem 350 is shown in FIG. 3D (e.g., CTRL_ODL1), more than one control signal may be used, for example to control the one or more optical delay lines. For example, CTRL_ODL1 may include the signals t_c1, t_c2, ... , t_cN etc.

The determination of when to begin or stop cancellation may be based on whether the jammer is currently in operation. For example, Digital Subsystem 380 may be configured to receive the signal JMR_ON from the RF Subsystem. The frequency of operation of the transceiver may be determined and/or measured by the Digital Control Subsystem. For example, the frequency of operation of the transceiver may be determined and/or measured by the Digital Subsystem based on the signal TX_ON, which may be received from the RF Subsystem.

Figure 4:
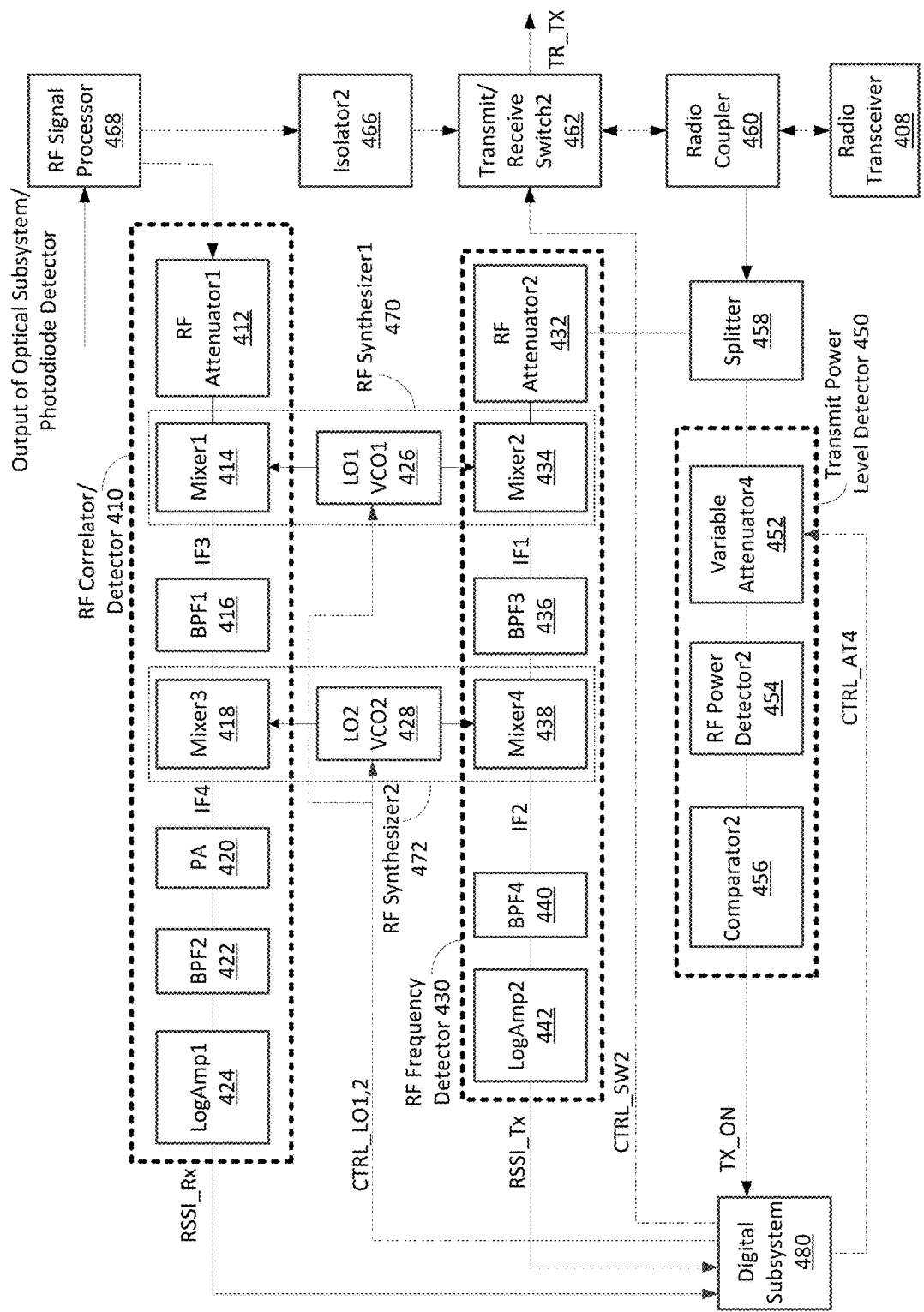
FIG. 4 is an example system diagram illustrating the functionality of an RF Correlator/Detector, an RF Frequency Detector, and a Transmit Power Level Detector portions of an RF Subsystem of an ICS.

Digital Subsystem 380 may be configured to send the control signals CTRL_SW1 and CTRL_SW2, for example to control Transmit/Receive Bypass Switch 1 and Transmit/Receive Bypass Switch 2, respectively (See e.g., FIG. 4). Digital Subsystem 380 may be configured to control the fast tuning of the first local oscillator (e.g., LO1/VCO1 426), for example using control signal CTRL_LO1. Digital Subsystem 380 may be configured to control the fast tuning of the second local oscillator (e.g., LO2/VCO2 428), for example using control Signal CTRL_LO2.

Digital Subsystem 380 may be configured to control one or more of attenuation levels of various RF and/or optical attenuators. For example, Digital Subsystem 380 may be configured to control Variable RF Attenuator1 318 in the Jammer RF Front-End component of the RF Subsystem, for example by sending signal CTRL_AT1 to Variable RF Attenuator1 318. Digital Subsystem 380 may be configured to control Variable RF Attenuator2 324 in the Receive RF Front-End component of the RF Subsystem, for example by sending signal CTRL_AT2 to Variable RF Attenuator2 324. Digital Subsystem 380 may be configured to control Variable Attenuator 3 in the RF Signal Processor component of the RF Subsystem (e.g., RF Varaible Attenuator3 330), for example by sending signal CTRL_AT3 to Variable Attenuator 3. Digital Subsystem 380 may be configured to control Variable Attenuator 4 in the Transmit Power Level Detector of the RF Subsystem (e.g., Variable Attenuator of Transmit Power Level Detector 342), for example by sending signal CTRL_AT4 to Variable Attenuator 4.

FIG. 4 is an example system diagram illustrating the functionality of the RF Correlator/Detector, the RF Frequency Detector, and the Transmit Power Level Detector portions of the RF Subsystem. For example, Transmit Power Level Detector 450 may be utilized to detect if the jammer is in operation and/or transmitting. RF Frequency Detector 430 may be utilized to automatically detect the frequency of Radio Transceiver 408. RF Frequency Detector 430 may be configured to detect transmit frequency of Radio Transceiver 408 and/or the receive frequency of Radio Transceiver 408. RF Correlator/Detector 410 may be utilized in order to measure the amount of cancellation achieved. RF Correlator/Detector 410 may also be referred to as an RF Power Meter, an RF Correlator, and RF Correlator Circuit, an RF Detector, an RF Detector Circuit, and/or the like.

The signals TX_ON and RSSI_Tx may be inputs that may be used by Digital Subsystem 480 of the ICS to determine the transmission power level and frequency of the radio transceiver. The ICS may provide an appropriate signal path from the radio transceiver to the antenna based on the two signals (e.g., through the Optical System or not through the Optical Subsystem).

For example, the SOI and-or the residual jammer signal at the output of the Photodiode Detector after cancellation in the Optical Subsystem may be an input to an RF Signal Processor 468. RF Signal Processor 468 may include one or more of a low noise amplifier(s) (LNA(s)), variable attenuator(s), RF filter(s), coupler(s), and/or the like. RF Signal Processor 468 may process the SOI/residual jammer signal received from the Optical Subsystem in order to achieve proper RF conditioning of the signal. RF Signal Processor 468 may be configured to linearly transform the signal in order to avoid introducing distortion to the SOI.

In an example, although the ICS may interface with Radio Transceiver 408, which may be a radio transceiver attempting to receive the signal of interest, the transmit output power and/or frequency of Radio Transceiver 408 may be unknown to the ICS. Therefore, the ICS may automatically detect the transmit output power and/or frequency of Radio Transceiver 408. For example, Transmit Power Level Detector 450 may be configured to automatically detect the transmit power level of Radio Transceiver 408. Transmit Power Level Detector 450 may be configured to send an indication of the transmit power level to Digital Subsystem 480, for example via the TX_ON signal.

For example, the timing associated with a transmission by Radio Transceiver 408 may be unknown to the ICS (e.g., Digital Subsystem, Optical Subsystem, and/or RF Subsystem). The RF Subsystem may include Transmit Power Level Detector 450, RF Frequency Detector 430, and/or RF Correlator/Detector 410. Digital Subsystem 480 may be configured to detect when Radio Transceiver 408 is transmitting based on the TX_ON signal received via Transmit Power Level Detector 450. Digital Subsystem 480 may control one or more transmit/receive paths (e.g., Transmit/Receive Switch2 462, etc.) based on whether Radio Transceiver 408 is in transmitting mode or receiving mode. For example, Radio Transceiver 408 may send a transmit signal to Radio Coupler 460 for transmission via an antenna (e.g., antenna not shown in FIG. 4). For example, Coupler 460 may send the transmit signal Transmit/Receive Switch2 462, which may send the signal to Transmit/Receive Switch1 (e.g., not shown in FIG. 4) to facilitate transmission of the signal TR_TX (e.g., the signal to be transmitted from Radio Transceiver 408) to be transmitted through the transceiver antenna.

A portion/sample/copy of the signal to be transmitted may be sent from Radio Transceiver 408 to Transmit Power Level Detector 450, for example via Radio Coupler 460 and/or Splitter 458. The signal received at Splitter 458 (e.g., Radio Transceiver 408 Input/Rx Signals and/or Radio Transceiver Output/Tx Signals) may be split at Splitter 458 and sent to each of Transmit Power Level Detector 450 and RF Frequency Detector 430.

For example, in order to determine whether Radio Transceiver 408 is operating in transmit mode. Transmit Power Level Detector 450 may compare the power level of the signal received from Radio Transceiver 408 (e.g., via Radio Coupler 460 and/or Splitter 458) to a predetermined power threshold level. If the received RF signal power is above the threshold, TX_ON may be used to indicate to Digital Subsystem 480 that the Radio is currently transmitting. If the received RF signal power is below the threshold, TX_ON may be used to indicate to Digital Subsystem 480 that the Radio is not currently transmitting.

For example, Digital Subsystem 480 may be configured to adjust and/or attenuate the signal received at Transmit Power Level Detector 450 from Radio Transceiver 408, for example using Variable Attenuator4 452. For example, control signal CTRL_AT4 may be sent from Digital Subsystem to Variable Attenuator4 452 in order to control the attenuation applied by Transmit Power Level Detector 450. In an example, Variable Attenuator4 452 may be configured to establish a threshold power level to be detected in Transmit Power Level Detector 450. For example, by varying the attenuation level of Variable Attenuator4 452, the minimum transmit power that triggers a determination that Radio Transceiver 408 is in transmitting mode may be varied. By increasing the attenuation, the threshold power level to trigger a determination that Radio Transceiver 408 is currently transmitting may be raised. Similarly, by decreasing the attenuation, the threshold power level to trigger a determination that Radio Transceiver 408 is currently transmitting may be lowered. In this manner, the ICS may be configured to detect whether various types of Radio Transceivers 408 are in transmitting mode even if the various types of Radio Transceivers 408 transmit at different power levels.

The output of Variable Attenuator4 452 may be sent to RF Power Detector2 454. RF Power Detector2 454 may be configured to detect an RF signal and/or the power level of the RF signal. RF Power Detector2 454 may send an indication of the RF power level that is detected to Comparator2 456, for example using a current and/or voltage signal. Comparator2 456 may establish the threshold power level used to determine whether Radio Transceiver 408 is currently transmitting/operating. Comparator2 456 may be an RF component that compares two voltages and/or two currents and outputs an indication which of the two inputs are larger.

For example, Comparator2 456 may set a power level threshold, above which it is assumed Radio Transceiver 408 is transmitting, below which it is assumed that Radio Transceiver 408 is not transmitting. Comparator 456 may be configured to compare the indication of the power level received from RF Power Detector2 454 to the power level threshold. For example, the power level threshold may be +24 dBm. If the received power level exceeds the power level threshold, then Comparator2 456 may send air indication that Radio Transmitter 408 is currently transmitting to Digital Subsystem 480, for example via the TX_ON signal. If the received power level does not exceed the power level threshold, then Comparator2 456 may send an indication that Radio Transmitter 408 is not currently transmitting (e.g., is in receiving mode) to Digital Subsystem, for example via the TX_ON signal.

Digital Subsystem 480 may control Transmit/Receive Switch1 (e.g., not shown in FIG. 4) and/or Transmit/Receive Switch2 462 based on the value of the TX_ON signal. For example, if the TX_ON signal indicates to Digital Subsystem 480 that Radio Transceiver 408 is currently transmitting, Digital Subsystem 480 may be configured to set the Transmit/Receive Switches 1 and/or 2 to provide a transmit path for signal TR_TX to reach the Transceiver Antenna for transmission to a remote transceiver. For example, Digital Subsystem 480 may be configured to control Transmit/Receive Switch2 462 using control signal CTRL_SW2. Similarly, Digital Subsystem 480 may be configured to control Transmit/Receive Switch 1 using control signal CTRL_SW1 (e.g., not shown in FIG. 4). If the TX_ON signal indicates that the Radio Transmitter is not currently transmitting, Digital Subsystem 480 may be configured to set the Transmit/Receive Bypass Switches to send the signal received from the Transceiver Antenna to the Optical Subsystem of the ICS and/or Transmit/Receive Bypass Switch 2 to send signals output from the Optical Subsystem to Radio Transceiver 408.

RF Frequency Detector 430 may be utilized in order to automatically detect the frequency of a signal associated with Radio Transceiver 408. For example, if Radio Transceiver 408 is currently transmitting, RF Frequency Detector 430 may be configured to automatically detect the frequency of the transmission. In an example, the transmit and receive frequencies of the radio may be the same. The input to RF Frequency Detector 430 may be the I/O signal at Radio Transceiver 408, for example from Splitter 458. RF Attenuator2 432 of RF Frequency Detector 430 may be configured to control the power level of received signal and attenuate the power level of the received signal in order to achieve a desired signal level for further processing. Mixer2 434 may be configured to up-convert the received signal to a higher frequency. For example, Mixer2 434 may be configured to up-convert the received signal to frequency IF1 by tuning Local Oscillator 1 and/or Voltage Controlled Oscillator 1 (e.g., LO1/VCO1 426) to the desired local oscillator frequency. For example, the up-converted frequency IF1 may be 1216 MHz. IF1 frequency may be known to Digital Subsystem 480.

In an example, LO1/VCO1 426 may be considered an RF Synthesizer (e.g., RF Synthesizer1 470) that may be integrated with Mixer2 434 of RF Frequency Detector 430 and Mixer1 414 of RF Correlator/Detector 410. Digital Subsystem 480 may control RF Synthesizer1 470, for example using control signal CTRL_LO1. Digital Subsystem may tune RF Synthesizer1 470 in order to up-convert the signal received by Mixer2 434 from RF Attenuator2 432 to a known frequency. Based on the control signal for the local oscillator, the effective power level of Mixer2 434 may be increased. Increasing the power level of the output of Mixer2 434 (e.g., and therefore RSSI_Tx) may be used to determine the frequency of the input signal. When the power level of RSSI_Tx is maximized, the configuration parameters of the LO1/VCO1 426 that are used to achieve the maximized RSSI_TX signal may be used to determine the frequency of the input. After maximizing the power output from a first mixer (e.g., Mixer2 434), a second mixer (e.g., Mixer4 438) may be used to further refine the determination.

For example, the up-converted signal (e.g., IF1) may be sent from Mixer2 434 to Band Pass Filter 3 436 (e.g., BPF3 436). For example, BPF3 436 may be a surface acoustic wave (SAW) bandpass filter. BPF3 436 may filter mixer frequency by-products from the up-conversion process. For example, BPF3 436 may filter frequencies that are greater than a predetermined frequency threshold from the up-converted frequency IF1. The filter signal may be sent from BPF3 436 to Mixer4 438. Mixer4 438 may be configured to down-convert the received signal to a lower frequency. For example, Mixer4 438 may be configured to down-convert the received signal to frequency IF2 by tuning Local Oscillator 2 and/or Voltage Controlled Oscillator 2 (e.g., LO2/VCO2 428) to the desired local oscillator frequency. For example, the down-converted frequency IF2 may be 70 MHz.

In an example, LO2/VCO2 428 may be considered a second RF Synthesizer (e.g., RF Synthesizer2 472). RF Synthesizer2 472 may be integrated with Mixer4 438 of RF Frequency Detector 430 and Mixer3 418 of RF Correlator/Detector 410. Digital Subsystem 480 may control RF Synthesizer2 472, for example using control signal CTRL_LO2. Digital Subsystem may tune RF Synthesizer2 472 in order to down-convert the signal received by Mixer4 438 from BPF3 436 to a known frequency. Based on the control signal for the local oscillator, the effective power level of Mixer4 438 may be increased. Increasing the power level of the output of the mixer (e.g., and therefore RSSI_Tx) may be used to determine the frequency of the input signal. When the power level of RSSI_Tx is maximized, the current configuration parameters of the LO2/VCO2 428 may be used to determine the frequency of the input. After maximizing the power output from the second mixer (e.g., Mixer4 438), an accurate prediction of the frequency may be made. Since the synthesizer values may be linked between RF Frequency Detector 430 and RF Correlator/Detector 410, by tuning RF Frequency Detector 430 to the desired frequency, RF Correlator/Detector 410 may be used to measure the jammer cancellation at that frequency.

The down-converted signal (e.g., IF2) may be sent from Mixer4 438 to BPF4 440 in order to remove frequency byproducts generated by Mixer4 438. For example, BPF4 440 may be a surface acoustic wave (SAW) bandpass filter. BPF4 440 may filter frequencies that are more than a certain frequency from the down-converted frequency IF2. The filter signal may be sent from BPF4 440 to a log amplifier (e.g., LogAmp2 442). LogAmp2 442 may amplify and/or detect the received signal and may send the received signal to Digital Subsystem 480, for example via RSSI_Tx. Although a log amplifier is illustrated in the example shown in FIG. 4, other types of amplifiers may be used.

Digital Subsystem 480 may be configured to determine the frequency of the signal input to RF Frequency Detector 430 (e.g., Radio Transceiver 408 I/O signals) based on the parameters used by RF Frequency Detector 430 and/or the output of RF Frequency Detector 430 (e.g., RSSI_Tx). For example, the unknown input frequency may be determined as follows. In an example, $f_0$ may represent the unknown input frequency. The unknown input frequency may be the jammer frequency, the transceiver transmit frequency, and/or the transceiver receive frequency. The up-conversion of the unknown input frequency $f_0$ may yield the relationship:

$$f_0 + LO1 = IF1 \qquad \text{Equation (1)}$$

where LO1 may represent the frequency of the local oscillator (e.g., LO1/VCO1 426) of RF Synthesizer1 470, and IF1 may represent the output frequency of Mixer2 434. Similarly, the down-conversion of the signal received by Mixer4 438 (e.g., the filtered IF1 signal) may yield the relationship:

$$IF1 - LO2 = IF2 \qquad \text{Equation (2)}$$

where LO2 may represent the frequency of the local oscillator (e.g., LO2/VCO2 428) of RF Synthesizer2 472, and IF2 may represent the output frequency of Mixer4 438. Combining Equations (1) and (2) may yield:

$$f_0 = LO2 - LO1 + IF2 \qquad \text{Equation (3)}$$

Digital Subsystem 480 may measure the output power of RF Frequency Detector 430 (e.g., RSSI_Tx) in order to determine the unknown input frequency $f_0$. For example, to determine the unknown input frequency $f_0$, Digital Subsystem 480 may vary one or more of the parameters LO1 and/or LO2 in order to maximize the output power of LogAmp2 442 (e.g., RSSI_Tx). The output power of LogAmp2 442 may be maximized when the output frequency of Mixer4

438 is the desired down converted frequency. For example, the desired down-converted frequency may be 70 MHz. The output power of LogAmp2 442 may be maximized in order to determine the unknown frequency. If the output power is maximized and the current local oscillator frequencies are known to the Digital Subsystem (e.g., which controls RF Synthesizer1 470 and RF Synthesizer2 472 via control signals CTRL_LO1 and CTRL_LO2, respectively), the input frequency may be determined. Using the three known parameters LO1, LO2, and IF2, Digital Subsystem 480 may determine the unknown input frequency $f_0$.

RF Correlator/Detector 410 may be similar to RF Frequency Detector 430, although the input to RF Correlator/Detector 410 may be from RF Signal Processor 468 and may be a processed signal representing the output of the Optical Subsystem. Additionally, RF Correlator/Detector 410 may include a power amplifier (PA) that may be absent from RF Frequency Detector 430. For example, once RF Frequency Detector 430 has been tuned to the correct frequency (e.g., the values of the synthesizers linking RF Frequency Detector 430 and RF Correlator/Detector 410 are set to maximize the output power of the RSSI_Tx), RF Correlator/Detector 410 may be automatically configured to be a measure of the cancellation of the jammer at the tuned frequency. Since a large power output of RF Correlator/Detector 410 (e.g., RSSI_Rx) may correspond to a large power input at the frequency of the SOI, a large RSSI_Rx value may indicate the presence of the Jammer signal. As the Jammer signal is attenuated/cancelled by the ICS, the power level of RSSI_Rx may also decrease. Digital Subsystem 380 may be configured to control and/or vary the weighting network of the Optical Subsystem and/or one or more variable RF attenuators in order to minimize the power level of the RSSI_Rx signal.

For example, the signal of the Photodiode Detector after optical cancellation of the jammer signal in the optical subsystem may be conditioned by RF Signal Processor 468. For example, RF Signal Processor may include one or more low noise amplifier(s) (LNA(s)), variable attenuator(s), RF filter(s), and/or coupler(s). A relatively small portion of the signal output from the Optical Subsystem may be sent from the coupled port of RF Signal Processor 468 to the input of RF Correlator/Detector 410. RF Correlator/Detector 410 may be configured to automatically detect the power level of the residual jammer signal after optical cancellation.

For example, the residual jammer signal with the SOI may be sent to RF Attenuator1 412 of RF Correlator/Detector 410. RF Attenuator1 412 may be a fixed attenuator that, may be configured to control the power level of received signal and attenuate the power level of the received signal in order to achieve a desired signal level for further processing. The attenuated signal may be sent to Mixer1 414, which may be integrated with Mixer2 434. For example, Mixer1 414 may share Synthesizer 470 (e.g., LO1/VCO1 426) with Mixer2 434. Mixer1 414 may be configured to up-convert the received signal to a higher frequency. For example, Mixer1 414 may be configured to up-convert the received signal to frequency IF3 by tuning Local Oscillator 1 and/or Voltage Controlled Oscillator 1 (e.g., LO1/VCO1 426) to the desired local oscillator frequency. For example, the up-converted frequency IF3 may be 1216 MHz.

In an example, LO1/VCO1 426 may be considered an RF Synthesizer (e.g., RF Synthesizer1 470) that may be integrated with Mixer2 434 of RF Frequency Detector 430 and Mixer1 414 of RF Correlator/Detector 410. Digital Subsystem 480 may control RF Synthesizer1 470, for example using control signal CTRL_LO1. Digital Subsystem 480 may have previously tuned RF Synthesizer1 470 to the desired parameter for the SOI (e.g., during the RF frequency detection process associated with RF Frequency Detector 430). Thus, Synthesizer1 470 may up-convert the signal received by Mixer2 434 from RF Attenuator2 432 to the known frequency using the previously configured LO1/VCO1 426 value.

The up-converted signal (e.g., IF3) may be sent from Mixer1 414 to Band Pass Filter 1 (e.g., BPF1 416). In an example, IF1 and IF3 may be the same. For example, BPF1 416 may be a surface acoustic wave (SAW) bandpass filter. BPF1 416 may filter mixer frequency by-products from the up-conversion process. For example, BPF1 416 may filter frequencies that are greater than a certain threshold from the up-converted frequency IF3. The filter signal may be sent from BPF1 416 to Mixer3 418. Mixer3 418 may be configured to down-convert the received signal to a lower frequency. For example, Mixer3 418 may be configured to down-convert the received signal to frequency IF4 by tuning Local Oscillator 2 and/or Voltage Controlled Oscillator 2 (e.g., LO2/VCO2 428) to the desired local oscillator frequency. In an example, IF4 and IF2 may be the same. For example, the down-converted frequency IF4 may be 70 MHz.

In an example, LO2/VCO2 428 may be considered a second RF Synthesizer (e.g., RF Synthesizer2 472). RF Synthesizer2 472 may be integrated with Mixer4 438 of RF Frequency Detector 430 and Mixer3 418 of RF Correlator/Detector 410. Digital Subsystem may control RF Synthesizer2 472, for example using control signal CTRL_LO2. Digital Subsystem may have previously tuned RF Synthesizer2 472 to the desired parameter for the SOI. Thus, Synthesizer2 472 may up-convert the signal received by Mixer3 418 from RF Attenuator2 432 to the known frequency using the previously configured LO2/VCO2 428 value.

The down-converted signal (e.g., IF4) may be sent from Mixer3 418 to a power amplifier (e.g., PA 420). PA 420 may be configured to provide a desired gain to the received signal IF4, for example to improve the dynamic range of the LogAmp1 424 detector. PA 420 may send the signal to BPF2 422 in order to remove frequency byproducts generated by Mixer3 418 and/or PA 420. For example, BPF2 422 may be a surface acoustic wave (SAW) bandpass filter. BPF2 42 may filter frequencies that are more than a certain frequency from the down-converted frequency IF4. The filter signal may be sent from BPF2 422 to LogAmp1 424. LogAmp1 424 may amplify the received signal and may send the received signal to Digital Subsystem 480, for example via RSSI_Tx.

The local oscillator LO1/VCO1 426 and LO2/VCO2 428 may be tuned by Digital Subsystem 480 for mixers Mixer1 414, Mixer2 434, Mixer3 418, and/or Mixer4 438 simultaneously. Thus, LogAmp1 424 may detect the maximum jammer power at the down converted frequency (e.g., 70 MHz) for the transmitter frequency already determined by RF Frequency Detector 430. The output signal RSSI_Rx may be measured continually during cancellation to determine the residual content of the cancelled jammer signal. When the power level of the RSSI_Rx signal falls below a predetermined threshold, Digital Subsystem 480 may determine that the jammer signal has effectively been completely cancelled at the frequency of the SOI. The clean SOI signal may be applied through the Transmit/Receive Bypass Switch2 462 to Radio Transceiver 408 input for good quality signal reception. The signal at the input of the transceiver offers a highly improved SNR (signal-to-noise ratio) compared to signal reception without the ICS when the jammer is in operation.

When described herein, minimizing and/or maximizing a power level may refer to determining the appropriate control values for variable RF components (e.g., attenuators and/or delay lines) and/or appropriate control values for variable optical components (e.g., attenuators and/or delay lines) that may result in a relative minimum/maximum measured power level. For example, the variable attenuators and/or variable delay lines (e.g., RF and/or optical) may be tuned in order to control an output power level of one or more components of the RF Subsystem (e.g., Transmit Power Level Detector 450, RF Frequency Detector 430, and/or RF Correlator/Detector 410), where the current measured power level may be utilized as feedback by Digital Subsystem 480. Minimizing the power level may refer to the feedback system reaching a relative minimum power level as compared to a power level achieved when other configurations/control values for the variable RF components (e.g., attenuators and/or delay lines) and/or variable optical components (e.g., attenuators and/or delay lines) are applied.

In an example, the mixers that share local oscillators and/or synthesizers (e.g., Mixer1 414 and Mixer2 434; Mixer3 418 and Mixer4 438) may be integrated together on the same chip. The VCOs may be operably coupled to RF Frequency Detector 430 and/or RF Correlator/Detector 410 may be tuned very fast. For example, the VCOs may be tuned within a period that may be orders of magnitude lower than 100 ms. The VCOs may be tuned to be much faster than the tuning time of the radio transceiver. When a minimum power level is detected at the output of LogAmp2 442, the VCO frequency may be the same as the transmit frequency from the transceiver. Such a system may allow the ICS to be utilized with a large range of radio transceiver and jammer frequencies.

For the ICS to achieve high cancellation depth within a shortest time period (e.g., orders of magnitude faster than 100 ms) in a changing environment, active continuous detection of RSSI_Rx may be utilized, for example to determine and control the weighting networks of optical attenuators and delay lines. Control of the optical weighting network (e.g., optical attenuators and/or optical delay lines) may be described with respect to FIG. 8.

Figure 5A:
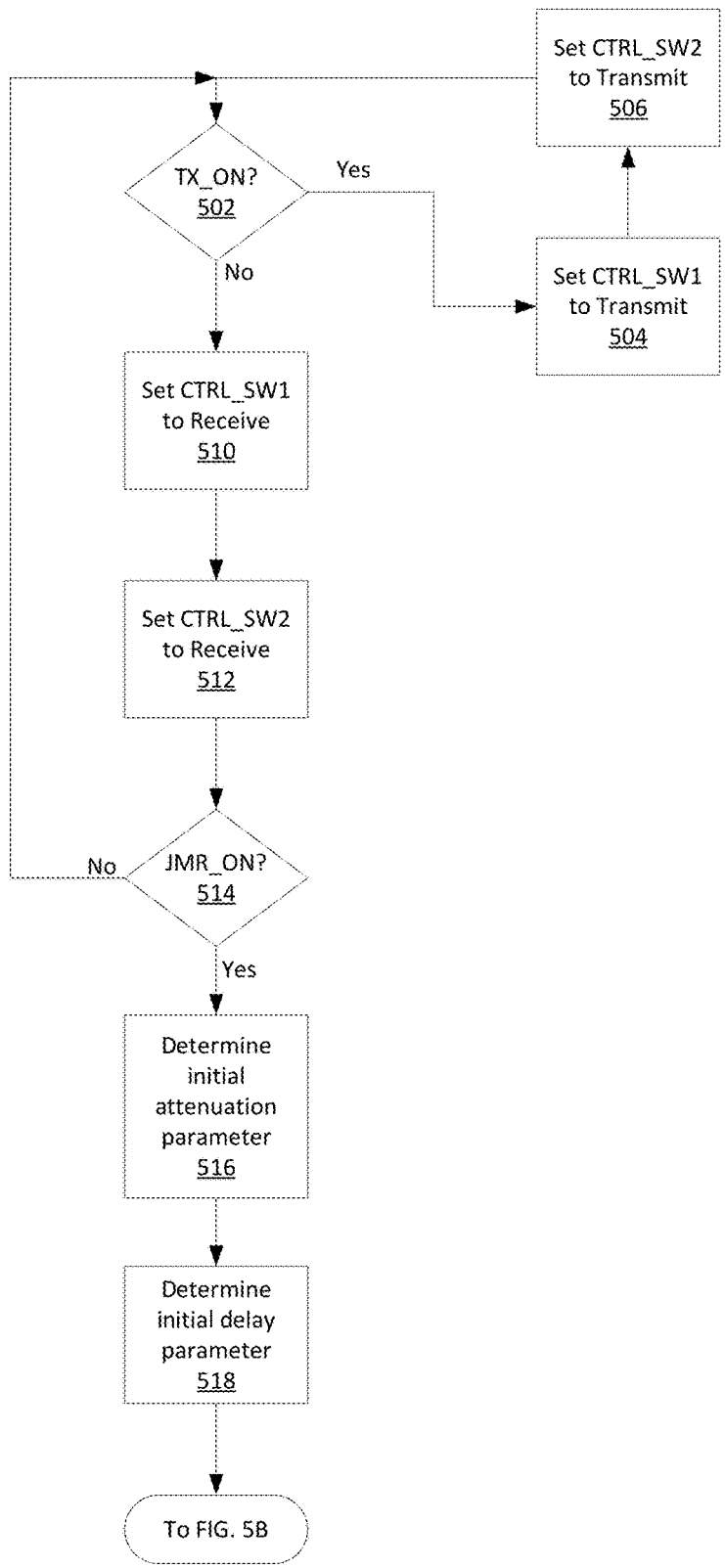
FIGS. 5A and 5B include a flow chart for an example method for controlling the ICS system.
Figure 5B:
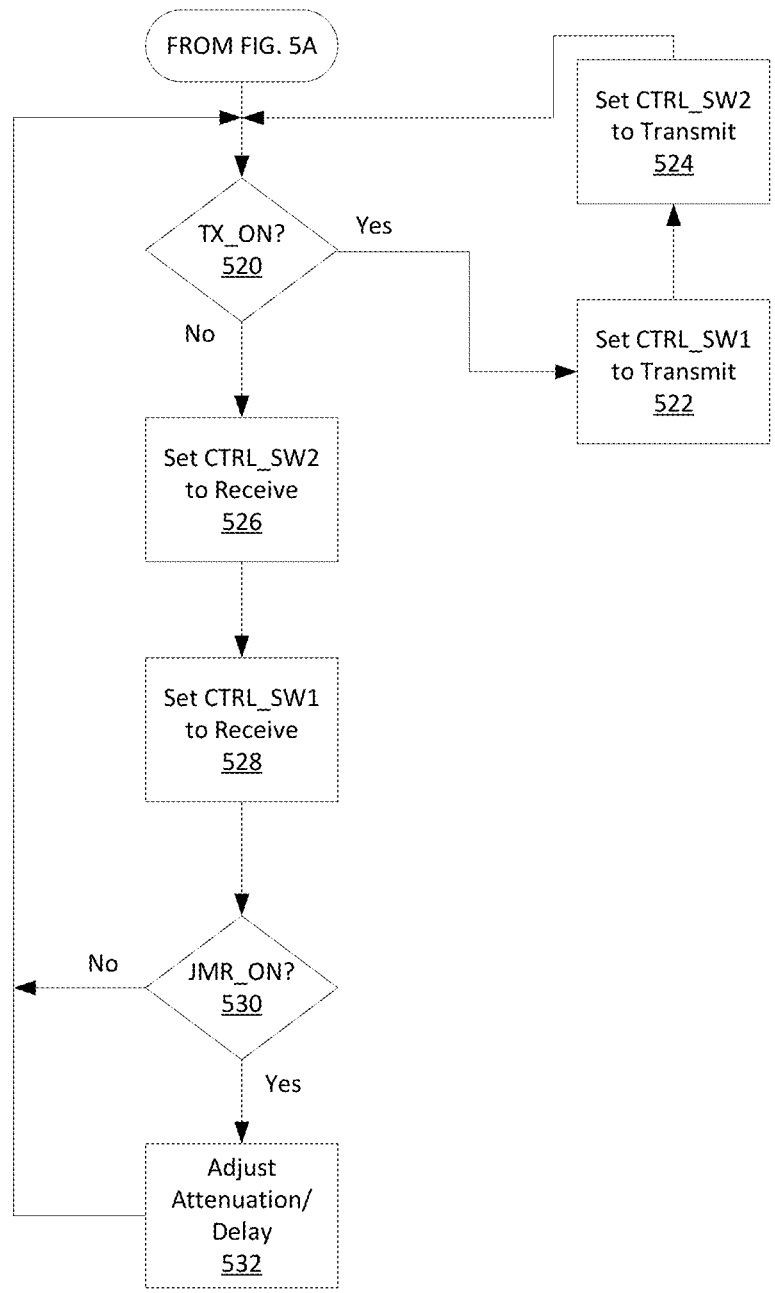

FIGS. 5A and 5B include a flow chart for an example method for controlling the ICS system. When the ICS is operably connected to a jammer and the radio transceiver, the Digital Subsystem may be configured to determine whether the radio is transmitting. For example, at 502 the Digital Subsystem may determine whether the radio is transmitting by evaluating the signal received from the transmit power level detector of the RF Subsystem (e.g., TX_ON). If it is determined that the radio is transmitting, at 504 and 506 the Digital Subsystem may configure the Tx/Rx switches (e.g., Transmit/Receive Switches 1 and 2) such that the signal is not routed through the ICS. Instead, signal output from the radio transceiver may be routed through the switches to the radio transceiver antenna for transmission. Thus, the Tx/Rx Switches 1 and 2 may be configured by the Digital Subsystem using CTRL_SW1 and CTRL_SW2, respectively, to send the transmission signal from the Radio Transceiver to one or more antennas for transmission.

If it is determined that the radio transceiver is not currently transmitting (e.g., the TX_ON signal indicates that the transmitter portion of the transceiver is off or not in use), at 510 and 512 Digital Subsystem may determine that the radio is in receiving mode. Based on determining that the radio is in receiving mode, the Digital Subsystem may configure the Tx/Rx switches (e.g., Transmit/Receive Switches 1 and 2) such that the signal received via the antenna(s) associated with the radio transceiver is routed through the Optical Subsystem of the ICS. Thus, the Tx/Rx Switches 1 and 2 may be configured by Digital Subsystem using CTRL_SW1 and CTRL_SW2, respectively, to send the signal received from the one or more antennas associated with the radio transceiver to the Optical Subsystem of the ICS. The Tx/Rx Switches 1 and 2 may be configured by Digital Subsystem to route the output of the Optical Subsystem to the radio transceiver (e.g., after processing by the RF signal processor).

At 514, the Digital Subsystem may determine if the jammer is in operation. For example, the Digital Subsystem may receive the JMR_ON signal from the Jammer Detector of the RF Subsystem, which may indicate whether the Jammer is currently in operation. If the Digital Subsystem determines that the jammer is not currently in operation, then the Digital Subsystem may continuously test the JMR_ON signal to determine when the jammer begins transmission operation. For example, the Digital Subsystem may continually monitor the TX_ON signal to determine when the transceiver is not transmitting and may continually monitor the JMR_ON signal to determine when the jammer is transmitting.

When Digital Subsystem determines that the radio transceiver is not transmitting (e.g., the transceiver is in reception mode) and that the jammer is on and transmitting, at 516 the Digital Subsystem may initialize the attenuation parameter(s) for the Optical Subsystem, and at 518 the Digital Subsystem may initialize the delay parameter(s) for the Optical Subsystem. Optical attenuation parameters (e.g., as indicated to the Optical Subsystem via control signals a_c1, a_c2, . . . , a_cn) may be represented by the variable $\alpha$. Optical delay parameters (e.g., as indicated to the Optical Subsystem via control signals t_c1, t_c2, . . . , t_cn) may be represented by the variable $\tau$. The parameter $\tau$ may correspond to a delay in time (e.g., ns). The initial setup of the optical attenuation parameters and optical delay parameters and the adjusting of the optical attenuation parameters and optical delay parameters may occur when the Digital Subsystem determines that the Jammer is transmitting and the radio transceiver is not transmitting.

Initial calibration of the optical attenuation parameters and/or optical delay parameters may increase the response speed of the control system. Due to the slow response from the optical delay line components, initially calibrating the values of the optical attenuation parameters and optical delay parameters may limit the size of adjustments that are performed in order to achieve the desired cancellation. Since the primary interference path may be fixed, the proper initial calibration may significantly reduce the time to search for the optimum point of cancellation.

For example, in many scenarios, the Radio Transceiver antenna and the Jammer antenna may be in fixed positions relative to each other (e.g., each may be fixed at a specified location of a military vehicle such as a Humvee). Thus, on average the amount by which the over the air propagation channel (e.g., the channel between the Jammer antennas and the Radio Transceiver antenna) affects the jammer signal relative to the sampled (e.g., coupled) jammer signal may be somewhat constant. Thus, if the initially used attenuation parameters and/or delay parameters have been previously calibrated, a time can be saved in effectuating the interference cancellation since fewer iterations of the attenuation and/or time delay adjustments may be used to achieve the desired level of cancelation.

Once appropriate values for the attenuation parameters have been determined for the operation wherein the Jammer is on and the Radio Transceiver is in receiving mode, at 520 the Digital Subsystem may determine if the Radio Transceiver has begun transmitting, if so, the at 522 and 524 the Digital Subsystem may configure the Tx/Rx switches (e.g., Transmit/Receive Switches 1 and 2) such that the signal is not routed through the ICS. Instead, the transmit signal from the Radio Transceiver may be routed to the transceiver antenna via the Tx/Rx switches (e.g., Transmit/Receive Switches 1 and 2). When the Radio Transceiver stops transmitting, at 526 and 528 the Digital Subsystem may configure the Tx/Rx switches (e.g., Transmit/Receive Switches 1 and 2) such that the signal is routed through the ICS. At 530, the Digital Subsystem may determine whether the Jammer is still on, and if so may adjust the attenuation and/or delay parameters at 532. If the Jammer is not on, Digital Subsystem may continually check the TR_ON signal and/or the JMR_ON signal to ensure the Tx/RX switches are set for the correct transmission mode (e.g., receive or transmit) and may continually update the attenuation and/or delay parameters during periods where the Jammer is in operation.

Figure 6A:
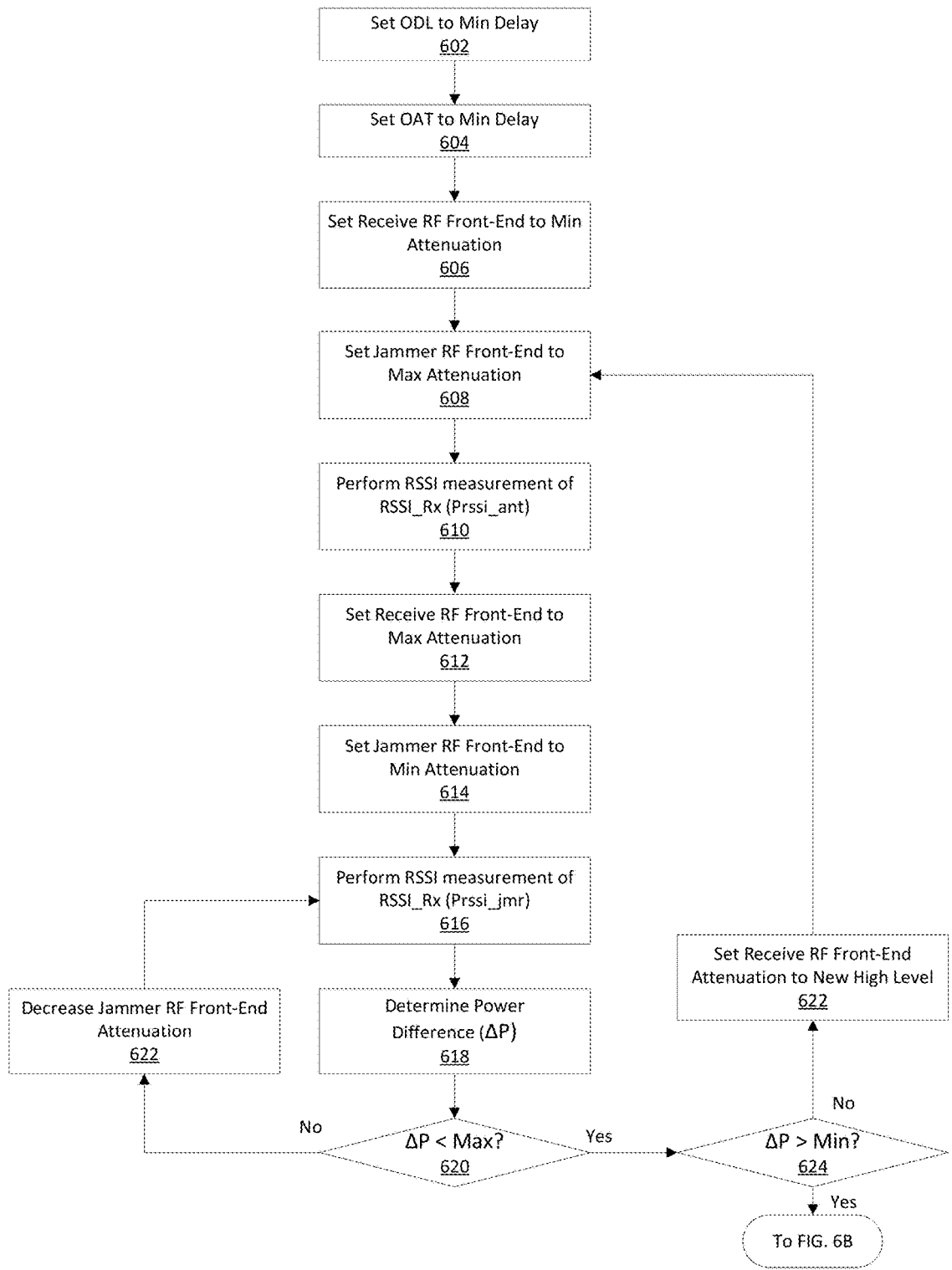
FIGS. 6A & 6B include a flow chart illustrating an example method for calibrating one or more attenuation parameters to initial value(s).
Figure 6B:
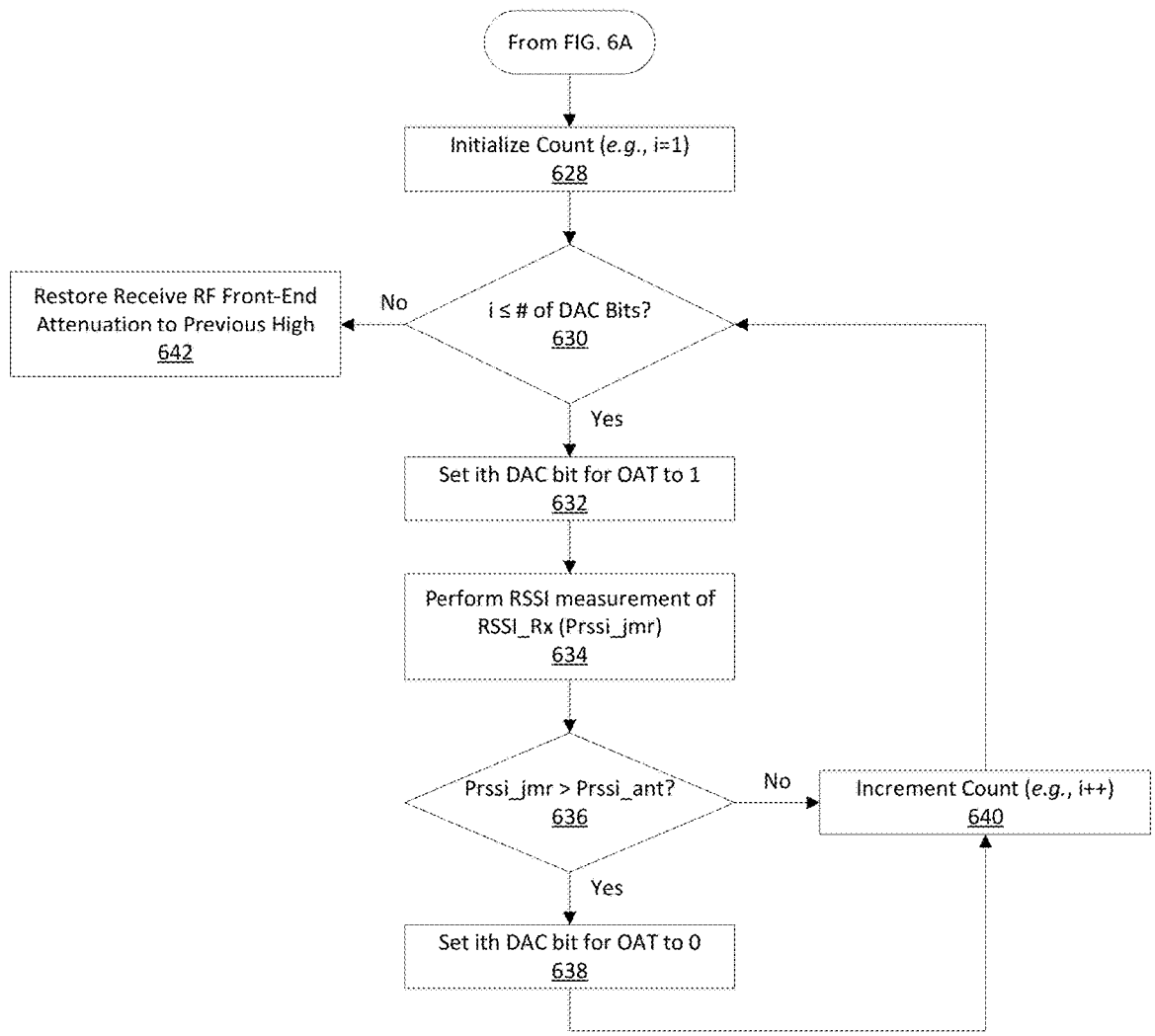

FIGS. 6A & 6B include a flow chart illustrating an example method for calibrating one or more attenuation parameters to initial value(s). For example, attenuation may be first performed using RF attenuators and then performed using optical attenuators. FIGS. 6A and 6B may be described with reference to FIG. 3B and/or FIG. 3C. For example, one or more of the optical attenuator control signals (e.g., a_c1, a_c2, . . . , a_cn) may be collectively and/or individually referred to as CTRL_OAT signal(s). Similarly, one or more of the optical delay line control signals (e.g., t_c1, t_c2, . . . , t_cn) may be collectively and/or individually referred to as CTRL_ODT signal(s). Although a single control signal may be illustrated or described, multiple control lines maybe used and/or multiple control signals may be multiplexed over a single control line. Additionally, FIGS. 6A and 6B may be described for calibrating a single optical processing line, although similar procedures may be used for other optical processing lines.

To initially calibrate the optical weighting parameters of the ICS, the Digital Subsystem may perform one or more of the following. For example, at 602 the Digital Subsystem may set an optical delay line (ODL) (e.g., Variable Delay Line1 358, for example) to a minimum delay value (e.g., $\tau=\tau_{min}$), which may be 0 ps, for example using CTRL_ODL. At 604, the Digital Subsystem may set the attenuation value of an optical attenuator (OAT) (e.g., Variable Attenutaor1 356, for example) to the minimum attenuation (e.g., $\alpha=\alpha_{mm}$), which may correspond to a voltage of 0 V. For example the DAC bits for the signal CTRL_OAT1 may be set to (MSB, . . . , LSB)=(0, . . . , 0).

At 606, the Digital Subsystem may be configured to control an attenuator included in the Receive RF Front-End components (e.g., Variable RF Attenuator2 324) such that the attenuation level is set to a minimum value. For example, the Digital Subsystem may calibrate Variable RF Attenuator2 324 using control signal CNTL_AT2 to use a minimum attenuation level. Hence, the signal received from the Radio Transceiver Antenna (e.g., the combined SOI and jammer signal) may be passed to Optical Subsystem 350 with minimum RF attenuation (e.g., via RF_in2). At 608, the Digital Subsystem may be configured to control an attenuator included in the Jammer RF Front-End components (e.g., Variable RF Attenuator1 318) such that the attenuation level is set to a maximum value. For example, the Digital Subsystem may calibrate Variable RF Attenuator1 318 using control signal CNTL_AT1 to use a maximum attenuation level. Hence, the signal received from Jammer Coupler 312 (e.g., the jammer signal) may be essentially completely attenuated so that little or no jammer signal is passed to Optical Subsystem 350 via RF_in1.

The Digital Subsystem may be configured to measure the power level from the transceiver (e.g., RSSI_Rx) via RF Correlator/Detector 338. For example, at 610 the RF Subsystem may perform an RSSI measurement of the signal (e.g., corresponding to the signal received via the Radio Transceiver Antenna) and send the RSSI measurement to Digital Subsystem (e.g., RSSI_Rx). The measurement may be performed while the jammer is completely attenuated, and the Digital Subsystem may store the RSSI measurement, which may be referred to as Prssi_ant.

Next, the Digital Subsystem may be configured to measure the power level from the jammer. For example, at 612, the Digital Subsystem may be configured to control an attenuator included in the Receive RF Front-End components (e.g., Variable RF Attenuator2 324) such that the attenuation level is set to a maximum value. For example, the Digital Subsystem may calibrate Variable RF Attenuator2 324 using control signal CNTL_AT2 to use a maximum attenuation level. Hence, the signal received from the Radio Transceiver Antenna (e.g., the combined SOI and jammer signal) may be essentially completely attenuated so that little or no combined SOI and jammer signal reaches Optical Subsystem 350 via RF_in2. At 614, the Digital Subsystem may be configured to control an attenuator included in the Jammer RF Front-End components (e.g., Variable RF Attenuator1 318) such that the attenuation level is set to a minimum value. For example, the Digital Subsystem may calibrate Variable RF Attenuator1 318 using control signal CNTL_AT1 to use a minimum attenuation level. Hence, the signal received from Jammer Coupler 312 (e.g., the jammer signal) may be essentially completely passed to Optical Subsystem 350 via RF_in1.

The Digital Subsystem may be configured to measure the power level from the transceiver (e.g., RSSI_Rx) via RF Correlator/Detector 338. For example, at 616 the RF Subsystem may perform an RSSI measurement of the signal (e.g., corresponding to the signal received via Jammer Coupler 312) and send the RSSI measurement to Digital Subsystem (e.g., RSSI_Rx). The measurement may be performed while the jammer is attenuated but while the signal from the Radio Transceiver antenna is completely (or nearly so) attenuated, and the Digital Subsystem may store the RSSI measurement, which may be referred to as Prssi_jmr.

At 618, the Digital Subsystem may be configured to determine the power difference and/or power ratio between the measurement representing the jammer signal (e.g., Prssi_jmr) and the measurement representing the signal received from the radio transceiver antenna (e.g., Prssi_ant). For example, the power ratio in logarithmic form may be represented by ΔP and may be expressed as:

$$\Delta P = 10*\log 10(\text{Prssi\_jmr}) - 10*\log 10(\text{Prssi\_ant}) \quad \text{Equation (4)}$$

The Digital Subsystem may be configured to determine if the power difference is within a predetermined range. For example, Digital Subsystem may determine if the power difference is greater than a predetermined minimum threshold and/or is less than a predetermined maximum threshold. Since, modifications to attenuation parameters and/or time delays may be achieved at a faster rate using RF components as compared to optical components, in order to increase the overall speed of the ICS, the attenuation values of the RF components may be set such that the power difference is with the predetermined range prior to setting the attenuation and/or time delay values of the optical components. Once the RF attenuations have been set, more precise adjustments may be performed using the Optical components of the Optical Subsystem.

For example, at 620 the Digital Subsystem may determine whether the power difference is less than the predetermine maximum threshold. An example predetermined maximum threshold may be 27 dB. If the power difference is determined to be greater than the predetermined maximum threshold (e.g., ΔP>Max Threshold), the Digital Subsystem may determine that the jammer power level is too high relative to the power level of the signal received via the transceiver antenna. Therefore, at 622 the Digital Subsystem may decrease the attenuation of the Jammer signal (e.g., Decrease attenuation of RF Variable Attenuator1 318 via CTRL_AT1). For example, the Digital Subsystem may adjust the attenuation of RF Variable Attenuator1 318 such that the power level of signal RF_in1 is decreased. For example, the power level association with RF_in may be decreased by the difference between the power difference (e.g., ΔP) and the predetermined maximum threshold (e.g., 27 dB). The Digital Subsystem may then re-measure the RSSI value of RSSI_RX (e.g., at 616), determine if a new power difference based on the new RSSI value (e.g., at 618), and determine if the new power difference is less than the predetermined maximum threshold (e.g., at 620). The jammer power level may be continually decreased until the power difference is determined to be below the predetermined maximum threshold.

If at 620 it is determined that the power difference is less than the predetermined maximum threshold, then at 624 the Digital Subsystem may determine whether the power difference is greater than the predetermined minimum threshold. An example predetermined minimum threshold may be 3 dB. If the power difference is determined to be less than the predetermined minimum threshold (e.g., 3 dB), the Digital Subsystem may determine that the power level of the signal received via the Radio Transceiver Antenna is too large relative to the power level of the jammer signal (e.g., the power levels may be too close). If the Digital Subsystem determines that the power ratio is less than the predetermined minimum threshold, the Digital Subsystem may set a new "high" power level for the signal received from the Radio Transceiver Antenna. For example, at 606 RF Variable Attenuator2 324 of the Receiver RF Front-End components may have been set to a minimum attenuation level so that the power level at RF_in2 was maximized. At 622, the attenuation of Variable RF Attenuator2 324 may be set using CTRL_AT2 such that the power level at RF_in2 is decreased by the difference between the predetermined minimum threshold (e.g., 3 dB) and the power difference. For example, Digital Subsystem may increase the attenuation level of Variable RF Attenuator2 324 in order to perform the power level decrease for signal RF_in2. For example, the decrease may be set to a value of the difference between the predetermined minimum threshold (e.g., 3 dB) and the power ratio (e.g., ΔP). The new power level at RF_in2 may be considered the new "high" value if the attenuation is to be increased in a later iteration (e.g., after decreasing the RF_in2 power level at 622, the Digital Subsystem may return to 608 and may repeat the previously described procedure). Thus, the Digital Subsystem may store the new value of CTRL_AT2 and/or the new desired power level for future reference if a previous "high" level is to be applied or modified.

The Digital Subsystem may continually adjust the RF attenuation parameters until the power difference is greater than the predetermined minimum threshold and less than the predetermined maximum threshold. Upon determining that the power difference is within the desired range, Digital Subsystem may utilize a dichotomy method in order to minimize the power difference. As may be noted, if the power difference is determined to be within the desired range, then when proceeding to the dichotomy method described below, the value of the attenuator for the signal from the Radio transceiver Antenna (e.g., RF Variable Attenuator2 324) may be set at a maximum level (e.g., the Radio Transceiver Antenna signal is not combined with the jammer and may be nearly completely attenuated). However, prior to maximizing the attenuation of Variable RF Attenuator1 324, the previously used attenuator level and/or its corresponding control signal value (e.g., CTRL_AT1) may be stored for future reference.

For example, $V_a$ may represent the control voltage used to control one or more optical attenuators with the Optical Subsystem (e.g., a_c1, a_c2, . . . , a_cN). $V_a$ may be the output of a digital-to-analog converter (DAC). The digital bits that are an input to the DAC may be set to various values in order to achieve a desired analog voltage output (e.g., a desired value of $V_a$). For example, if the DAC accepts a 16 bit input, the DAC input bits with a value 0x0000, may represent the minimum analog voltage $V_a$ (e.g., 0 V). In this example, the DAC input bits with a value 0xFFFF, may represent the maximum analog voltage of $V_a$.

If at 624 it is determined that the power difference is greater than the predetermined minimum threshold, then (continuing to FIG. 6B) the initial values of the optical attenuator parameter may be determined and set. At 628, to set the value of $V_a$ to an appropriate initial value, the Digital Subsystem may initialize a counter (e.g., i=1). At 630 the Digital Subsystem may determine if the current value of the counter is less than or equal to the number of DAC input bits (e.g., 16 in an example). If the counter value is less than the number of available DAC bits (e.g., there are DAC bits that have not been set yet), then at 632 the Digital Subsystem may set the ith bit of the input bits to the DAC to a value of 1, where the lowest value of the counter (e.g. i=1) may represent the most significant bit of the DAC and larger values of the counter may represent less significant bits. In other words, if i=1, the most significant bit would be set to 1, if i=2, the second most significant bit would be set to 1, etc. After setting the bit to 1 (e.g., and thereby affecting the attenuation level of the optical attenuator), at 634 the Digital Subsystem may receive/perform a measurement of the jammer power level (e.g., Prssi_jmr). At 636 the Digital Subsystem may determine if the new power level of the jammer (e.g., Prssi_jmr) is greater than the power level of the signal received from the transceiver antenna (e.g., Prssi_ant). If so, Digital Subsystem may change the value of the ith bit of the input bits to the DAC from 1 to 0. If the Digital Subsystem determines that the power level of the jammer (e.g., Prssi_jmr) is not greater than the power level of the signal received from the transceiver antenna (e.g., Prssi_ant), then the Digital Subsystem may maintain the value of the ith bit of the input bits of the DAC at 1. The Digital Subsystem at 640 may then increment the counter value i, and return to 630, at which point the process may be repeated until the value of the least significant bit of the input bit to the DAC has been set.

Once an appropriate value for each of the DAC bits has been selected (e.g., the appropriate value of $V_a$ has been determined and at 630 the Digital Subsystem determines that i is greater than the number of DAC bits), then at 642 the Digital Subsystem may restore the Receive RF Front-End attenuation level to the previously determined "high" attenuation level (e.g., once the value of $V_a$ has been determined. Digital Subsystem may revert back to the stored value of CTRL_AT2). For example, Digital Subsystem may change the value of Variable RF Attenuator2 432 from the maximum value to the stored value. Once the value of Variable RF Attenuator2 432 has been restored, the initiation procedure for the attenuator parameter may be complete. The process may be repeated for other optical attenuators.

Figure 7:
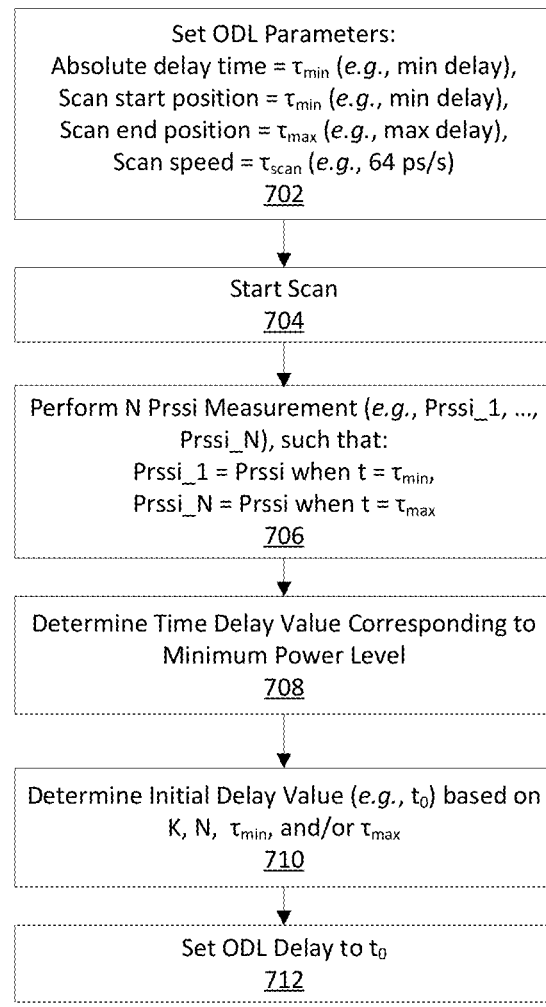
FIG. 7 is a flow chart illustrating an example method for initializing a delay value of an optical delay parameter.

FIG. 7 is a flow chart illustrating an example method for initializing a delay value of an optical delay parameter. For example, the optical delay parameters may be initialized by scanning the optical delay line from start to end and finding the point where the power level may be at a minimum. Each optical delay line (ODL) included on an optical processing path may be associated with a plurality of parameters. The parameters may be varied in order to vary the amount by which an optical signal is delayed when it is processed by the ODL. In order to determine the amount a signal should be delayed in order to achieve a maximum amount of interference cancellation, a scan may be performed across the dynamic range of the delay line while the power level of the output of the Optical Subsystem is monitored in order to determine which delay value provides maximum interference cancellation. For example, an ODL may be associated with an absolute delay time (e.g., the amount by which the ODL may delay a given optical signal according to its current configuration), a start scan position (e.g., the amount of delay associated with the beginning of the scan; may be a minimum delay amount such as 0 ps), an end scan position (e.g., the amount of delay associated with the end of the scan; may be a maximum delay amount such as 600 ps), and/or a scan speed (e.g., the amount by which a the delay is changed over time during the scanning process; an example step speed may be 64 ps/s). In order to determine appropriate initial delay values for the interference cancellation system, the Digital Subsystem may be configured to determine initial delay values for the delay lines by varying the ODL parameters. For example, at 702 the Digital Subsystem may set the absolute time delay to a minimum delay value (e.g., $\tau_{min}=0$ ps), may set the scan start position to the minimum delay value (e.g., $\tau_{min}=0$ ps), may set end scan position to a maximum delay value (e.g., $\tau_{max}=600$ ps), and/or may set the scan speed (e.g., $\tau_{scan}$) to a determined step value (e.g., 64 ps/s).

At 704, the Digital Subsystem may send a command to the optical delay line to initiate a scan of the dynamic range of the delay line (e.g., step from the minimum delay to the maximum delay). During the ODL scan, at 706 the Digital Subsystem may record measurements of the power level of the output of the Optical Subsystem (e.g., Prssi measurements). For example, the Digital Subsystem may perform power level measurements of the signal output from the Optical Subsystem at a rate of 1600 measurements per second. Such a scan may result in a $\Delta\tau$ value of approximately 0.04 ps between consecutive measurements. At each measurement instance, Digital Subsystem may determine a power level of the output of the Optical Subsystem (e.g., Prssi_1, Prssi_2, ... , Prssi_N, where N may represent the total number of measurements). For example, Prssi_1 may represent the measured power when the delay parameter is set to the minimum delay, and Prssi_N may represent the measured power when the delay parameter is set the maximum possible delay. At 708, the Digital Subsystem may determine the delay value that yields a minimum power level output from the Optical Subsystem across the dynamic range of the scan. For example, Prssi_K may represent the minimum power level output from the Optical Subsystem during the scan, where the index K may represent which measurement instance corresponding to the minimum measurement power level. For example, the minimum measurement power may be represented as:

$$Prssi\_K = \min(Prssi\_1, Prssi\_2, \ldots, Prssi\_N) \quad \text{Equation (5)}$$

At 710, the Digital Subsystem may determine an initial value to utilize for the optical delay line based on the time delay that yielded the minimum output power level (e.g., K), the minimum delay value (e.g., $\tau_{min}$), the maximum delay value (e.g., $\tau_{max}$), and/or the number of measurements that were included in the scan (e.g., N). In an example, the Digital Subsystem may determine initialized delay parameter value based on the measurement index (e.g., K) that may correspond to the minimum power measurement (e.g., Prssi_K) using Equation (6):

$$t_0 = (\tau_{max} - \tau_{min})\frac{K-1}{N-1} \quad \text{Equation (6)}$$

At 712, the Digital Subsystem may then initialize/set the delay value for the ODL to $t_0$, for example using CTRL_ODL. The ODL initialization process may be repeated for additional delay lines.

Figure 8:
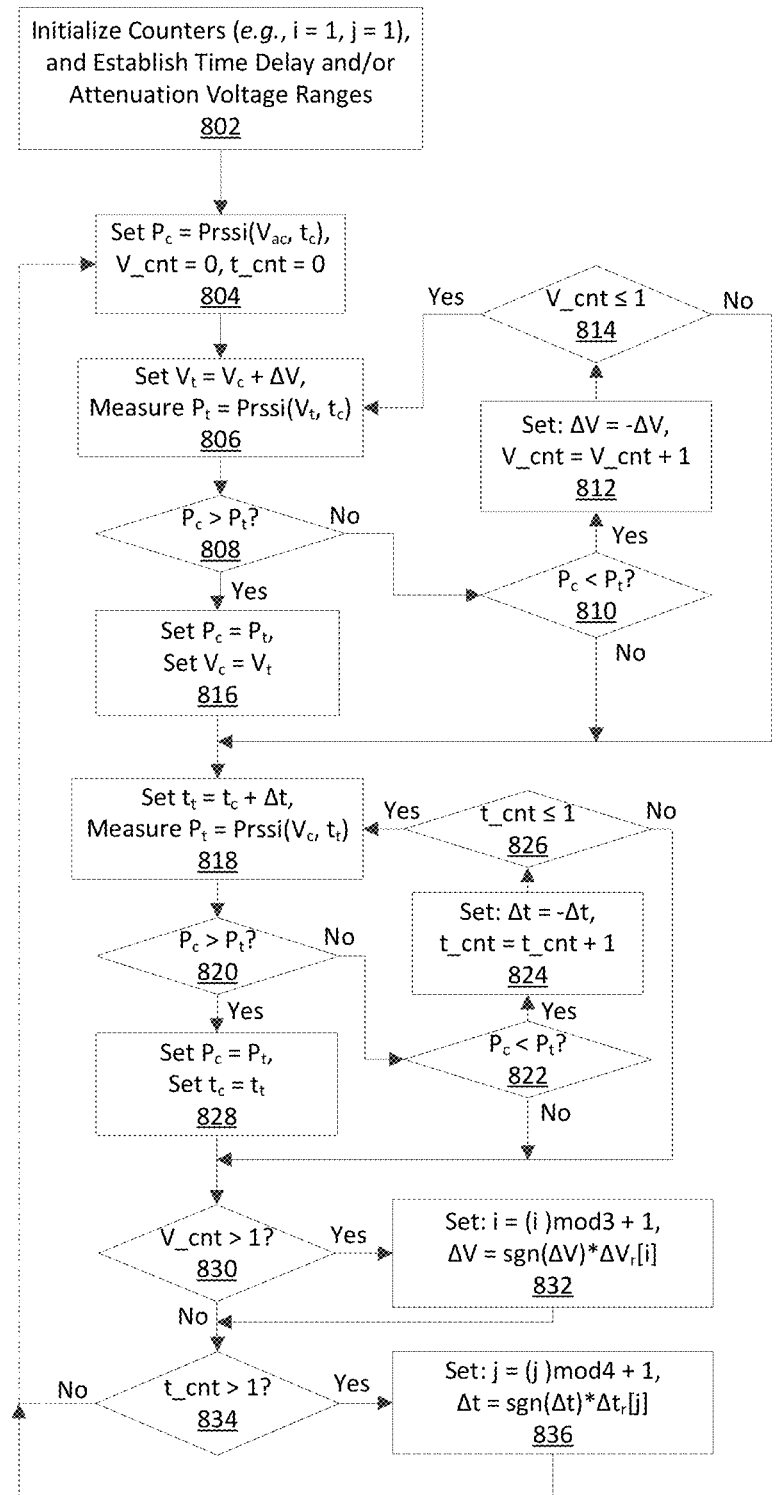
FIG. 8 is a flow chart illustrating an example method for adjusting the attenuation parameters and/or delay line parameters for continuous interference cancellation.

As a result of the optical variable attenuation and/or optical delay line parameter initial parameter determination process(es), the Digital Subsystem may have determined initial values to be used by the Optical Subsystem for interference cancellation. However, during the interference cancellation process, the Digital Subsystem may be configured to utilize a dithering method to continually adjust the optical attenuation and/or delay parameters, for example to account for slow environmental noise fluctuation. In this manner, the Digital Subsystem may continually determine appropriate values for the optical delays and/or optical attenuation that achieve a relative maximum amount of jammer signal cancellation from the combined jammer and SOI signal. FIG. 8 is a flow chart illustrating an example method for adjusting the attenuation parameters and/or delay line parameters for continuous interference cancellation.

For example, at 802 the Digital Subsystem may initialize counter i and counter j to 1. In order to vary the optical delay and/or optical attenuation, the Digital Subsystem may define a plurality of delay line ranges (e.g., $\Delta t_r$) and/or a plurality of attenuation level ranges (e.g., $\Delta V_r$). For example, the digital subsystem may establish four magnitudes of delay line ranges for an optical processing line, which may have step levels of 4 ps, 0.4 ps, 0.04 ps, and 0.004 ps, respectively, although other values may be used. The Digital Subsystem may define three voltage ranges for the voltage applied to the optical variable attenuator of the optical processing line. For example, the magnitude of the steps of the three voltage ranges may be set to values of 100 mV, 10 mV, and 1 mV, although other values may be used. The counter i may be used for varying the voltage applied to control the optical variable attenuator and the counter j may be used for varying the optical delay. For purposes of explanation and illustration, let $\Delta t = \Delta t_r(j)$, and let $\Delta V = \Delta V_r(i)$. The Digital Subsystem may continually monitor and store the current value for the optical attenuation level/optical attenuation voltage level (e.g., $V_{ac}$), the current value for the optical delay parameter (e.g., $t_c$), and/or the current value for the corresponding Optical Subsystem output power level (e.g., $P_C$, where $P_C$=Prssi($V_{ac}$, $t_c$)). For example, at 804 the Digital Subsystem may determine the power level $P_C$=Prssi($V_{ac}$, $t_c$) based on the initialized values for the optical delay and/or optical attenuation. The value of $P_C$ (e.g., the Optical Subsystem output power level associated with attenuation voltage $V_{ac}$ and delay value $t_c$) may be stored so that it can be compared to the relative power level associated with other delay and/or attenuation level values. The Digital Subsystem may be configured to maintain a count of the number of times the attenuation control voltage is changed (e.g., V_cnt) and/or the number of times the optical delay is changed (e.g., t_cnt). Initially, V_cnt and t_cnt may be set to zero.

At 806, the Digital Subsystem may change the current attention control voltage (e.g., $V_c$) by $\Delta V$ in order to reach a new test voltage (e.g., $V_t$). In other words, $V_t$=$V_C$+$\Delta V$. Since i may be initially set to 1, $\Delta V$=$\Delta V_r$(1), which may correspond to the largest voltage step range of 100 mV. By initially using large voltage step ranges, the variable attenuation may be varied by large amounts in order to more quickly reach an approximate value that corresponds to a minimum Optical Subsystem output power level (e.g., a relative maximum interference cancellation level). Once an approximate minimum power level is determined for the large step range corresponding to i=1, the counter i may be incremented and a smaller step range (e.g., 10 mV) may be utilized, and so on. The Digital Subsystem may test the power level at the new test voltage (e.g., $P_t$=Prssi($V_t$, $t_c$)). If at 808 and/or 810 it is determined that $P_c$ is less than $P_t$, then at 812 $\Delta V$ may be set to $-\Delta V$, and the voltage counter V_cnt may be incremented to 1. If at 814 it is determined that V_cnt≤1, then the Digital Subsystem may reevaluate the power level with $\Delta V$ set to $-\Delta V$ (e.g., set $V_t$=$V_C$−$\Delta V$) and determine if the new variable attenuation test level is greater than, less than or equal to $P_C$. If it is determined that $P_C$>$P_T$, then at 816 a new value for $P_C$ may be set and stored to $P_T$ and a new value for $V_C$ may be set an stored to $V_T$. If it is determined that the new value of $P_C$≤$P_T$, then the $P_C$ and/or the $V_C$ may remain third previously set value(s). The Digital Subsystem may then vary the delay parameter to attempt to minimize the Optical Subsystem power level output.

The Digital Subsystem may test the delay value in a similar manner. For example, at 818 the Digital Subsystem may change/step the current delay value (e.g., $t_c$) by $\Delta t$ in order to reach a new test delay (e.g., $t_t$). In other words, $t_t$=$t_c$+$\Delta t$. Since j may be initially set to 1, $\Delta t$=$\Delta t_r$(1), which may correspond to the largest delay step range of 4 ps. By initially using large delay step ranges, the variable time delay may be varied by large amounts in order to more quickly reach an approximate value that corresponds to a minimum Optical Subsystem output power level (e.g., a relative maximum interference cancellation level). Once an approximate minimum power level is determined for the large step range corresponding to j=1, the counter j may be incremented and a smaller step range (e.g., 0.4 ps) may be utilized, and so on (e.g., 0.04 ps next, then 0.004 ps, etc.). The Digital Subsystem may test the power level at the new test delay value (e.g., $P_t$=Prssi($V_C$, $t_t$)). If at 820 and/or 822 it is determined that $P_c$ is less than $P_t$, then at 824 $\Delta t$ may be set to $-\Delta t$, and the delay counter t_cnt may be incremented to 1. If at 826 it is determined that t_cnt≤1, then the Digital Subsystem may reevaluate the power level with $\Delta t$ set to $-\Delta t$ (e.g., set $t_t$=$t_C$−$\Delta t$) and determine if the new variable delay line test level is greater than, less than or equal to $P_C$. If it is determined that $P_C$>$P_T$, then at 828 a new value for $P_C$ may be set and stored to $P_T$ and a new value for $t_C$ may be set an stored to $t_T$. If it is determined that the new value of $P_C$≤$P_T$, then the $P_C$ and/or $t_C$ may remain its previously set value(s).

Upon testing the test voltages ranges and/or delay ranges, the indexes i and j may be updated to check other range values (e.g., change the amount by which the test voltages are stepped to zero-in on/locate the minimum output power level). For example, if at 830 it is determined that the voltage counter V_cnt is greater than 1 (e.g., when $V_t$ was set to $V_C$+$\Delta V$ it was determined that $P_t$=Prssi($V_t$, $t_c$)≤$P_C$), then at 832 the index i may be updated such that:

$$i = i \bmod 3 + 1 \quad \text{Equation (7)}$$

A base 3 modulo operation may be utilized since there may be three voltage ranges (e.g., 100 mV corresponding to i=1, 10 mV corresponding to i=2, 1 mV corresponding to i=3). If more or fewer ranges are utilized, the appropriate base for the modulo operation may be utilized. The voltage step may be updated such that:

$$\Delta V = \text{sgn}(\Delta V) * \Delta V_r(i) \quad \text{Equation (8)}$$

Similarly, if it is determined at 834 the delay counter is greater than 1 (e.g., when t was set to $t_C$+$\Delta t$ it was determined that $P_t$=Prssi($V_C$, $t_t$)≤$P_C$), then at 836 the index j may be updated such that:

$$j = j \bmod 4 + 1 \quad \text{Equation (9)}$$

A base 4 modulo operation may be utilized since there may be four delay ranges (e.g., 4 ps corresponding to j=1, 0.4 ps corresponding to j=2, 0.04 ps corresponding to j=3, 0.004 ps corresponding to j=4). If more or fewer ranges are utilized, the appropriate base for the modulo operation may be utilized. The time delay step value may be updated such that:

$$\Delta t = \text{sgn}(\Delta t) * \Delta t_r(j) \quad \text{Equation (10)}$$

If the voltage counter and/or the delay counter are less than or equal to 1 at 830 and/or 834, respectively, the Digital Subsystem may determine that the change/step utilized was in the correct direction/sign (e.g., the step changed the attenuation and/or delay in a manner that increased the amount of interference cancellation) and that the step range of adjustment was of an appropriate magnitude (e.g., the step range should remain the same for the next iteration adjustment). The Digital Subsystem return to 804 and repeal the adjustment of the attenuation and/or time delay in order to continually attempt to minimize the power output from the Optical Subsystem.

Figure 9A:
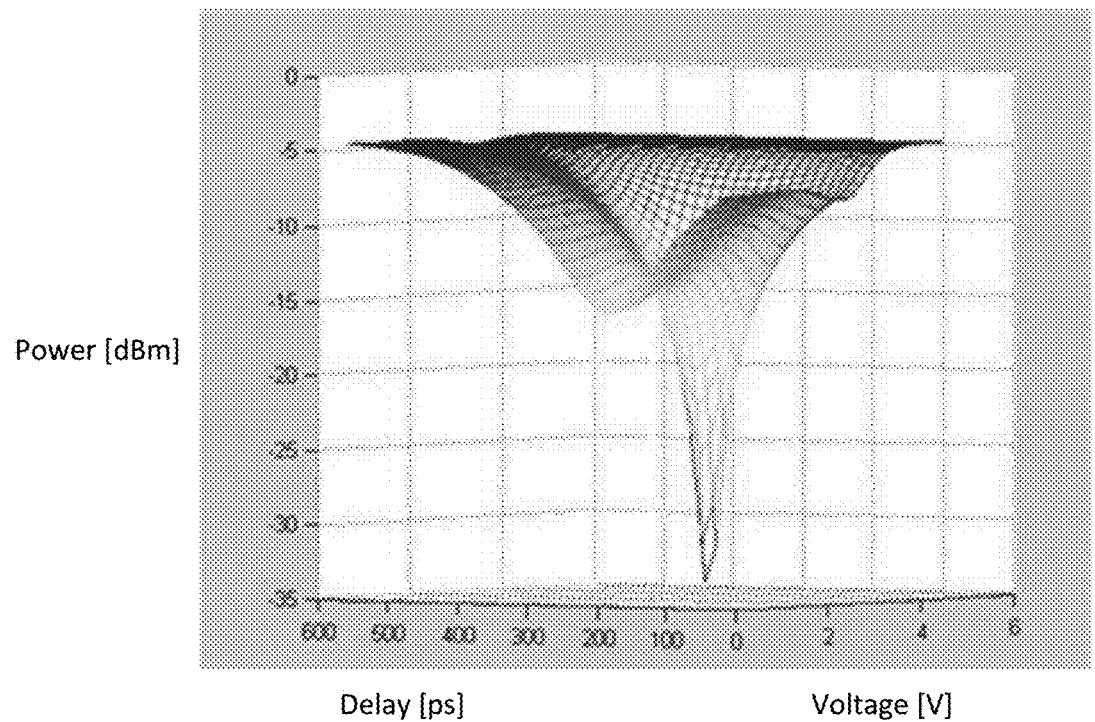
FIGS. 9A and 9B illustrates example interference cancellation measurements for various attenuation and delay values.
Figure 9B:
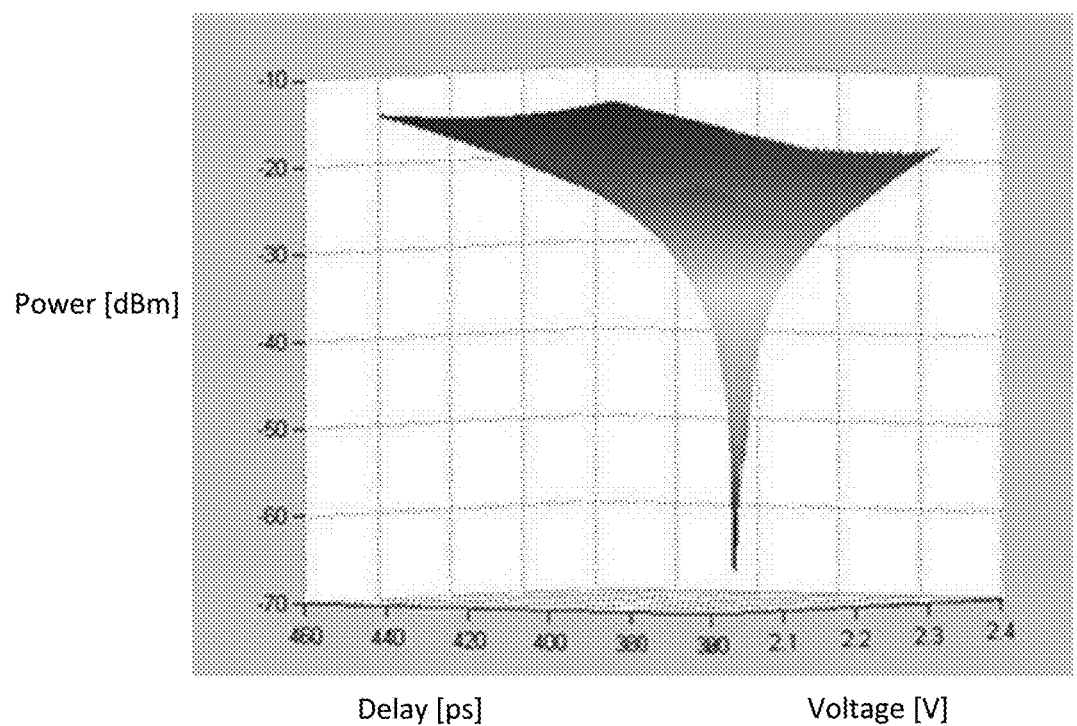

FIGS. 9A and 9B illustrates example interference cancellation measurements for various attenuation and delay values. For example, the simulations illustrated in FIGS. 9A and 9B were performed such that the delay(s) were varied 0.2 ps/step and the control voltage for the variable attenuator(s) were varied 0.8 mV/step. In other words, the Optical Subsystem may be controlled by the Digital Subsystem to adjust the optical delay line absolute delay parameter(s) in 0.2 ps increments and the optical attenuator control signal in 0.8 mV increments during the interference cancellation process. For example, after automatic detection of the jammer signal (JMR_ON), the Digital Subsystem may be configured to vary the variable optical attenuator voltage (e.g., a_c1, a_c2, a_cn of FIG. 3B) and/or the variable optical delay line (e.g., t_c1, t_c2, t_cn of FIG. 3B) until the first approximate minimum point has been determined (e.g., according to the method described with respect to FIG. 8).

FIG. 9A illustrates an approximate minimum point where the configured attenuation and delay values achieve a relative maximum interference cancellation depth. The Digital Subsystem may be configured to continually search near a determined approximate minimum point in order to attempt to achieve maximum cancellation depth. As the channel conditions and interference characteristics change over time, the point of maximum cancellation (e.g., and the attenuation and time delay values that achieve the maximum cancellation for that instance in time) may vary. The Digital Subsystem may continually attempt to achieve a minimum output power from the Optical Subsystem in order to continually improve the cancellation depth. For example, the first approximate minimum point in FIG. 9A achieves approximately −35 dB of cancellation. The ICS may further refine and search near the first approximate maximum cancellation depth in order to achieve even greater cancellation. For example, as shown in FIG. 9B, the ICS may achieve cancellation depth of −70 dB, effectively eliminating the jammer signal. In an example, the maximum jammer power before cancellation may be on the order of −4 dBm and the minimum jammer power after cancellation may be on the order of −65 dBm.

Figure 10A:
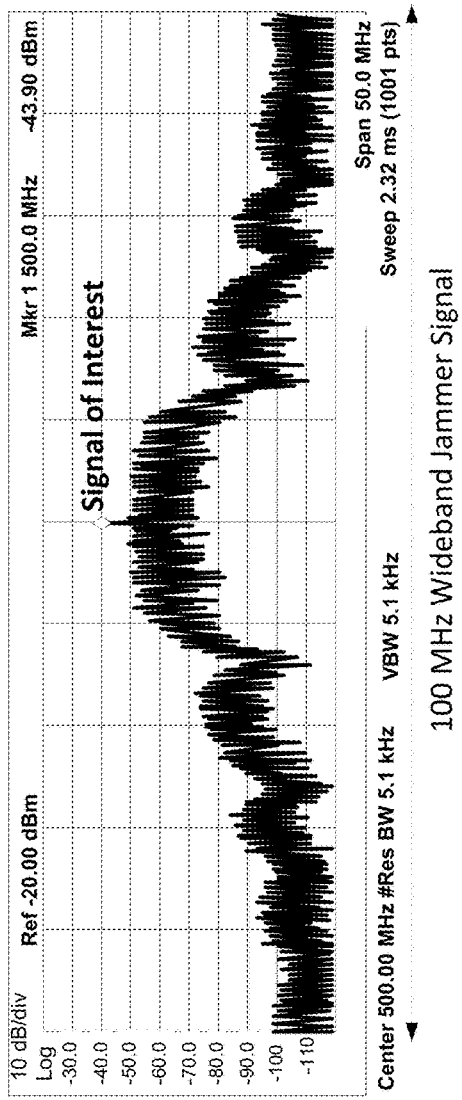
FIGS. 10A and 10B illustrate jammer cancellation in the frequency domain.
Figure 10B:
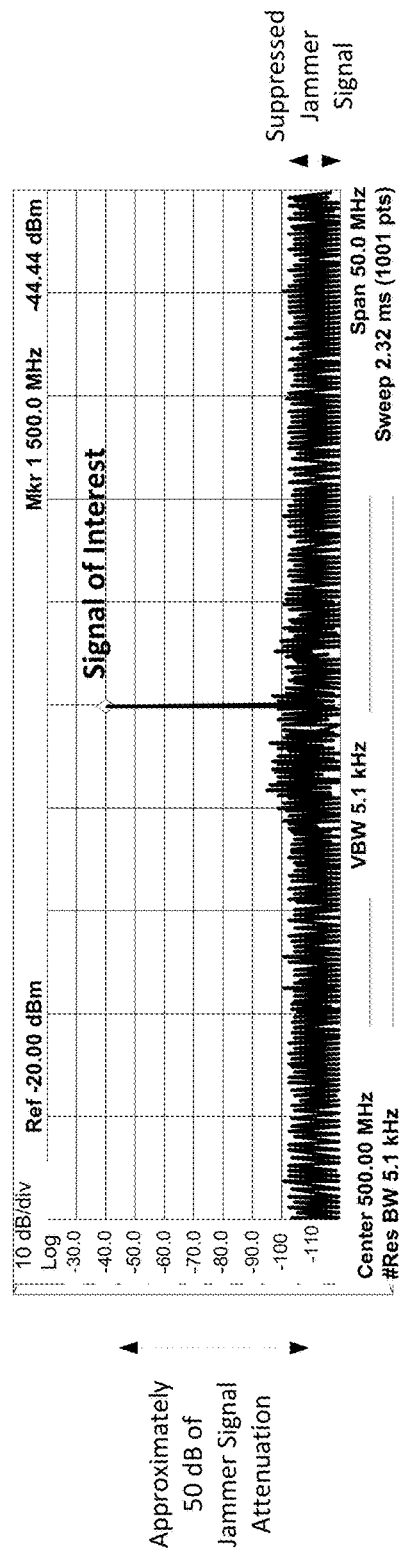

In an example, an ICS may be configured to have an effective operating bandwidth of 30 MHz to 100 GHz (e.g., although other bandwidths may be utilized), a cancelation bandwidth in excess of 150 MHz (e.g., although other bandwidths may be utilized), and over-the-air cancelation depth of 60 dB broadband and 70 dB narrowband. However, other operating bandwidths, cancellation bandwidths and cancellation depth may be achieved based on system configurations and desired performance. By achieving the cancellation of the jammer signal, the radio transceiver may be able to communicate with remote transceivers while the jammer is operating. The system may provide jammer attenuation greater than 70 dB in 100 MHz Bandwidth using a 3 mW sample signal from the jammer. For example, FIGS. 10A and 10B illustrate jammer cancellation in the frequency domain. FIG. 10A illustrates the output of a spectrum analyzer during a period in which a signal of interest is being transmitted to the transceiver and a 100 MHz wide wideband jammer is in operation and the ICS is not being used to cancel the interferer signal. As shown in FIG. 8A, the Jammer may interfere with the signal of interest. FIG. 10B illustrates the results of the ICS cancelling the jammer signal in order to obtain a relatively clean version of the SOI. As shown in FIG. 8B, interference cancellation performed by the ICS may result in 50 dB (or more) of jammer signal attenuation without distorting the signal of interest. If a more powerful jammer signal was applied an even greater level of cancelation may be achieved.

Figure 11:
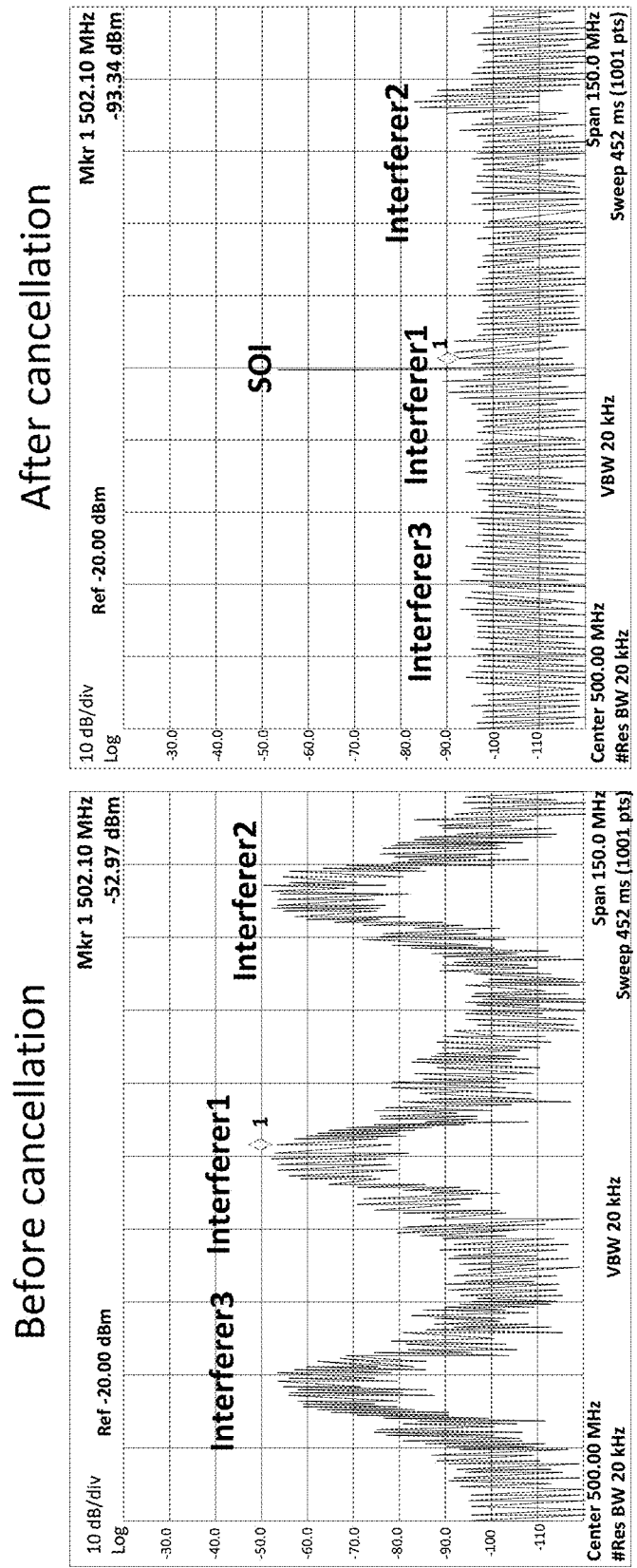
FIG. 11 illustrates the effective cancellation of three jammers in order to receive a signal of interest.

FIG. 11 illustrates the effective cancellation of three jammers in order to receive a signal of interest. The cancellation performance results are shown in FIG. 11 as measured with a spectrum analyzer. The three interferer signals are labeled Interferer1, Interferer2, and Interferer3. As shown in FIG. 11, Interferer1, Interferer2, and Interferer3 may be received at about −53 dBm before cancellation, which may be about the strength at which the SOI may be received. After cancellation, Interferer1, Interferer2, and Interferer3 may have a signal strength of about −93 dBm. The SNR after cancellation may be about 40 dB. While the cancellation attenuation is shown to be approximately 40 dB, cancellation attenuation may be in excess of 45 dB (or more) over a 150 MHz cancellation bandwidth.

In an example, the ICS may be capable of handling a large frequency range of operation up to 100 GHz. The ICS may be capable of implementing cancellation bandwidths up to and including to 1 GHz or higher. Example applications for the ICS may include applying the ICS to existing and future tactical mounted and dismounted systems. In an example, the ICS may be applicable to different radio receivers including cognitive radios. For example, the signal of interest may be associated with any type of radio receiver.

The ICS may be adapted to perform cancellation across the entire effective communication spectrum (e.g., from 30 MHz to 100 GHz). The ICS may be configured to reduce and/or cancel high-powered and wide band signals to allow signal detection of weaker, lower power signals. The ICS may improve the signal to interference ratio by greater than 10 dB during the cancellation process. The ICS may operate with little to no significant effect on the automatic gain control (AGC) of the receiver. The ICS may be configured to have little to no significant effect on the noise figure of a receiver. The ICS may operate with minimal reduction in receiver sensitivity or effects on the signals. Due to the optical nature of the interference cancellation, the ICS may be configured to operate and/or adapt quickly, for example with a high reaction time on the order of nanoseconds. The ICS may be scalable to handle information from multiple antennas (e.g., multiple jammers and/or multiple signals of interest). The ICS may be applicable to commercial and defense environments such as vehicles, ships, and/or submarines.

The ICS signal processing control architecture (e.g., the control of the attenuation and/or delay lines) may be implemented in an FPGA-DSP and/or a Single Board Computer of the Digital Subsystem. For example, the Digital Subsystem may be configured to implement a two parameter function minimization method. For example, the Digital Subsystem may be configured to vary or otherwise control variable attenuation value(s) and/or variable time delay values in order to minimize the magnitude of the output power from a signal output from the Optical Subsystem (e.g., as measured by an RF Correlate/Detector). Although an example of a dithering method for minimizing the output power from the Optical Subsystem was described with respect to FIG. 8, other two parameter function minimization methods and/or two parameter optimization methods may be utilized. For example, linear and/or non-linear function optimization methods may be utilized in order to minimize the power output from the Optical Subsystem (e.g., thereby maximizing interference cancellation) by varying the attenuation and/or time delay applied by the Optical Subsystem. For example, objective functions, cost functions, indirect utility functions, and/or other minimization functions may be applied by the Digital Subsystem. The control voltages for the variable optical attenuator(s) and/or the delay for the optical delay line(s) may be outputs of the Digital Subsystem. The Signals RSSI_Tx and RSSI_Rx may be inputs to the control system for determining whether interference cancellation has been maximized.

As may be appreciated, the threshold values, data rates, power levels, frequencies, signals, equations, and/or descriptions of the elements of the ICS are examples and are included for purposes of explanation. Numerous other values/parameters are contemplated, and the examples described herein are not meant to be limiting.

The amount of time delay applied by the Optical Subsystem may be varied and/or set using various components. For example, once the interference sample from the Jammer RF Front-End is converted to an optical signal (e.g., using Laser Modulator), a length of optical cable may provide the interferer sample to one or more tapped delay lines. The length of optical cable may be configured to apply a delay that is very close to the antenna coupling delay. The delay associated with the one or more optical delay lines may be controlled and/or varied by the Digital Subsystem. By ensuring that the delay is close to that of the antenna coupling delay, dispersion for broadband cancellation may be minimized and RF isolation may be achieved. In order to achieve the desired cancellation, the optical signal corresponding to the Jammer output may be split using a Splitter and may be processed using variable optical attenuators (e.g., Optical Attenuator 1, Optical Attenuator 2, Optical Attenuator 3, etc.) and delay lines for weighting networks (e.g., Optical Tapped Delay Line 1, Optical Tapped Delay Line 2, Optical Tapped Delay Line 3) to achieve the RF phase shift and delays for interference cancellation. The tapped delay line/weighting network summer output may be combined with the receiver antenna input that has been converted to an optical signal using Laser Modulator 2. The optically converted SOI+RF_JMR signal may be combined with the optical signal representing the Jammer output that has been optically phase shifted by −180 degrees and processed via the variable attenuators and tapped delay line/weighting network in order to achieve coherent cancellation of the interference signal. The cancelled signal residue plus the signal of interest may then be converted back to RF using a photodetector (e.g., a Photodiode Detector receiver).

The time delay lines may be implemented using a Time Delay unit (TDU). For example the TDU may be electronically driven and/or may be a photonic based true-time delay (TTD) unit and/or a combination thereof. For example, fiber Bragg gratings (FBGs) may be used as a TDU in order to achieve tunable optical delays. FBGs may be constructed from a piece of fiber with a periodically varying refractive index. The FBGs may act as a wavelength-specific dielectric mirror, for example by reflecting a particular wavelength of light and transmitting/passing other frequencies. Such a technique may generate a path of delay for the transmitted light. An example of an FBG may be a linearly chirped fiber Bragg grating (LCFBG). LCFBGs may have a linearly varying grating periods, which may allow for continuous tuning of the time delay.

FBGs may be compact, precise, and resistant to environmental changes, (e.g., temperature, moisture, etc.). In operation, tuning the system to correspond to the wavelength grating of the FBG may generate the desired time delay. In an example, rather than using multiple optical delay lines, the ICS may be configured to utilize a single tunable source and a single FBG array instead of multiple delay lines. In terms of cost, FBGs may be considerably more costly than optical delay lines. FBGs may be configured for achieving tunable optical delay lines. For example, different methods for tuning the wavelength of the system to match the grating of the FBG in order to generate the optical delay may be implemented.

In an example, the delay lines may be implemented using photonic based TTD for phased array antennas. For example, optical fiber delay lines and waveguide-assisted devices may be implemented in order to achieve the desired delay. Optical fiber delay lines may achieve the desired delay by routing a signal to be delayed through a given length of fiber. One or more optical fiber delay lines may be utilized and may operate in parallel, and the resultant outputs may be combined with wavelength-division multiplexing (WDM) optical multiplexers to achieve longer delay with discrete tunability. In other words, each optical fiber length may be different, and the difference in optical fiber lengths may provide different associated delays.

The signal may be routed through the optical fiber delay line that provides the desired delay value. TDUs paired with such WDM technologies may utilize optical add/drop modulators (OADM), for example arrayed waveguide devices (AWGs). However, if optical fiber delay lines are utilized, the minimum path length of the fiber may affect the delay resolution. Further, the use of large optical switches may be very costly. Waveguide-assisted devices may utilize customized integrated circuits, which may be costly to produce. Both FBGs and optical fiber delay lines may be examples of time delay units that may be feasible and that may be used for TTD applications in optical beamforming.

In an example, in order to implement precise, timely, and/or low cost time delays in the optical domain, a phased array radar TDU may be utilized for the delay Hues. For example, the phased array radar TDU may employ photonics technology, for example operating at the X-band (e.g., on the order of 7 to 12 GHz), and may allow for a 60 dB instantaneous dynamic range. The step resolution for the time delay may be ~0.1 ns/step resolution, for example with an instantaneous bandwidth of at least 2 GHz. In an example, a photonic phased array time delay unit using parallel fiber optic delay lines paired with wavelength division multiplexing (WDM) of tunable continuous wave (CW) lasers may be utilized as a time delay unit. Fiber delay lines may be significantly less costly than FBGs.

The ICS may be configured to utilize RF analog interference cancellation techniques, digital cancellation techniques, and/or optical cancellation techniques. In an example, digital cancellation techniques may be utilized to remove interference and/or distortion present in a received signal. For example, a received signal may be converted to a baseband signal and sampled with an analog-to-digital converter (ADC). A digital signal processor may correlate a received interference signal with a known or transmitted interference signal to estimate the channel response associated with the interference signal over the air. The digital signal processor may equalize the received interference signal to obtain a cleaner copy of received interference signal. The digital signal processor may attempt identify distortion caused to the Interferer Signal transmitted by the Jammer due to the channel conditions between the Jammer and the local radio. For example, the digital signal processor may subtract the equalized or unchanged known or estimated transmitted signal from the received signal. As may be appreciated, there are numerous techniques that may be used to estimate the channel.

One technique that may be utilized by a digital signal processor for performing interference cancellation digitally may be referred to as successive interference cancellation. Successive interference cancellation may include obtaining and removing the strongest signal from the rest of the received signal. Successive interference cancellation may be implemented in a system where some a priori knowledge of a desired signal, interference signal, or both signals may be known to the digital signal processor so that strongest signal can be accurately removed. Although developed and demonstrated algorithms may provide fast and adaptive estimation of the channel, the digital cancellation approach may be dependent on the sampling speed and accuracy of the analog-to-digital converter. The analog-to-digital converter may be constrained by its bandwidth, sampling error, and/or dynamic range. Digital interference cancellation techniques may achieve cancellation of up to 30 dB over 10 MHz depending on the abilities of the analog-to-digital converter.

Electronic analog cancellation approaches, for example using finite impulse response (FIR) structures, may provide highly adaptive variable gain control and phase shifting. However, variable time delay for a signal, for example a wideband signal, may be unable to be implemented using electronic analog cancellation approaches. An interference cancellation system may be configured to estimate the transmission channel. For example, the interference cancellation system may estimate the channel using FIR structures. The channel can be accurately estimated by a FIR structure based channel estimator with a sufficient number of taps. However, like digital cancellation, FIR structures may be confined based on the bandwidth and dynamic range. Electronic analog cancellation techniques may achieve cancellation of up to 20-30 dB over 30 MHz.

The RF analog cancellation approach may avoid constraints affecting the bandwidth and dynamic range of FIR structures. For example, the RF analog cancellation approach may convert the interfering signal into in-phase and quadrature-phase components, for example using RF I/Q and/or 0/90 degree splitters. The RF analog cancellation approach may utilize variable gains in in-phase and quadrature-phase components, for example to arbitrarily modify amplitude and phase shift of the signal. Separating the interfering signal into in-phase and quadrature-phase components may be implemented in small form factor, however, the simulated phase shift may fail to provide true-time delay and therefore may be frequency dependent. Separating the interfering signal into in-phase and quadrature-phase components may achieve cancellation of up 20-25 dB of interference cancellation for 10 MHz bandwidth. Furthermore, separating the interfering signal into in-phase and quadrature-phase components may be largely nonlinear and distorted.

An example RF analog cancellation approach may utilize a balanced/unbalanced transformer to invert the signal, add RF delay, and/or apply an attenuator to the inverted path. However, typically it may be difficult to match the size of the RF delay with appropriate attenuator to achieve the desired precision used for a high level of cancellation. Using RF analog cancellation to invert the signal, add RF delay, and apply an attenuator may result in up to 45 dB of cancellation over a 40 MHz bandwidth.

In order to obtain an adaptive system, different approaches may be applied in combination. An active system that combines balanced/unbalanced transformer to invert the signal, add RF delay, and apply an attenuator to the inverted path while separating the interfering signal into in-phase and quadrature-phase components for automatic tuning and digital cancellation for multipath interference may be utilized. Such a combination system may provide up to 73 dB of cancellation over 10 MHz. Optical interference cancellation techniques may be capable of 45 dB of cancellation over 2 GHz. For example, an independently modulated dual port Mach-Zehnder modulator may be used and may achieve up to 45 dB of cancellation over 1 GHz and 30 dB over 2 GHz bandwidth.

An interfering signal may be categorized into one or more of co-site interference, narrowband interference, and/or wideband interference. Disclosed herein are methods and systems for identifying the interfering signal, isolating the interfering signal, and removing the interfering signal in order to determine a signal of interest.

Figure 12:
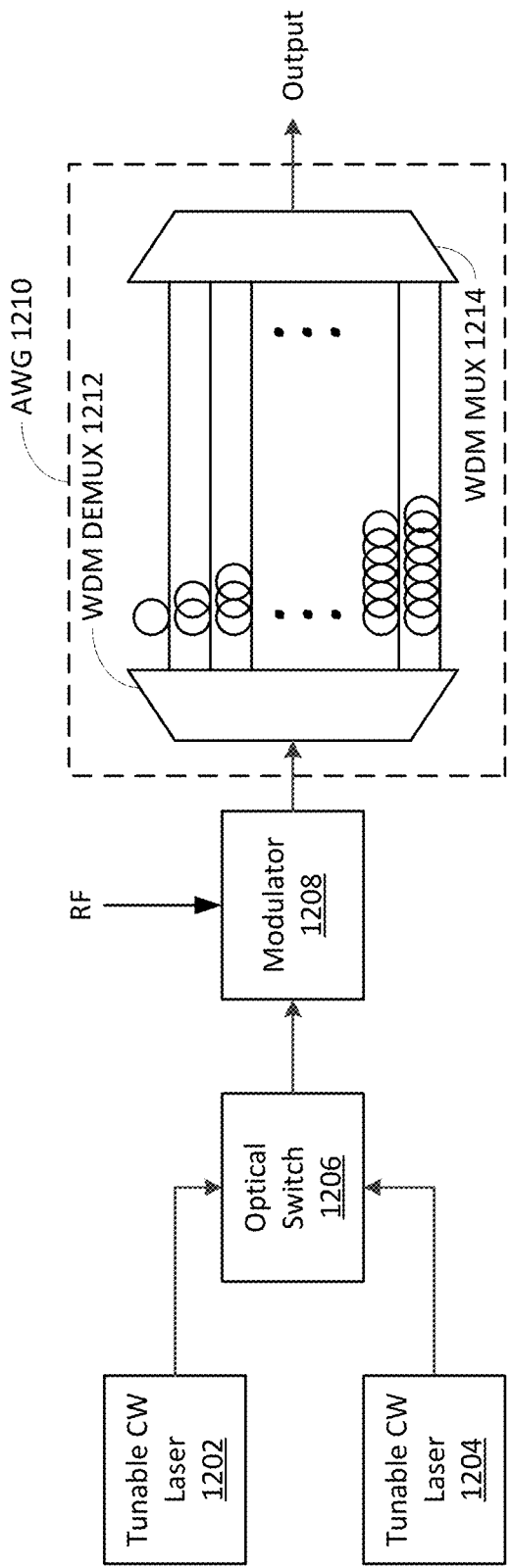
FIG. 12 is an example architecture for a variable optical delay line implemented using parallel fiber optic delay lines between paired wavelength division multiplexing (WDM) units based on signals from tunable continuous wave (CW) lasers.

FIG. 12 is an example architecture for a variable optical delay line implemented using parallel fiber optic delay lines between paired wavelength division multiplexing (WDM) units based on signals from tunable continuous wave (CW) lasers. For example, as shown in FIG. 12, two tunable CW lasers (e.g., Tunable CW Laser 1202 and Tunable CW Laser 1204) may provide inputs to an ultrafast (e.g., on the order of picoseconds) optical switch (e.g., Optical Switch 1206). Each laser may be capable of tuning over the optical C-band (e.g., on the order of 4 to 8 GHz). The outputs of the tunable lasers may be input to Optical Switch 1206, which for example may be a 2×1 electro-optical (E/O) switch. The use of two lasers may help achieve fast switching times, although more than two lasers may also be used. When one laser is in use (e.g., Tunable CW Laser 1202), the backup laser (e.g., Tunable CW Laser 1204) may begin tuning to the next delay setting. Once the backup reaches the proper delay, the switch may be made and the primary laser may begin tuning to another delay.

The laser source output by Optical Switch 1206 that is associated with the desired delay may be modulated with the appropriate RF signal (e.g., the inverted optical jammer signal) using an E/O modulator to convert the signal from the RF to the optical domain. The converted optical signal may be sent to an arrayed waveguide grating (AWG) 1210 that may include a parallel array of delay lines associated with various delay values. AWG may be, for example, a 64-channel AWG and the parallel array may include 64 fiber delay lines. The input of AWG 1210 may be configured as a WDM demultiplexer (e.g., WDM DEMUX 1212), for example with 50 GHz channel spacing. Each output of WDM DEMUX 1212 may be connected to a piece of fiber to provide the delay. In an example, there may be a total of 64 discrete delays, with a spacing of approximately 0.219 ns. In other words, each discrete delay line may provide an associated discrete delay that may be different than the delay provided by the other delay lines.

The tuning of the currently active laser (e.g., Tunable CW Laser 1202 or Tunable CW Laser 1204 depending on the current state of Optical Switch 1206) may determine which delay line of AWG 1210 is utilized at any specific instance in time. Such a scheme may result in a total delay of approximately 14 ns. In operation, the currently active laser (e.g., Tunable CW Laser 1202 or Tunable CW Laser 1204 depending on the current state of Optical Switch 1206) may tune to a specific channel wavelength of AWG 1210, with a single output coming from that channel (e.g., the other channels may lack an output during that time). The output of the channel may be delayed by the length of fiber associated with the channel. WDM multiplexer 1214 may act to combine the channels/outputs from the delay lines (e.g., one of which may be active at a given time instance). Utilizing this method, a wavelength-specific delay may be achieved, and the wavelength-specific delay may be controlled by two tunable CW lasers (e.g., Tunable CW Laser 1202 and Tunable CW Laser 1204), which may be for example tunable distributed feedback (DFB) lasers.

In an example, the optical delay line(s) implemented using parallel fiber optic delay lines paired with WDMs of tunable CW lasers may realize 14 ns of delay or more and may be discretely tunable with 64 steps with a resolution of ~0.2 ns/step. Resolution of better than 0.1 ns/step may be achieved by packing the step closer. There may be a 4 dB insertion loss through each of the mux and demux units of the AWG, a 4.5 dB insertion loss through the modulator, a 3 dB loss through the E/O switch, and a 0.20 db/km loss through the fiber. The maximum loss suffered by the two-laser fast switching system may be ~15.5 dB. The system may experience little dispersion loss. The fibers may have a dispersion of approximately 18 ps/nm-km, but at short fiber lengths (e.g., maximum is <3 m), operation in the RF X-band with a wide bandwidth (of ~2 GHz) may produce little degradation. The system may avoid phase inaccuracy by using polarization-maintaining (PM) fiber and PM output from the laser.

The tunable CW laser may have a tuning speed on the order of 100 nm/s. With the use of two-tunable laser configuration, "dead" time between successive tuning of delays (e.g., the time associated with tuning the laser) may be eliminated, since one laser may be in operation while the second laser may be tuning to the next delay. A fast switching time in the order of picoseconds may be obtained by utilizing an E/O switch to switch between the two lasers. The actual switching time may be based on the switching time of the control signal (e.g., the control signal from the Digital Subsystem).

To benefit from the picosecond switching time, the delay may maintain a current state for a predetermined period of time before changing to a new delay value. Because the successive delay steps to the standby laser may be launched ahead of the tuning, the laser may be tuned and settled before use. Once the laser not currently in use is tuned to the next desired delay, the switch may occur and the previously active laser may begin tuning to the next delay value. Such tuning may provide increased speed when tuning the Optical Subsystem using the Digital Subsystem.

Figure 13:
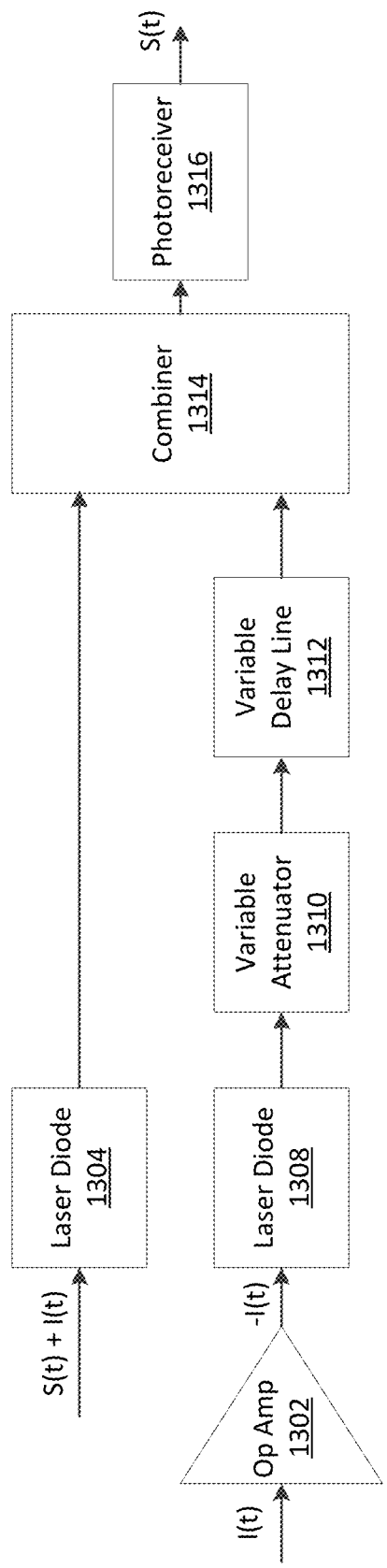
FIG. 13 illustrates an example system diagram for a portion of the Optical Subsystem using direct modulation.

In an example, in order to achieve improved cancellation in the low frequency range, a pair of optical transmitters in the Optical Subsystem may be configured to utilize direct modulation when converting the RF signals to the optical domain. FIG. 13 illustrates an example system diagram for a portion of the Optical Subsystem using direct modulation. For example, the optical transmitters/laser modulators may utilize direct modulation rather than, or in addition to, a counter phase Mach-Zehnder modulator (MZM) in order to convert one or more RF signals to the optical domain. The direct modulation may be implemented, for example using a pair of laser diodes (e.g., Laser Diode 1304 and Laser Diode 1308) that may have matched performance in frequency responses and dynamic ranges.

For example, the path that contains signal of interest (e.g., S(t)) plus the interferer signal (e.g., I(t)) may directly change the driving current for Laser Diode 1304. The pure interferer signal (e.g., I((t)) may be inverted with a broadband operational amplifier (e.g., Op Amp 1302), and thus the signal −I(t) may be directly modulated onto the optical carrier by Laser Diode 1308, for example by directly driving the current of Laser Diode 1308. After appropriate attenuation by Variable Attenuator 1310 and/or delay by Variable Delay Line 1312 for the inverted interferer signal, the two optical paths may be combined with an optical coupler (e.g., Combiner 1314). The combined signal may be converted back to an RF signal Photoreceiver 1316. By adjusting the amplitude and/or delay of the inverted I(t) signal in optical domain, a clean S(t) signal may be obtained at the output. Implementing directly modulated laser diodes may be compact and may use a relatively low driving power as compared to a counter-phase MZM modulator. Using direct modulation may provide more effective interference cancellation in lower frequencies such as RF applications that operate in VHF and UHF bands.

In an example, rather than inverting the jammer signal when converting the signal to the optical domain (e.g., performing a −180 degree phase shift on the jammer signal), the SOI+Interferer signal may be shifted/inverted prior to being combined with a non-inverted, optical version of the jammer signal. Such a scheme may introduce a delay line and/or optical attenuator into the optical path used to process the SOI+Interferer signal. In an example, after combining the optically inverted SOI+Interferer signal with the optical jammer signal, the result may be shifted by −180 degrees in order to obtain an optical version of the SOI (e.g., perhaps with some residual jammer output, depending on the depth of cancellation). Thus, as may be appreciated either the combined jammer plus SOI signal or the jammer signal alone may be the signal that is optically inverted prior to attenuation and time delaying.

Figure 14:
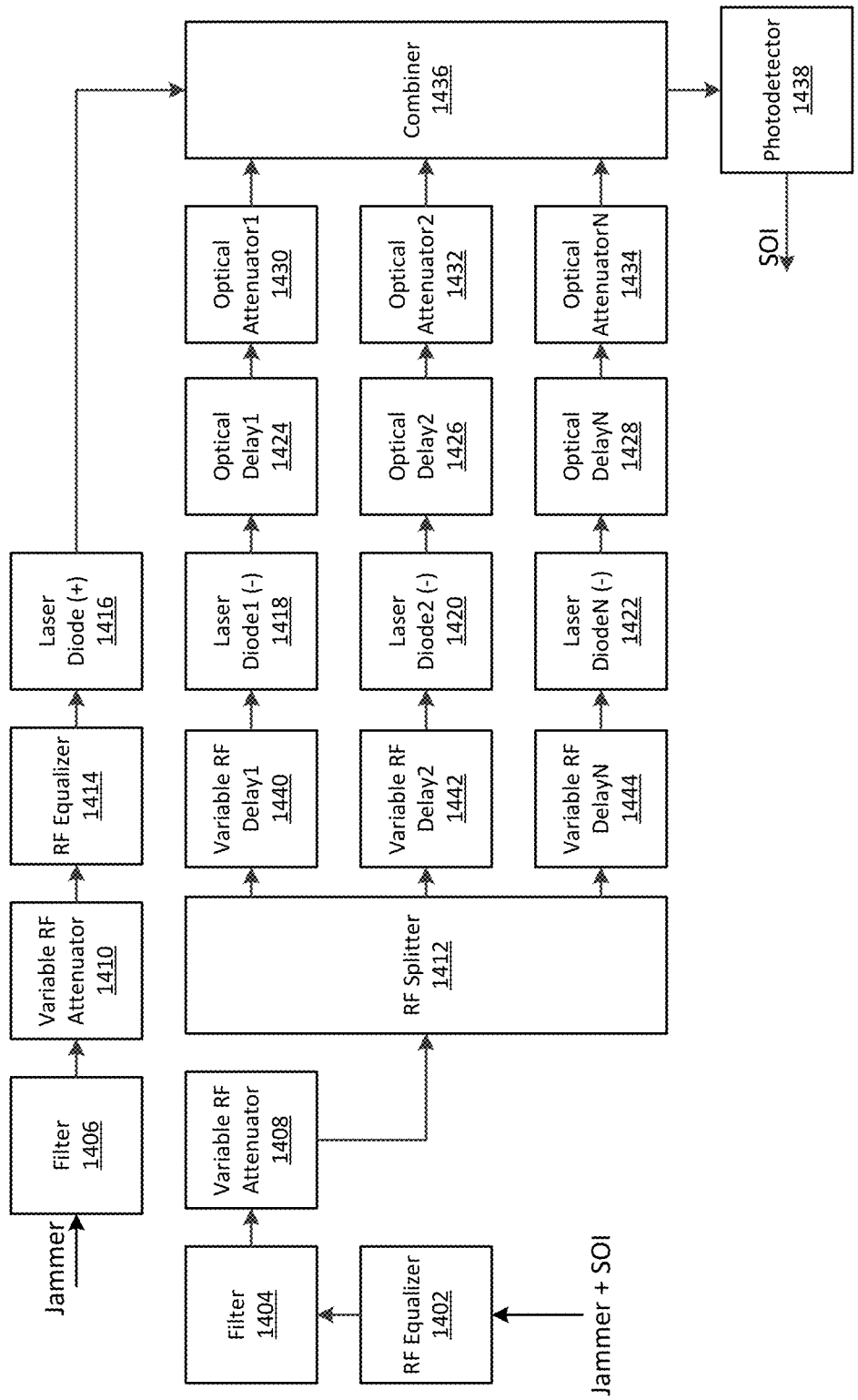
FIG. 14 is a system diagram of an example cancellation architecture which utilizes both RF and optical cancellation techniques.

FIG. 14 illustrates an example architecture that utilizes equalizers in order to perform interference cancellation in both the RF domain and the optical domain. Such an equalizer compensation circuit may allow for fast tuning of the ICS in order to quickly determine an SOI. In some circumstances and environments, performing some of the cancellation first in the RF domain may result in the ICS reaching/obtaining the maximum interference cancellation of the jammer signal more quickly than by using optical tuning alone.

As illustrated in FIG. 14, one or more RF Equalizers (e.g., RF Equalizer 1402 and/or RF Equalizer 1414) that may be configured to process the Jammer signal and/or the Jammer+SOI signal prior to optical interference cancellation. Additionally, the Jammer+SOI signal may be split into a number of RF signal paths prior to conversion to the optical domain such that each path may be individually time delayed in the RF domain prior to conversion to the optical domain. The number utilized of paths may depend on the desired type and/or range of cancellation. For example, each path may be configured to cancel a multipath signal of the jammer. For example, each path may be configured to cancel a different multipath signal of the jammer.

In an example, one or more RF Equalizers may be configured to apply compensation in order reduce and/or eliminate non-linear effects caused by the over-the-air (OTA) communication path experienced by the SOI and/or jammer signal. Non-linear effects may affect amplitude and/or phase of the SOI and/or jammer signal during the interference cancellation and/or receiver processing process(es). Additionally, the non-linear channel conditions may affect the frequency response of the signal experiencing the non-liner conditions. To account for such effects, RF Equalizer 1402 may be configured to adjust the ratio of different frequency components of the RF signal (e.g., the Jammer plus SOI signal). For example, RF Equalizer 1402 may be configured to strengthen or boost certain frequency components and/or weaken or cut other frequency components. In an example, Equalizer 1402 may be configured to flatten the frequency response of the over-the-air channel from low frequencies to high frequencies, for example to render total frequency response for the over-the-air channel that may be approximately linear. By performing the equalization, the RF and/or optical cancellation may be performed based on an assumption that the frequency response (e.g., the frequency transform) of the over-the-air channel is linear in nature.

As an example, equalization may be performed to account for the effects of multipath signals via the Radio Transceiver Antenna. In order to achieve a higher level of interference cancellation and/or to obtain a cleaner version of the SOI, such multipath effects may be considered and compensated for before and/or during optical domain interference cancellation. However, considering multipath effects may result in a non-linear channel response. To account for the non-linearity, two equalizers (e.g., RF Equalizer 1402 and RF Equalizer 1414) are shown in FIG. 14; however, a single and/or a plurality of equalizers may be utilized, for example depending on the application of the ICS. RF Equalizer 1402 and RF Equalizer 1414 may process the received signals in such a way as to compensate for the non-linear effects of multipath fading. Additionally, in the example shown in FIG. 14, the Jammer+SOI signal may be inverted for cancellation in the optical domain. However, in another example, the Jammer signal may be inverted for cancellation while also employing one or more Equalizers in order to perform portions of the cancellation in the RF domain.

After equalization by RF Equalizer 1402, Filter 1404 may be applied to the equalized Jammer+SOI signal. For example, the sampled jammer signal may be sent to an RF bandpass filter, for example to filter noise and/or distortion from the jammer signal that is introduced during the sampling process. The power level of the sampled jammer signal may be adjusted, for example using Variable RF Attenuator 1408. The amount by which Filter 1404 and Variable RF Attenuator 1408 process the combined jammer plus SOI signal may vary based on control signals received from the Digital Subsystem. The sampled jammer signal may be applied to the input of an equalizer, for example RF Equalizer 1414 after it has been filtered by Filter 1406 and Variable RF Attenuator 1410. The output of RF Equalizer 1414 may be used to modulate Laser Diode(+) 1416 with the positive slope, and the output of Laser Diode(+) 1416 may be an optical version of the processed jammer signal. For example, the conversion of the jammer signal from RF domain to optical domain may occur at the Laser Diode(+) 1416. The optical version of the jammer signal may be transported through a fixed length of optical fiber to Optical Combiner 1436.

In an example, the signal received via the radio transceiver antenna (e.g., the jammer+SOI signal) may be passed through an equalizer (e.g., RF Equalizer 1402), for example to compensate for non-linear effects of the channel between the Jammer Antenna and the Radio Transceiver Antenna (e.g., the over-the-air path experienced by the jammer signal). The output of the equalizer may be filtered (e.g., by Filter 1404), for example to remove noise and/or distortions that may be introduced by RF components of the radio and/or the ICS. The power level of the jammer+SOI signal may be adjusted, for example by Variable RF Attenuator 1408. Filter 1404 and/or Variable RF Attenuator 1408 may vary based on control signals received from the Digital Subsystem. The jammer+SOI may be split by RF Splitter 1412, for example to provide multiple optical signals processing paths. The number of paths may vary based on the application of the ICS. Prior to conversion to the optical domain, delays may be introduced in the RF domain, for example using Variable RF Delay1 1440, Variable RF Delay 1442, . . . , Variable RF DelayN 1444 (e.g., introducing RF delay1, RF delay2, . . . , RF delayN, respectively). The RF delay units may be configured to introduce delays in the RF domain that may be larger in magnitude than the delays introduced in the optical domain by Optical Delay1 1424, Optical Delay2 1426, . . . , Optical DelayN 1428 (e.g., introducing Optical Delay1, Optical Delay2, . . . , Optical DelayN, respectively). For example, during the dithering process, larger time delays (e.g., on the order of ps or tens of ps) may be introduced using RF components, while relatively shorter delay timers (e.g., tenths of ps and faster) may be introduced using optical components.

For example, the amount of delay applied to a signal in using RF components (e.g., the granularity of the potential delays that may be applied in the RF domain by the RF delay lines) may be larger than the amount of delay applied to a signal in using optical components (e.g., the granularity of the potential delays that may be applied in the optical domain by the optical delay lines). In this manner, the RF delay lines may be configured to quickly apply larger delays in order to achieve a cancellation of the jammer signal. Then, the optical delay lines may be configured to fine tune the delay using finer granularity changes in delay values in order to achieve maximum cancellation of the jammer signal in the optical domain. By performing the majority of the cancellation in the RF domain and performing incremental cancellation in addition to the RF cancellation in the optical domain, the speed at which the system operates may be increased.

For example, the optical delay lines may achieve associated delays (e.g., optical delay1, optical delay2, . . . , optical delayN) that may be tuned on the order of hundredths of picoseconds $10^{-2}$ ps), so testing each possible delay for the achieved cancellation level may be a time consuming procedure. The RF delay lines may be tuned on the order of tens of picosecond (e.g., $10^1$ ps), allowing the ICS to determine/identify a smaller range of delays in which the maximum cancellation of the jammer may occur. Once RF components have achieved been tuned to provide a delay that that is near or just less than the delay that will maximize interference cancellation, the Optical Subsystem may then be configured to introduce additional delays using a smaller granularity of possible delays in order to maximize the achieved cancellation. For example, the optical attenuators (e.g., Optical Attenuator1 1430, Optical Attenuator2 1432, . . . , Optical AttenuatorN 1434) and/or the optical delay lines (e.g., Optical Delay1 1424, Optical Delay2 1426, . . . , Optical DelayN 1428) may be variable and controlled by the Digital Subsystem to achieve the final attenuation and/or delay in the optical domain.

By introducing larger magnitude delays in the RF domain and the smaller magnitude delays in the optical domain, the ICS may be quickly tuned while still providing a high degree of cancellation. Such an architecture may provide a cancellation depth that is 10 to 15 dB greater than what may be provided by RF cancellation components alone (e.g., based on the precision tuning capabilities of the tunable delays and attenuators in optical domain), while still achieving cancellation speeds that may be comparable to a fully RF architecture. In an example, the optical delays and attenuators may be small enough that they may be integrated together with the Laser Diodes, for example to achieve cost savings when producing the Optical Subsystem.

Once the larger magnitude variable RF delays have been applied in the RF domain and the smaller magnitude variable optical delays have been applied in the optical domain, the optical version of the jammer signal (e.g., from Laser Diode(+) 1416) and the optical inverted and processed version of the jammer and SOI signal (e.g., from Optical Attenuator1 1430, Optical Attenuator2 1432, . . . , Optical AttenuatorN 1434) may be combined in Optical Combiner 1436 in order to achieve cancellation of the jammer signal, for example including cancellation of multipath signals via a corresponding optical cancellation path. The resulting SOI signal (e.g., with minimal jammer residual signal) may be converted back to RF domain by Photodetector 1438, which may be a photodiode detector, photoreceiver, and/or the like. The SOI signal may or may not be shifted by −180 degrees, for example when being converted to the RF domain.

FIGS. 15A & 15B illustrate amplitude (e.g., FIG. 15A) and phase (e.g., FIG. 15B) vs. frequency response of the over-the-air path experienced by the jammer signal prior to utilizing the combined RF and optical equalized cancellation technique described with respect to FIG. 14. In an example, the equalizer may be configured to provide a response that is not flat over the frequency band of interest (for example 300-500 MHz), for example to compensate for non-linear channel effects experienced by the jammer signal. The variation in amplitude (e.g., FIG. 15A) and/or phase (e.g., FIG. 15B) in the channel response may be due to non-linear effects from jammer and/or radio transceiver antenna(s), the multipath effects due to the environment of operation, and/or distortions or noise introduced by transmit and/or receive components. Such non-linear effects may degrade the cancellation depth of the ICS. In order to compensate for the non-linear effects and/or improve the overall cancellation performance of the ICS, Equalizers (e.g., RF Equalizer 1402 and/or RF Equalizer 1414) may be configured to reduce and/or eliminate non-linear components of the received signal(s). For example, the deep minimum in FIG. 15A may be caused mainly by multipath effects of the jammer signal. One or more equalizers (e.g., RF Equalizer 1402 and/or RF Equalizer 1414) may be configured to provide compensation to certain frequencies of a received signal in order to compensate for the non-linear effects of the over-the-air path. The equalizers may be passive and/or active depending on the application environment.

For example, a channel estimation may be performed between the jammer transmit antenna and the radio transceiver receive antenna. One or more equalizers (e.g., RF Equalizer 1402 and/or RF Equalizer 1414) may be configured to boost certain frequencies and/or to dampen other frequencies of the interference signal and/or the interference plus SOI signal in order to compensate for the non-linear effects of the OTA channel. Which frequencies are strengthened and which frequencies are weakened may be selected based on the frequency response and/or the phase response of the OTA channel (e.g., including effects of the transmit and/or receive equipment such as antennas, couplers, etc.).

An optical cancellation approach may provide instantaneous broadband cancellation using a true-time delay. Such a technique may be utilized due to the low loss in fiber transmission. In many applications, RF cable may be about 500 times more lossy than optical fiber (e.g., 0.6 dB/m compared to 0.2 dB/km).

Figure 16:
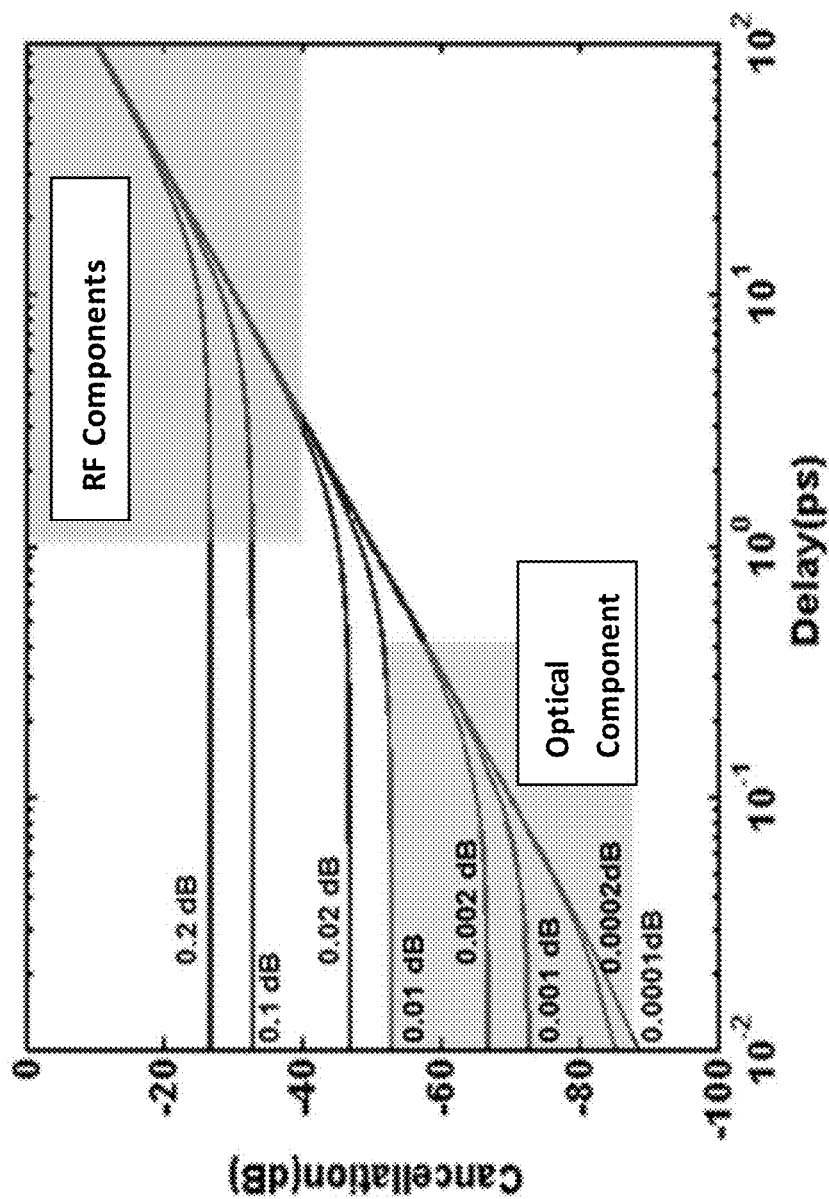
FIG. 16 illustrate cancellation that may be achieved using an example combined RF and optical equalized cancellation technique.

Therefore, the high cancellation depth and/or precision cancellation may be provided by the optical components. FIG. 16 illustrates visually the cancellation that may be achieved by the RF cancellation components and the optical cancellation components of the ICS. For example, to achieve greater than 60 dB of cancellation, the attenuation applied to the jammer plus SOI signal may be matched to less than 0.01 dB of the attenuation experienced by the transmitted jammer signal and the delay applied to the jammer plus SOI signal may be matched to less than 1 ps of the delay experienced by the transmitted jammer signal. The optical components of the optical weighting network (e.g., the optical attenuators and/or delay lines) may be configured to provide such a range of precision, as shown in the lower left corner of FIG. 16. The RF components may be configured to achieve the cancellation shown in the upper right corner, and such cancellation may be achieved more quickly using RF components as compared to optical components that utilize a smaller granularity in delay and/or attenuation.

Using current RF components, the precision of the delay and/or attenuation may be limited due to bandwidth limitations at RF and microwave frequencies of operation. Optical components may provide bandwidth many orders of magnitude wider than RF components and may be applicable over entire RF and microwave frequency bands (e.g., 10 kHz-100 GHz). The optical components may be rapidly tuned to handle almost any frequency utilizing the same core components. The optical ICS may convert the RF or microwave input signals into optical signals and may use optical components for precise attenuation down to 1/1000 dB range and/or with time delay in the femtoseconds range.

Embodiments may take the form of a tangible computer-usable or computer-readable medium providing program code for use by or in connection with a computer or any instruction execution system. Examples of a computer-usable or computer-readable medium include tangible computer media such as semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A processor may be configured to execute instructions stored in memory to perform the various functions described herein.

What is claimed:

1. A method for attempting to cancel interference signal, the method comprising:
    receiving a first radio frequency (RF) signal corresponding to an interference signal and a second RF signal corresponding to a combined interference and signal of interest (SOI) signal;
    converting the first RF signal to a first optical signal and the second RF signal to a second optical signal and applying a 180 degree phase shift to one of the first optical signal or the second optical signal before, during, or after optical conversion;
    optically attenuating and optically time delaying the first optical signal;
    combining the attenuated and time delayed first optical signal with the second optical signal to create a combined optical signal;
    converting the combined optical signal to a combined RF signal, wherein at least one optical component is controlled by a digital control component in order to attempt to maximize cancellation of the interference signal from the combined RF signal; and
    sending the combined RF signal to a radio transceiver.

2. The method of claim 1, further comprising applying an RF time delay to the first RF signal prior to convert the first RF signal to the first optical signal, wherein the RF time delay is at least an order of magnitude larger than an optical time delay that is applied to the first optical signal.

3. The method of claim 1, further comprising determining one or more initial optical attenuation values or optical delay values to be applied to the first optical signal based on a determined power difference between a signal associated with the interference signal and a signal associated with the combined interference and SOI signal.

4. The method of claim 1, further comprising:
    determining when an interferer is transmitting the interferer signal and when the radio transceiver is transmitting a transmission signal;
    determining to perform interference cancellation when the interferer is transmitting and the radio transmitter is not transmitting; and
    determining to refrain from performing interference cancellation when the interferer is not transmitting or when the radio transceiver is not transmitting.

5. The method of claim 1, wherein combining the attenuated and time delay first optical signal with the second optical signal to create a combined optical signal results in at least 50 dB of cancellation of the interference signal from the combined interference and SOI signal.

6. The method of claim 1, wherein the at least one optical component controlled by the digital control component comprises an optical attenuator used to optically attenuate the first optical signal.

7. The method of claim 1, wherein the at least one optical component controlled by the digital control component comprises an optical time delay used to optically time delay the first optical signal.

8. The method as of claim 1, wherein the at least one optical component comprises at least one of an optical attenuator, an optical time delay line, a laser modulator, or a photodiode detector.

9. The method as of claim 1, wherein the digital control component attempts to maximize cancellation of the interference signal from the combined RF signal based on a signal received from one or more of an RF power level detector or an RF frequency detector.

10. A method comprising:
radio frequency (RF) circuitry receiving a first signal corresponding to an interferer signal and a second signal corresponding a combination of the interferer signal and a signal of interest (SOI);
converting the first and second signals from radio frequency signals to optical signals;
applying a 180 degree phase shift to the first signal;
variably attenuating and variably time delaying one or more of the first signal or the second signal in the optical domain based on one or more control signals received from a digital processor circuitry;
combining the first signal and the second signal into a combined signal after variably attenuating and variably time delaying one or more of the first signal or the second signal;
converting the combined signal into a combined RF signal; and
outputting the combined RF signal, wherein the digital processor circuitry generates the control signals based on a power level associated with the combined RF signal.

11. The method of claim 10, further comprising:
generating a third signal based on the combined RF signal output, the third signal being inversely proportional to the amount of the interference signal that has been removed from the combined RF signal, the third signal being used to generate the control signals.

12. The method of claim 11, further comprising:
determining that the power level of the third signal is below a threshold, and
sending the combined RF signal to a radio transceiver based on the power level of the third signal being below the threshold.

13. The method of claim 10, further comprising:
generating a fourth signal that indicates a frequency associated with a given RF signal.

14. The method of claim 10, further comprising: generating
a fifth signal that indicates when a radio transceiver is performing a radio transmission.

15. A method performed by an interference cancellation system (ICS), the method comprising:
receiving a first signal corresponding to an interferer signal and a second signal corresponding a combination of the interferer signal and a signal of interest (SOI);
converting each of the first signal and the second signal from radio frequency (RF) signals to optical signals;
applying a 180 degree phase shift to one of the first signal or the second signal;
variably attenuating and variably time delaying one or more of the first signal and the second signal based on one or more control signals received from a digital processor;
combining the first signal and the second signal into a combined signal after variably attenuating and variably time delaying one or more of the first signal and the second signal; and
converting the combined signal from an optical signal to an RF signal;
sending the combined signal to a radio transceiver, wherein the control signals are generated based on a power level associated with the combined signal.

16. The method of claim 15, further comprising:
receiving a signal transmitted by the radio transceiver; and
pausing the interference cancellation process while the radio transceiver is transmitting.

17. The method of claim 15, further comprising determining a frequency associated with a signal transmitted by the radio transceiver.

18. The method of claim 15, wherein the interference signal is received from a jammer operably coupled to the ICS.

* * * * *